United States Patent
Tanaka et al.

(10) Patent No.: US 9,994,770 B2
(45) Date of Patent: Jun. 12, 2018

(54) LIQUID CRYSTAL COMPOUND HAVING TERCYCLOHEXYL, LIQUID CRYSTAL COMPOSITION AND LIQUID CRYSTAL DISPLAY DEVICE

(71) Applicants: JNC CORPORATION, Tokyo (JP); JNC PETROCHEMICAL CORPORATION, Tokyo (JP)

(72) Inventors: Hiroyuki Tanaka, Ichihara (JP); Akihiro Takata, Ichihara (JP)

(73) Assignees: JNC CORPORATION, Tokyo (JP); JNC PETROCHEMICAL CORPORATION, Tokyo (JP)

(*) Notice: Subject to any disclaimer, the term of this patent is extended or adjusted under 35 U.S.C. 154(b) by 0 days. days.

(21) Appl. No.: 15/453,627

(22) Filed: Mar. 8, 2017

(65) Prior Publication Data
US 2017/0260453 A1  Sep. 14, 2017

(30) Foreign Application Priority Data
Mar. 10, 2016  (JP) ................. 2016-046832

(51) Int. Cl.
G02F 1/1333 (2006.01)
C09K 19/34 (2006.01)
C09K 19/30 (2006.01)

(52) U.S. Cl.
CPC ...... *C09K 19/3402* (2013.01); *C09K 19/3001* (2013.01); *C09K 19/3003* (2013.01); *C09K 19/3068* (2013.01); *C09K 2019/301* (2013.01); *C09K 2019/3004* (2013.01); *C09K 2019/3006* (2013.01); *C09K 2019/308* (2013.01); *C09K 2019/3009* (2013.01); *C09K 2019/3016* (2013.01); *C09K 2019/3071* (2013.01); *C09K 2019/3077* (2013.01); *C09K 2019/3083* (2013.01); *C09K 2019/3422* (2013.01)

(58) Field of Classification Search
CPC ............ C09K 19/3402; C09K 19/3068; C09K 19/3003; C09K 19/3001; C09K 2019/3071; C09K 2019/3077; C09K 2019/3004; C09K 2019/3009; C09K 2019/3006; C09K 2019/301; C09K 2019/3016; C09K 2019/3422; C09K 2019/3073; C09K 2019/308; G02F 1/1333
USPC ...................... 428/1.1; 252/299.63
See application file for complete search history.

(56) References Cited

U.S. PATENT DOCUMENTS

| | | | |
|---|---|---|---|
| 5,709,820 A | 1/1998 | Kato et al. | |
| 6,007,740 A | 12/1999 | Andou et al. | |
| 6,030,545 A | 2/2000 | Matsui et al. | |
| 8,435,422 B2 * | 5/2013 | Kobayashi | C09K 19/3003 252/299.01 |
| 8,501,038 B2 * | 8/2013 | Kobayashi | C09K 19/3003 252/299.01 |
| 8,580,147 B2 * | 11/2013 | Kobayashi | C07D 239/26 252/299.01 |

FOREIGN PATENT DOCUMENTS

| | | |
|---|---|---|
| DE | 4414647 A1 | 4/1994 |
| JP | H0952851 A | 2/1997 |
| JP | H09110734 A | 4/1997 |
| JP | H10204016 A | 8/1998 |

OTHER PUBLICATIONS

K. Kanie, et al., "Synthesis and Electro-Optical Properties of Novel Liquid Crystals Having a Cyclohexyl Trifluoromethyl Ether Moiety," Chemistry Letters 1997, p. 827.
K. Kanie, et al., "A Facile Synthesis of Novel Liquid Crystalline Materials Having a Trifluoromethoxy Group and Their Electro-Optical Properties," Bulletin Chemical Society of Japan, 73, p. 1875, (2000).

* cited by examiner

*Primary Examiner* — Geraldina Visconti
(74) *Attorney, Agent, or Firm* — Hogan Lovells US LLP

(57) ABSTRACT

Provided is a liquid crystal compound satisfying at least one of physical properties such as high stability to heat and light, a high clearing point (or high maximum temperature), low minimum temperature of a liquid crystal phase, small viscosity, suitable optical anisotropy, large dielectric anisotropy, a suitable elastic constant and excellent compatibility with other liquid crystal compounds, a liquid crystal composition containing the compound and a liquid crystal display device including the composition.

A compound, represented by formula (1):

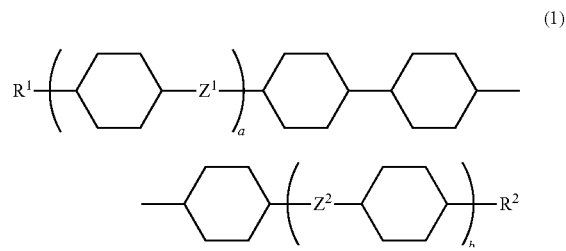

wherein, in formula (1), $R^1$ is alkoxy having 1 to 9 carbons or the like; $R^2$ is alkenyl having 2 to 10 carbons; $Z^1$ and $Z^2$ are independently a single bond, $-CH_2CH_2-$, $-CH=CH-$ or the like; and a and b are independently 0 or 1.

14 Claims, No Drawings

LIQUID CRYSTAL COMPOUND HAVING TERCYCLOHEXYL, LIQUID CRYSTAL COMPOSITION AND LIQUID CRYSTAL DISPLAY DEVICE

RELATED APPLICATIONS

This application claims priority to Japanese Patent Application No. JP-2016-046832, filed on Mar. 10, 2016; the contents of which are all herein incorporated by this reference in their entireties. All publications, patents, patent applications, databases and other references cited in this application, all related applications referenced herein, and all references cited therein, are incorporated by reference in their entirety as if restated here in full and as if each individual publication, patent, patent application, database or other reference were specifically and individually indicated to be incorporated by reference.

TECHNICAL FIELD

The invention relates to a liquid crystal compound, a liquid crystal composition and a liquid crystal display device. More specifically, the invention relates to a liquid crystal compound having tercyclohexyl, a liquid crystal composition that contains the compound and has a nematic phase, and a liquid crystal display device including the composition.

A liquid crystal display device has been widely used in a display of a personal computer, a television and so forth. The device utilizes physical properties such as optical anisotropy and dielectric anisotropy of a liquid crystal compound. As an operating mode of the liquid crystal display device, such a mode exists as a phase change (PC) mode, a twisted nematic (TN) mode, a super twisted nematic (STN) mode, a bistable twisted nematic (BTN) mode, an electrically controlled birefringence (ECB) mode, an optically compensated bend (OCB) mode, an in-plane switching (IPS) mode, a vertical alignment (VA) mode, a fringe field switching (FFS) mode and a polymer sustained alignment (PSA) mode. A liquid crystal composition containing a polymer is used in a device having the PSA mode. In the composition, alignment of liquid crystal molecules can be controlled by the polymer.

In such a liquid crystal display device, a liquid crystal composition having suitable physical properties is used. In order to further improve characteristics of the device, the liquid crystal compound contained in the composition preferably has physical properties described in (1) to (8) below: (1) high stability to heat and light, (2) a high clearing point, (3) low minimum temperature of a liquid crystal phase, (4) small viscosity ($\eta$), (5) suitable optical anisotropy ($\Delta n$), (6) large dielectric anisotropy ($\Delta\varepsilon$), (7) a suitable elastic constant (K) and (8) excellent compatibility with other liquid crystal compounds.

An effect of physical properties of the liquid crystal compound on the characteristics of the device is as described below. A compound having the high stability to heat and light as described in (1) increases a voltage holding ratio of the device. Thus, a service life of the device becomes longer. A compound having the high clearing point as described in (2) extends a temperature range in which the device can be used. A compound having the low minimum temperature of the liquid crystal phase such as the nematic phase and a smectic phase as described in (3), particular a compound having the low minimum temperature of the nematic phase, also extends the temperature range in which the device can be used. A compound having the small viscosity as described in (4) shortens a response time of the device.

According to a design of the device, a compound having the suitable optical anisotropy, more specifically, a compound having large optical anisotropy or small optical anisotropy as described in (5) is required. When the response time is shortened by decreasing a cell gap of the device, a compound having large optical anisotropy is suitable. A compound having large dielectric anisotropy as described in (6) decreases a threshold voltage of the device. Thus, electric power consumption of the device is reduced. On the other hand, a compound having small dielectric anisotropy shortens the response time of the device by decreasing viscosity of the composition. The compound extends the temperature range in which the device can be used by increasing maximum temperature of the nematic phase.

With regard to (7), a compound having a large elastic constant shortens the response time of the device. A compound having a small elastic constant decreases the threshold voltage of the device. Therefore, the suitable elastic constant is required according to the characteristics that are desirably improved. A compound having the excellent compatibility with other liquid crystal compounds as described in (8) is preferred. The reason is that the physical properties of the composition are adjusted by mixing liquid crystal compounds having different physical properties.

A variety of liquid crystal compounds having both of the high clearing point and the small viscosity have been so far prepared. The reason is that excellent physical properties that are not found in conventional compounds are expected from a new compound. The reason is that a suitable balance is expected to be obtained regarding at least two of physical properties in the composition by adding the new compound to a liquid crystal composition. In view of such a situation, with regard to the physical properties (1) to (8) described above, a compound having excellent physical properties and the suitable balance has been desired.

Patent literature No. 1 describes compound (S-1). Moreover, Patent literature Nos. 2 and 3 describe compound (S-2). Furthermore, Non-patent literature Nos. 1 and 2 describe compound (S-3).

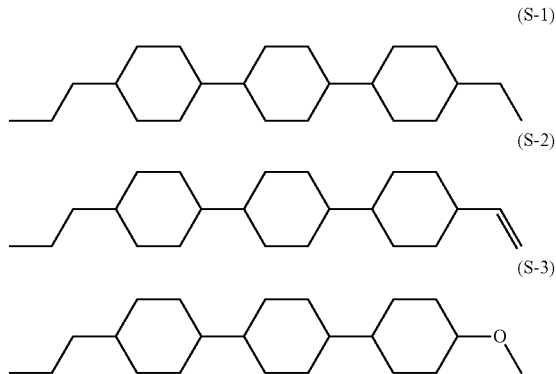

CITATION LIST

Patent Literature

Patent literature No. 1: JP H9-110734 A.
Patent literature No. 2: DE 4414647 A.
Patent literature No. 3: JP H9-52851 A.
Patent literature No. 4: JP H10-204016 A.

Non-Patent Literature

Non-patent literature No. 1: Chemistry Letters, 1997, 8, 827.
Non-patent literature No. 2: Bulletin of the Chemical Society of Japan (2000), 73(8), 1875.

SUMMARY OF INVENTION

Technical Problem

A first object is to provide a liquid crystal compound satisfying at least one of physical properties such as high stability to heat and light, a high clearing point (or high maximum temperature of a nematic phase), low minimum temperature of a liquid crystal phase, small viscosity, suitable optical anisotropy, large dielectric anisotropy, a suitable elastic constant and excellent compatibility with other liquid crystal compounds. The object is to provide a compound having a wider temperature range of the nematic phase and the excellent compatibility with other liquid crystal compounds in comparison with a similar compound. A second object is to provide a liquid crystal composition that contains the compound and satisfies at least one of physical properties such as high stability to heat and light, high maximum temperature of the nematic phase, low minimum temperature of the nematic phase, small viscosity, suitable optical anisotropy, large dielectric anisotropy, large specific resistance and the suitable elastic constant. The object is to provide a liquid crystal composition having a suitable balance regarding at least two of the physical properties. A third object is to provide a liquid crystal display device including the composition and having a wide temperature range in which the device can be used, a short response time, a large voltage holding ratio, low threshold voltage, a large contrast ratio, a small flicker rate and a long service life.

Solution to Problem

The invention concerns a compound represented by formula (1), a liquid crystal composition containing the compound, and a liquid crystal display device including the composition:

Advantageous Effects of Invention

A first advantage is to provide a liquid crystal compound satisfying at least one of physical properties such as high stability to heat and light, a high clearing point (or high maximum temperature of a nematic phase), low minimum temperature of a liquid crystal phase, small viscosity, suitable optical anisotropy, large dielectric anisotropy, a suitable elastic constant and excellent compatibility with other liquid crystal compounds. The advantage is to provide a compound having a wider temperature range of the nematic phase and the excellent compatibility with other liquid crystal compounds in comparison with a similar compound (see Comparative Example 1). A second advantage is to provide a liquid crystal composition that contains the compound and satisfies at least one of physical properties such as high stability to heat and light, high maximum temperature of the nematic phase, low minimum temperature of the nematic phase, small viscosity, suitable optical anisotropy, large dielectric anisotropy, large specific resistance and the suitable elastic constant. The advantage is to provide a liquid crystal composition having a suitable balance regarding at least two of the physical properties. A third advantage is to provide a liquid crystal display device including the composition and having a wide temperature range in which the device can be used, a short response time, a large voltage holding ratio, low threshold voltage, a large contrast ratio, a small flicker rate and a long service life.

DESCRIPTION OF EMBODIMENTS

Usage of terms herein is as described below. Terms "liquid crystal compound," "liquid crystal composition" and "liquid crystal display device" may be occasionally abbreviated as "compound," "composition" and "device," respectively. "Liquid crystal compound" is a generic term for a compound having a liquid crystal phase such as a nematic phase and a smectic phase, and a compound having no liquid crystal phase but to be added for the purpose of adjusting physical properties of a composition such as maximum temperature, minimum temperature, viscosity and dielectric

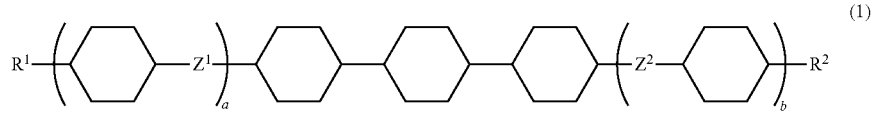

(1)

wherein, in formula (1), $R^1$ is a group in which at least one piece of —$CH_2$— of alkyl having 1 to 10 carbons is replaced by —O—, and in the group, at least one piece of —$CH_2CH_2$— may be replaced by —CH=CH—, and at least one piece of hydrogen may be replaced by fluorine;

$R^2$ is alkenyl having 2 to 10 carbons, and in the group, at least one piece of hydrogen bonding with carbon forming a double bond may be replaced by fluorine or chlorine;

$Z^1$ and $Z^2$ are independently a single bond, —$CH_2CH_2$—, —CH=CH—, —$OCH_2$—, —$CH_2O$—, —C≡C—, —COO—, —OCO—, —$CF_2O$—, —$OCF_2$—, —$CF_2CF_2$—, —CF=CF—, —$(CH_2)_4$—, —CH=CH—$(CH_2)_2$— or —$(CH_2)_2$—CH=CH—; and a and b are independently 0 or 1.

anisotropy. The compound has a six-membered ring such as 1,4-cyclohexylene and 1,4-phenylene, and has rod-like molecular structure. "Liquid crystal display device" is a generic term for a liquid crystal display panel and a liquid crystal display module. "Polymerizable compound" is a compound to be added for the purpose of forming a polymer in the composition.

The liquid crystal composition is prepared by mixing a plurality of liquid crystal compounds. An additive is added to the composition for the purpose of further adjusting the physical properties. The additive such as an optically active compound, an antioxidant, an ultraviolet light absorber, a dye, an antifoaming agent, the polymerizable compound, a polymerization initiator, a polymerization inhibitor and a polar compound is added when necessary. The liquid crystal compound and the additive are mixed in such a procedure. A proportion (content) of the liquid crystal compounds is expressed in terms of weight percent (% by weight) based on the weight of the liquid crystal composition containing no additive, even after the additive has been added. A proportion (amount of addition) of the additive is expressed in terms of weight percent (% by weight) based on the weight of the liquid crystal composition containing no additive. Weight parts per million (ppm) may be occasionally used. A proportion of the polymerization initiator and the polymerization inhibitor is exceptionally expressed based on the weight of the polymerizable compound.

"Clearing point" is a transition temperature between the liquid crystal phase and an isotropic phase in the liquid crystal compound. "Minimum temperature of the liquid crystal phase" is a transition temperature between a solid and the liquid crystal phase (the smectic phase, the nematic phase or the like) in the liquid crystal compound. "Maximum temperature of the nematic phase" is a transition temperature between the nematic phase and the isotropic phase in a mixture of the liquid crystal compound and a base liquid crystal or in the liquid crystal composition, and may be occasionally abbreviated as "maximum temperature." "Minimum temperature of the nematic phase" may be occasionally abbreviated as "minimum temperature." An expression "increase the dielectric anisotropy" means that a value of dielectric anisotropy positively increases in a composition having positive dielectric anisotropy, and the value of dielectric anisotropy negatively increases in a composition having negative dielectric anisotropy.

A compound represented by formula (1) may be occasionally abbreviated as compound (1). At least one compound selected from the group of compounds represented by formula (1) may be occasionally abbreviated as compound (1). "Compound (1)" means one compound, a mixture of two compounds or a mixture of three or more compounds represented by formula (1). A same rule applies also to any other compound represented by any other formula. In formulas (1) to (15), a symbol such as $A^1$, $B^1$ and $C^1$ surrounded by a hexagonal shape corresponds to ring $A^1$, ring $B^1$ and ring $C^1$, respectively. The hexagonal shape represents a six-membered ring such as cyclohexane or benzene. The hexagonal shape may occasionally represents a condensed ring such as naphthalene or a bridged ring such as adamantane.

A symbol of terminal group $R^{11}$ is used in a plurality of compounds in chemical formulas. In the compounds, two groups represented by two pieces of arbitrary $R^{11}$ may be identical or different. For example, in one case, $R^{11}$ of compound (2) is ethyl and $R^{11}$ of compound (3) is ethyl. In another case, $R^{11}$ of compound (2) is ethyl and $R^{11}$ of compound (3) is propyl. A same rule applies also to a symbol such as $R^{12}$, $R^{13}$ and $Z^{11}$. In compound (8), when i is 2, two of ring $D^1$ exists. In the compound, two groups represented by two of ring $D^1$ may be identical or different. A same rule applies also to two of arbitrary ring $D^1$ when i is larger than 2. A same rule applies also to other symbols.

An expression "at least one piece of 'A'" means that the number of 'A' is arbitrary. An expression "at least one piece of 'A' may be replaced by 'B'" means that, when the number of 'A' is 1, a position of 'A' is arbitrary, and also when the number of 'A' is 2 or more, positions thereof can be selected without restriction. A same rule applies also to an expression "at least one piece of 'A' is replaced by 'B'." An expression "at least one piece of 'A' may be replaced by 'B', 'C' or 'D'" includes a case where arbitrary 'A' is replaced by 'B', a case where arbitrary 'A' is replaced by 'C', and a case where arbitrary 'A' is replaced by 'D', and also a case where a plurality of pieces of 'A' are replaced by at least two pieces of 'B', 'C' and/or 'D'. For example, "alkyl in which at least one piece of —$CH_2$— may be replaced by —O— or —CH=CH—" includes alkyl, alkoxy, alkoxyalkyl, alkenyl, alkoxyalkenyl and alkenyloxyalkyl. In addition, a case where two pieces of consecutive —$CH_2$— are replaced by —O— to form —O—O— is not preferred. In alkyl or the like, a case where —$CH_2$— of a methyl part (—$CH_2$—H) is replaced by —O— to form —O—H is not preferred, either.

Halogen means fluorine, chlorine, bromine and iodine. Preferred halogen is fluorine and chlorine. Further preferred halogen is fluorine. Alkyl of the liquid crystal compound is straight-chain alkyl or branched-chain alkyl, but includes no cyclic alkyl. In general, straight-chain alkyl is preferred to branched-chain alkyl. A same rule applies also to a terminal group such as alkoxy and alkenyl. With regard to a configuration of 1,4-cyclohexylene, trans is preferred to cis for increasing the maximum temperature. Then, 2-fluoro-1,4-phenylene means two divalent groups described below. In a chemical formula, fluorine may be leftward (L) or rightward (R). A same rule applies also to an asymmetrical divalent group formed by removing two pieces of hydrogen from a ring, such as tetrahydropyran-2,5-diyl.

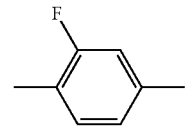

(L)

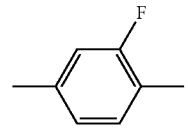

(R)

The invention includes items described below.

Item 1. A compound, represented by formula (1):

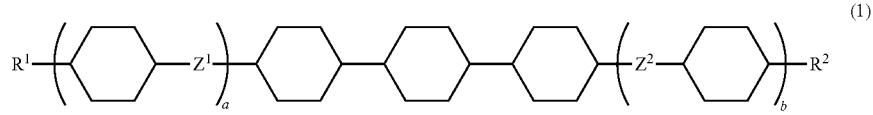

(1)

wherein, in formula (1), $R^1$ is a group in which at least one piece of —$CH_2$— of alkyl having 1 to 10 carbons is replaced by —O—, and in the group, at least one piece of —$CH_2CH_2$— may be replaced by —CH=CH—, and at least one piece of hydrogen may be replaced by fluorine;

$R^2$ is alkenyl having 2 to 10 carbons, and in the group, at least one piece of hydrogen bonding with carbon forming a double bond may be replaced by fluorine or chlorine;

$Z^1$ and $Z^2$ are independently a single bond, —$CH_2CH_2$—, —CH=CH—, —$OCH_2$—, —$CH_2O$—, —C≡C—, —COO—, —OCO—, —CF$_2$O—, —OCF$_2$—, —CF$_2$CF$_2$—, —CF=CF—, —(CH$_2$)$_4$—, —CH=CH—(CH$_2$)$_2$— or —(CH$_2$)$_2$—CH=CH—; and a and b are independently 0 or 1.

Item 2. The compound according to item 1, wherein, in formula (1),

R$^1$ is alkoxy having 1 to 9 carbons, alkoxyalkyl having 1 to 9 carbons, alkenyloxy having 2 to 9 carbons or alkenyloxyalkyl having 2 to 9 carbons, and in the groups, at least one piece of hydrogen may be replaced by fluorine;

R$^2$ is alkenyl having 2 to 10 carbons, and in the group, at least one piece of hydrogen bonding with carbon forming a double bond may be replaced by fluorine;

Z$^1$ and Z$^2$ are independently a single bond, —CH$_2$CH$_2$—, —CH=CH—, —OCH$_2$— or —CH$_2$O—; and a and b are independently 0 or 1.

Item 3. The compound according to item 1, represented by any one of formulas (1-1) to (1-4):

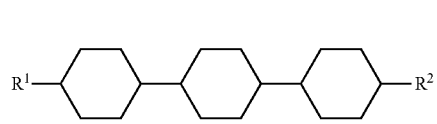
(1-1)

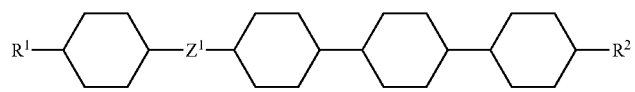
(1-2)

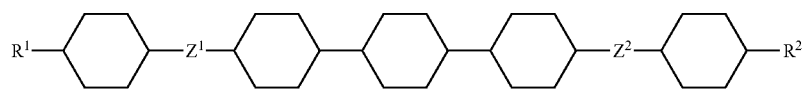
(1-3)

(1-4)

wherein, in formulas (1-1) to (1-4),

R$^1$ is alkoxy having 1 to 9 carbons or alkenyloxy having 2 to 9 carbons, and in the groups, at least one piece of hydrogen may be replaced by fluorine;

R$^2$ is alkenyl having 2 to 10 carbons, and in the group, at least one piece of hydrogen bonding with carbon forming a double bond may be replaced by fluorine; and Z$^1$ and Z$^2$ are independently a single bond, —CH$_2$CH$_2$—, —CH=CH—, —OCH$_2$— or —CH$_2$O—.

Item 4. The compound according to item 1, represented by any one of formulas (1-5) to (1-10):

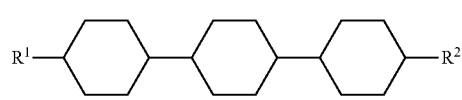
(1-5)

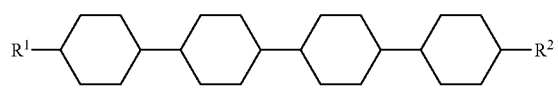
(1-6)

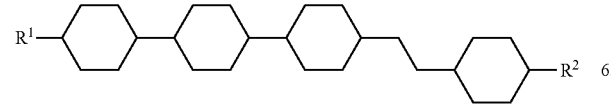
(1-7)

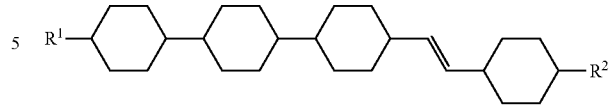
(1-8)

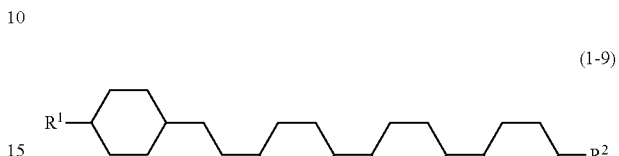
(1-9)

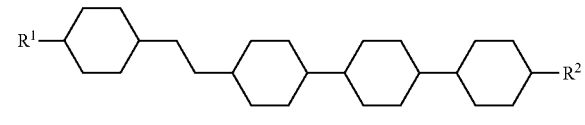
(1-10)

wherein, in formulas (1-5) to (1-10),

R$^1$ is alkoxy having 1 to 9 carbons or alkenyloxy having 2 to 9 carbons; and

R$^2$ is alkenyl having 2 to 10 carbons, and in the group, at least one piece of hydrogen bonding with carbon forming a double bond may be replaced by fluorine.

Item 5. The compound according to item 1, represented by any one of formulas (1-11) to (1-14):

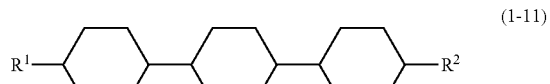
(1-11)

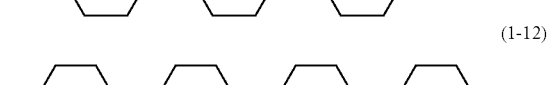
(1-12)

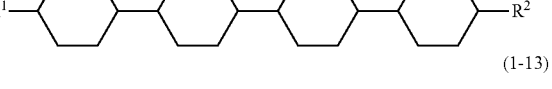
(1-13)

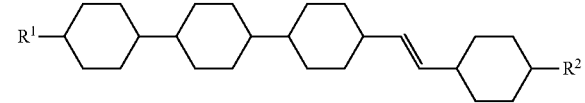

-continued (1-14)
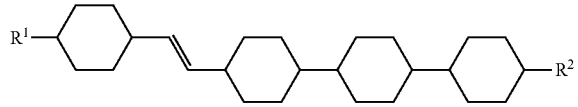

wherein, in formulas (1-11) to (1-14), $R^1$ is alkoxy having 1 to 9 carbons; and $R^2$ is alkenyl having 2 to 10 carbons, and in the group, at least one piece of hydrogen bonding with carbon forming a double bond may be replaced by fluorine.

Item 6. The compound according to any one of items 1 to 5, represented by any one of formulas (1-15) to (1-22):

(1-15)

(1-16)

(1-17)

(1-18)

(1-19)

(1-20)

(1-21)

(1-22)

wherein, in formulas (1-15) to (1-22), $R^3$ is alkyl having 1 to 9 carbons.

Item 7. The compound according to item 1, represented by any one of formulas (1-23)

(1-23)
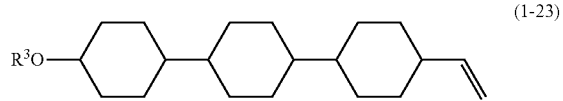

(1-24)
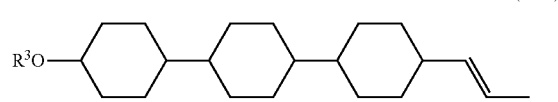

(1-25)
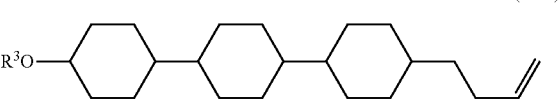

(1-26)
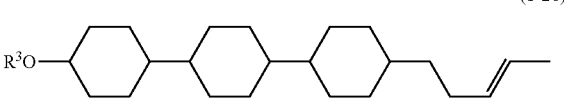

wherein, in formulas (1-23) to (1-26), $R^3$ is alkyl having 1 to 6 carbons.

Item 8. A liquid crystal composition, containing at least one compound according to any one of items 1 to 7.

Item 9. The liquid crystal composition according to item 8, further containing at least one compound selected from the group of compounds represented by formulas (2) to (4):

(2)
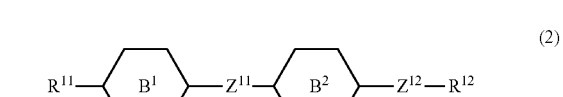

(3)
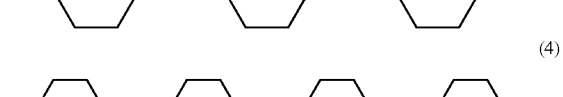

(4)
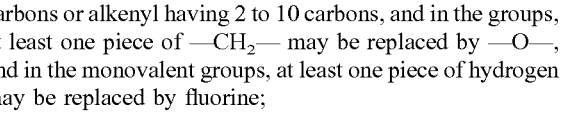

wherein, in formulas (2) to (4), $R^{11}$ and $R^{12}$ are independently alkyl having 1 to 10 carbons or alkenyl having 2 to 10 carbons, and in the groups, at least one piece of —$CH_2$— may be replaced by —O—, and in the monovalent groups, at least one piece of hydrogen may be replaced by fluorine;

ring $B^1$, ring $B^2$, ring $B^3$ and ring $B^4$ are independently 1,4-cyclohexylene, 1,4-phenylene, 2-fluoro-1,4-phenylene, 2,5-difluoro-1,4-phenylene or pyrimidine-2,5-diyl; and $Z^{11}$, $Z^{12}$ and $Z^{13}$ are independently a single bond, —COO—, —$CH_2CH_2$—, —CH=CH— or —C≡C—; and in formula (3), when all of ring $B^1$, ring $B^2$ and ring $B^3$ are 1,4-cyclohexylene, $R^{11}$ and $R^{12}$ are independently alkyl having 1 to 10 carbons or alkenyl having 2 to 10 carbons, and in the monovalent groups, at least one piece of hydrogen may be replaced by fluorine; and in formula (4), when all of ring $B^1$, ring $B^2$, ring $B^3$ and ring $B^4$ are 1,4-cyclohexylene, $R^{11}$ and $R^{12}$ are independently alkyl having 1 to 10 carbons or alkenyl having 2 to 10 carbons, and in the monovalent groups, at least one piece of hydrogen may be replaced by fluorine.

Item 10. The liquid crystal composition according to item 8 or 9, further containing at least one compound selected from the group of compounds represented by formulas (5) to (7):

(5)
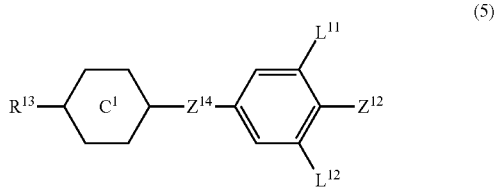

(6)
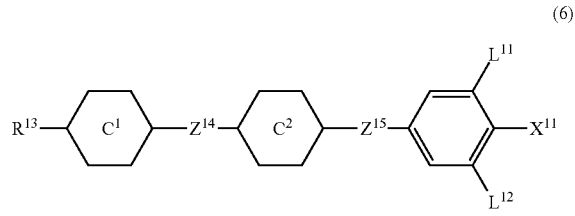

(7)
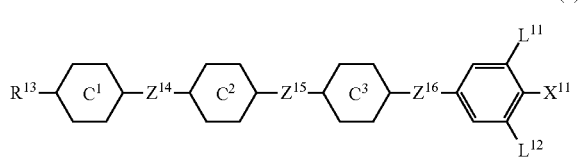

wherein, in formulas (5) to (7), $R^{13}$ is alkyl having 1 to 10 carbons or alkenyl having 2 to 10 carbons, and in the groups, at least one piece of —$CH_2$— may be replaced by —O—, and in the monovalent groups, at least one piece of hydrogen may be replaced by fluorine;

$X^{11}$ is fluorine, chlorine, —$OCF_3$, —$OCHF_2$, —$CF_3$, —$CHF_2$, —$CH_2F$, —$OCF_2CHF_2$ or —$OCF_2CHFCF_3$;

ring $C^1$, ring $C^2$ and ring $C^3$ are independently 1,4-cyclohexylene, 1,4-phenylene, 1,4-phenylene in which at least one piece of hydrogen is replaced by fluorine, tetra-hydropyran-2,5-diyl, 1,3-dioxane-2,5-diyl or pyrimidine-2,5-diyl;

$Z^{14}$, $Z^{15}$ and $Z^{16}$ are independently a single bond, —COO—, —OCO—, —$CH_2O$—, —$OCH_2$—, —$CF_2O$—, —$OCF_2$—, —$CH_2CH_2$—, —CH=CH—, —C≡C— or —$(CH_2)_4$—; and $L^{11}$ and $L^{12}$ are independently hydrogen or fluorine.

Item 11. The liquid crystal composition according to any one of items 8 to 10, further containing at least one compound selected from the group of compounds represented by formula (8):

(8)
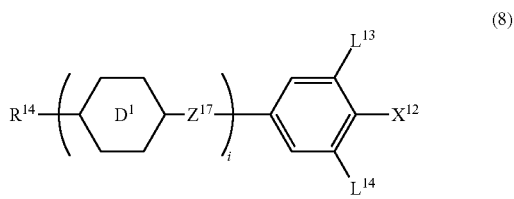

wherein, in formula (8), $R^{14}$ is alkyl having 1 to 10 carbons or alkenyl having 2 to 10 carbons, and in the groups, at least one piece of —$CH_2$— may be replaced by —O—, and in the monovalent groups, at least one piece of hydrogen may be replaced by fluorine;

$X^{12}$ is —C≡N or —C≡C—C≡N;

ring $D^1$ is 1,4-cyclohexylene, 1,4-phenylene, 1,4-phenylene in which at least one piece of hydrogen is replaced by fluorine, tetrahydropyran-2,5-diyl, 1,3-dioxane-2,5-diyl or pyrimidine-2,5-diyl;

$Z^{17}$ is a single bond, —COO—, —OCO—, —$CH_2O$—, —$OCH_2$—, —$CF_2O$—, —$OCF_2$—, —$CH_2CH_2$— or —C≡C—;

$L^{13}$ and $L^{14}$ are independently hydrogen or fluorine; and i is 1, 2, 3 or 4.

Item 12. The liquid crystal composition according to any one of items 8 to 11, further containing at least one compound selected from the group of compounds represented by formulas (9) to (15):

(9)
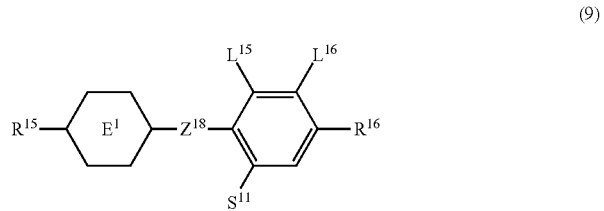

(10)
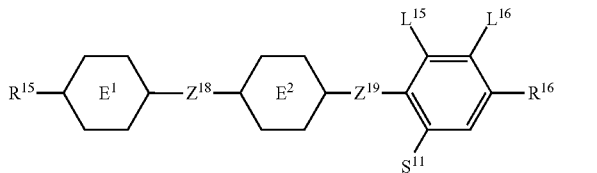

(11)
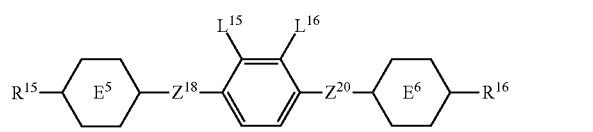

(12)
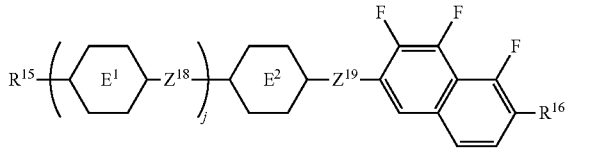

(13)
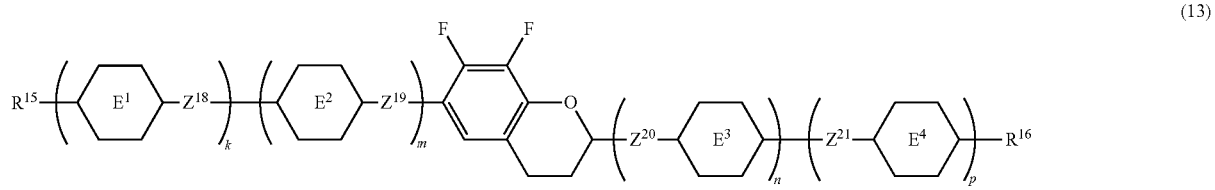

-continued

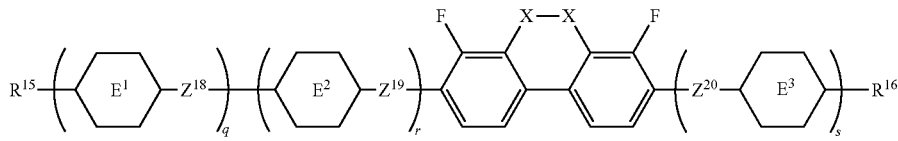

(14)

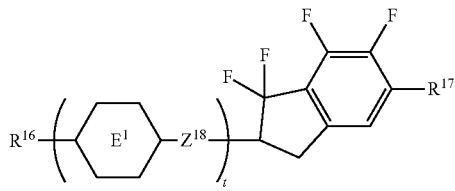

(15)

wherein, in formulas (9) to (15), $R^{15}$ and $R^{16}$ are independently alkyl having 1 to 10 carbons or alkenyl having 2 to 10 carbons, and in the groups, at least one piece of —CH$_2$— may be replaced by —O—, and in the monovalent groups, at least one piece of hydrogen may be replaced by fluorine;

$R^{17}$ is hydrogen, fluorine, alkyl having 1 to 10 carbons or alkenyl having 2 to 10 carbons, and in the alkyl and the alkenyl, at least one piece of —CH$_2$— may be replaced by —O—, and in the monovalent groups, at least one piece of hydrogen may be replaced by fluorine;

ring $E^1$, ring $E^2$, ring $E^3$ and ring $E^4$ are independently 1,4-cyclohexylene, 1,4-cyclohexenylene, 1,4-phenylene, 1,4-phenylene in which at least one piece of hydrogen is replaced by fluorine, tetrahydropyran-2,5-diyl or decahydronaphthalene-2,6-diyl;

ring $E^5$ and ring $E^6$ are independently 1,4-cyclohexylene, 1,4-cyclohexenylene, 1,4-phenylene, tetrahydropyran-2,5-diyl or decahydronaphthalene-2,6-diyl;

$Z^{18}$, $Z^{19}$, $Z^{20}$ and $Z^{21}$ are independently a single bond, —COO—, —OCO—, —CH$_2$O—, —OCH$_2$—, —CF$_2$O—, —OCF$_2$—, —CH$_2$CH$_2$—, —CF$_2$OCH$_2$CH$_2$— or —OCF$_2$CH$_2$CH$_2$—;

$L^{15}$ and $L^{16}$ are independently fluorine or chlorine;

$S^{11}$ is hydrogen or methyl;

X is —CHF— or —CF$_2$—; and j, k, m, n, p, q, r and s are independently 0 or 1, a sum of k, m, n and p is 1 or 2, a sum of q, r and s is 0, 1, 2 or 3, and t is 1, 2 or 3.

Item 13. The liquid crystal composition according to any one of items 8 to 12, further containing at least one additive selected from the group of a polymerizable compound, a polymerization initiator, a polymerization inhibitor, an optically active compound, an antioxidant, an ultraviolet light absorber, a light stabilizer, a heat stabilizer, a dye and an antifoaming agent.

Item 14. A liquid crystal display device, including the liquid crystal composition according to any one of items 8 to 13.

The invention further includes the following items: (a) the composition, further containing one, two or at least three additives selected from the group of a polymerizable compound, a polymerization initiator, a polymerization inhibitor, an optically active compound, an antioxidant, an ultraviolet light absorber, a light stabilizer, a heat stabilizer, a dye and an antifoaming agent; (b) the liquid crystal composition, wherein a maximum temperature of a nematic phase is 70° C. or more, an optical anisotropy (measured at 25° C.) at a wavelength of 589 nanometers is 0.07 or more, and a dielectric anisotropy (measured at 25° C.) at a frequency of 1 kHz is 2 or more; and (c) the liquid crystal display device, wherein an operating mode in the liquid crystal display device includes a TN mode, an ECB mode, an OCB mode, an IPS mode, a VA mode, an FFS mode or an FPA mode, and a driving mode in the liquid crystal display device includes an active matrix (AM) mode.

An aspect of compound (1), a synthesis method of compound (1), the liquid crystal composition and the liquid crystal display device will be described in the order.

1. Aspect of Compound (1)

Compound (1) of the invention has tercyclohexyl structure. Compound (1) has a feature of having a wide temperature range of a nematic phase and excellent compatibility with other liquid crystal compounds in comparison with a similar compound (see Comparative Example 1). Preferred examples of compound (1) will be described. Preferred examples of terminal groups $R^1$ and $R^2$, bonding groups $Z^1$ and $Z^2$ and a combination of a and b in compound (1) are also applied to a subordinate formula of formula (1) for compound (1). In compound (1), physical properties can be arbitrarily adjusted by suitably combining the groups. Compound (1) may contain a larger amount of isotope such as $^2$H (deuterium) and $^{13}$C than the amount of natural abundance because no significant difference exists in the physical properties of the compound. In addition, symbols in compound (1) are defined according to item 1.

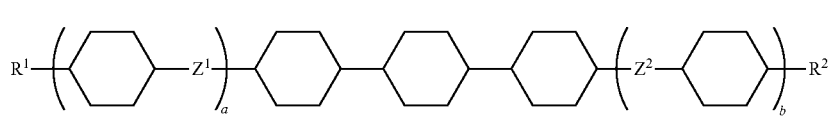

(1)

In formula (1), $R^1$ is a group in which at least one piece of —CH$_2$— of alkyl having 1 to 10 carbons is replaced by —O—, and in the group, at least one piece of —CH$_2$CH$_2$— may be replaced by —CH=CH—.

Specific examples of $R^1$ include alkoxy, alkoxyalkyl, alkoxyalkoxy, alkenyloxy, alkenyloxyalkyl and alkoxyalkenyl. Preferred $R^1$ is alkoxy, alkoxyalkyl, alkenyloxy or alkenyloxyalkyl. Further preferred $R^1$ is alkoxy, alkoxyalkyl or alkenyloxy. Particularly preferred $R^1$ is alkoxy or alkenyloxy. Most preferred $R^1$ is alkoxy.

Preferred alkoxy is —$OCH_3$, —$OC_2H_5$, —$OC_3H_7$, —$OC_4H_9$, —$OC_5H_{11}$, —$OC_6H_{13}$ or —$OC_7H_{15}$.

Preferred alkoxyalkyl is —$CH_2OCH_3$, —$CH_2OC_2H_5$, —$CH_2OC_3H_7$, —$(CH_2)_2$—$OCH_3$, —$(CH_2)_2$—$OC_2H_5$, —$(CH_2)_2$—$OC_3H_7$, —$(CH_2)_3$—$OCH_3$, —$(CH_2)_4$—$OCH_3$ or —$(CH_2)_5$—$OCH_3$.

Preferred alkenyloxy is —$OCH_2CH$=$CH_2$, —$OCH_2CH$=$CHCH_3$ or —$OCH_2CH$=$CHC_2H_5$.

Preferred alkenyl is —$CH$=$CH_2$, —$CH$=$CHCH_3$, —$CH_2CH$=$CH_2$, —$CH$=$CHC_2H_5$, —$CH_2CH$=$CHCH_3$, —$(CH_2)_2$—$CH$=$CH_2$, —$CH$=$CHC_3H_7$, —$CH_2CH$=$CHC_2H_5$, —$(CH_2)_2$—$CH$=$CHCH_3$ or —$(CH_2)_3$—$CH$=$CH_2$.

Preferred $R^1$ is —$OCH_3$, —$OC_2H_5$, —$OC_3H_7$, —$OC_4H_9$, —$OC_5H_{11}$, —$CH_2OCH_3$, —$OCH_2CH$=$CH_2$, —$OCH_2CH$=$CHCH_3$ or —$OCH_2CH$=$CHC_2H_5$. Further preferred $R^1$ is —$OCH_3$, —$OC_2H_5$, —$OC_3H_7$ or —$OC_4H_9$.

When $R^1$ has the straight chain, a temperature range of the liquid crystal phase is wide and the viscosity is small. When $R^1$ has the branched chain, compatibility with other liquid crystal compounds is good. A compound in which $R^1$ is optically active is useful as a chiral dopant. A reverse twisted domain to be generated in the liquid crystal display device can be prevented by adding the compound to the composition. A compound in which $R^1$ is not optically active is useful as a component of the composition.

A preferred configuration of —CH=CH— in the alkenyl depends on a position of a double bond. A trans configuration is preferred in alkenyl having the double bond in an odd-numbered position, such as —$CH$=$CHCH_3$, —$CH$=$CHC_2H_5$, —$CH$=$CHC_3H_7$, —$CH$=$CHC_4H_9$, —$C_2H_4CH$=$CHCH_3$ and —$C_2H_4CH$=$CHC_2H_5$. A cis configuration is preferred in alkenyl having the double bond in an even-numbered position, such as —$CH_2CH$=$CHCH_3$, —$CH_2CH$=$CHC_2H_5$ and —$CH_2CH$=$CHC_3H_7$. An alkenyl compound having a preferred configuration has a high clearing point or a wide temperature range of the liquid crystal phase. A detailed description is found in Mol. Cryst. Liq. Cryst., 1985, 131, 109 and Mol. Cryst. Liq. Cryst., 1985, 131, 327.

In formula (1), $R^2$ is alkenyl having 2 to 10 carbons, and in the group, at least one piece of hydrogen bonding with carbon forming a double bond may be replaced by fluorine or chlorine.

Preferred alkenyl is —$CH$=$CH_2$, —$CH$=$CHCH_3$, —$CH_2CH$=$CH_2$, —$CH$=$CHC_2H_5$, —$CH_2CH$=$CHCH_3$, —$(CH_2)_2$—$CH$=$CH_2$, —$CH$=$CHC_3H_7$, —$CH_2CH$=$CHC_2H_5$, —$(CH_2)_2$—$CH$=$CHCH_3$, —$(CH_2)_3$—$CH$=$CH_2$, —$CH$=$CH$—$(CH_2)_2$—$CH$=$CH_2$, —$CH$=$CH$—$(CH_2)_2$—$CH$=$CHCH_3$, —$(CH_2)_2$—$CH$=$CH$—$(CH_2)_2$—$CH$=$CH_2$ or —$(CH_2)_2$—$CH$=$CH$—$(CH_2)_2$—$CH$=$CHCH_3$.

Preferred $R^2$ is —$CH$=$CH_2$, —$CH$=$CHCH_3$, —$(CH_2)_2$—$CH$=$CH_2$, —$(CH_2)_2$—$CH$=$CHCH_3$, —$CH$=$CH$—$(CH_2)_2$—$CH$=$CH_2$ or —$(CH_2)_2$—$CH$=$CH$—$(CH_2)_2$—$CH$=$CH_2$. Further preferred $R^2$ is —$CH$=$CH_2$, —$CH$=$CHCH_3$, —$(CH_2)_2$—$CH$=$CH_2$ or —$(CH_2)_2$—$CH$=$CHCH_3$.

When $R^2$ has the straight chain, a temperature range of the liquid crystal phase is wide and the viscosity is small. When $R^1$ has the branched chain, compatibility with other liquid crystal compounds is good. A compound in which $R^1$ is optically active is useful as a chiral dopant. A reverse twisted domain to be generated in the liquid crystal display device can be prevented by adding the compound to the composition. A compound in which $R^2$ is not optically active is useful as a component of the composition. A preferred configuration of $R^2$ depends on a position of a double bond. A compound having the preferred configuration has small viscosity, high maximum temperature or wide temperature range of the liquid crystal phase.

A preferred configuration of —CH=CH— in the alkenyl depends on a position of a double bond. A trans configuration is preferred in alkenyl having the double bond in an odd-numbered position, such as —$CH$=$CHCH_3$, —$CH$=$CHC_2H_5$, —$CH$=$CHC_3H_7$, —$CH$=$CHC_4H_9$, —$C_2H_4CH$=$CHCH_3$ and —$C_2H_4CH$=$CHC_2H_5$. A cis configuration is preferred in alkenyl having the double bond in an even-numbered position, such as —$CH_2CH$=$CHCH_3$, —$CH_2CH$=$CHC_2H_5$ and —$CH_2CH$=$CHC_3H_7$. An alkenyl compound having a preferred configuration has the high clearing point or the wide temperature range of the liquid crystal phase. A detailed description is found in Mol. Cryst. Liq. Cryst., 1985, 131, 109 and Mol. Cryst. Liq. Cryst., 1985, 131 and 327.

In formula (1), $Z^1$ and $Z^2$ are independently a single bond, —$CH_2CH_2$—, —$CH$=$CH$—, —$OCH_2$—, —$CH_2O$—, —$C$≡$C$—, —$COO$—, —$OCO$—, —$CF_2O$—, —$OCF_2$—, —$CF_2CF_2$—, —$CF$=$CF$—, —$(CH_2)_4$—, —$CH$=$CH$—$(CH_2)_2$— or —$(CH_2)_2$—$CH$=$CH$—.

Preferred $Z^1$ or $Z^2$ is a single bond, —$CH_2CH_2$—, —$CH$=$CH$—, —$OCH_2$— or —$CH_2O$—. Further preferred $Z^1$ or $Z^2$ is a single bond, —$CH_2CH_2$— or —$CH$=$CH$—. Particularly preferred $Z^1$ or $Z^2$ is a single bond or —$CH$=$CH$—. Most preferred $Z^1$ or $Z^2$ is a single bond.

When $Z^1$ or $Z^2$ is a single bond, —$CH_2CH_2$—, —$OCH_2$—, —$CH_2O$— or —$(CH_2)_4$—, compound (1) has high chemical stability. When $Z^1$ or $Z^2$ is a single bond or —$CH$=$CH$—, compound (1) has the high clearing point, the small viscosity and the excellent compatibility with other liquid crystal compounds. When $Z^1$ or $Z^2$ is —$COO$— or —$OCO$—, compound (1) has the high clearing point.

In formula (1), a and b are independently 0 or 1.

When a sum of a and b is 0, compound (1) has the small viscosity and the excellent compatibility with other liquid crystal compounds. When the sum of a and b is 1, compound (1) has the high clearing point.

Specific examples of preferred compound (1) include compounds (1-5) to (1-10) described in item 4. Specific examples of further preferred compound (1) include compounds (1-11) to (1-14) described in item 5. Specific examples of particularly preferred compound (1) include compounds (1-15) to (1-22) described in item 6. Specific examples of most preferred compound (1) include compounds (1-23) to (1-26) described in item 7.

Compound (1-5) is preferred from a viewpoint of high stability to heat and light, the excellent compatibility with other liquid crystal compounds, and the small viscosity. Compounds (1-6), (1-7) and (1-9) are preferred from a viewpoint of the high stability to heat and light, and the high clearing point. Compounds (1-8) and (1-10) are preferred from a viewpoint of the high clearing point and the excellent compatibility with other liquid crystal compounds.

2. Synthesis of Compound (1)

A synthesis method of compound (1) will be described. Compound (1) can be prepared by suitably combining methods in synthetic organic chemistry. Methods for introducing an objective terminal group, ring and bonding group into a starting material are described in books such as "Organic Syntheses" (John Wiley & Sons, Inc.), "Organic Reactions" (John Wiley & Sons, Inc.), "Comprehensive Organic Synthesis" (Pergamon Press) and "New Experimental Chemistry Course (Shin Jikken Kagaku Koza in Japanese)" (Maruzen Co., Ltd.).

2-1. Formation of Bonding Group Z

First, a scheme is shown with regard to a method for forming bonding groups $Z^1$ to $Z^2$. Next, reactions described in the scheme in methods (1) to (11) are described. In the scheme, $MSG^1$ (or $MSG^2$) is a monovalent organic group having at least one ring. The monovalent organic groups represented by a plurality of $MSG^1$ (or $MSG^2$) used in the scheme may be identical or different. Compounds (1A) to (1J) correspond to compound (1).

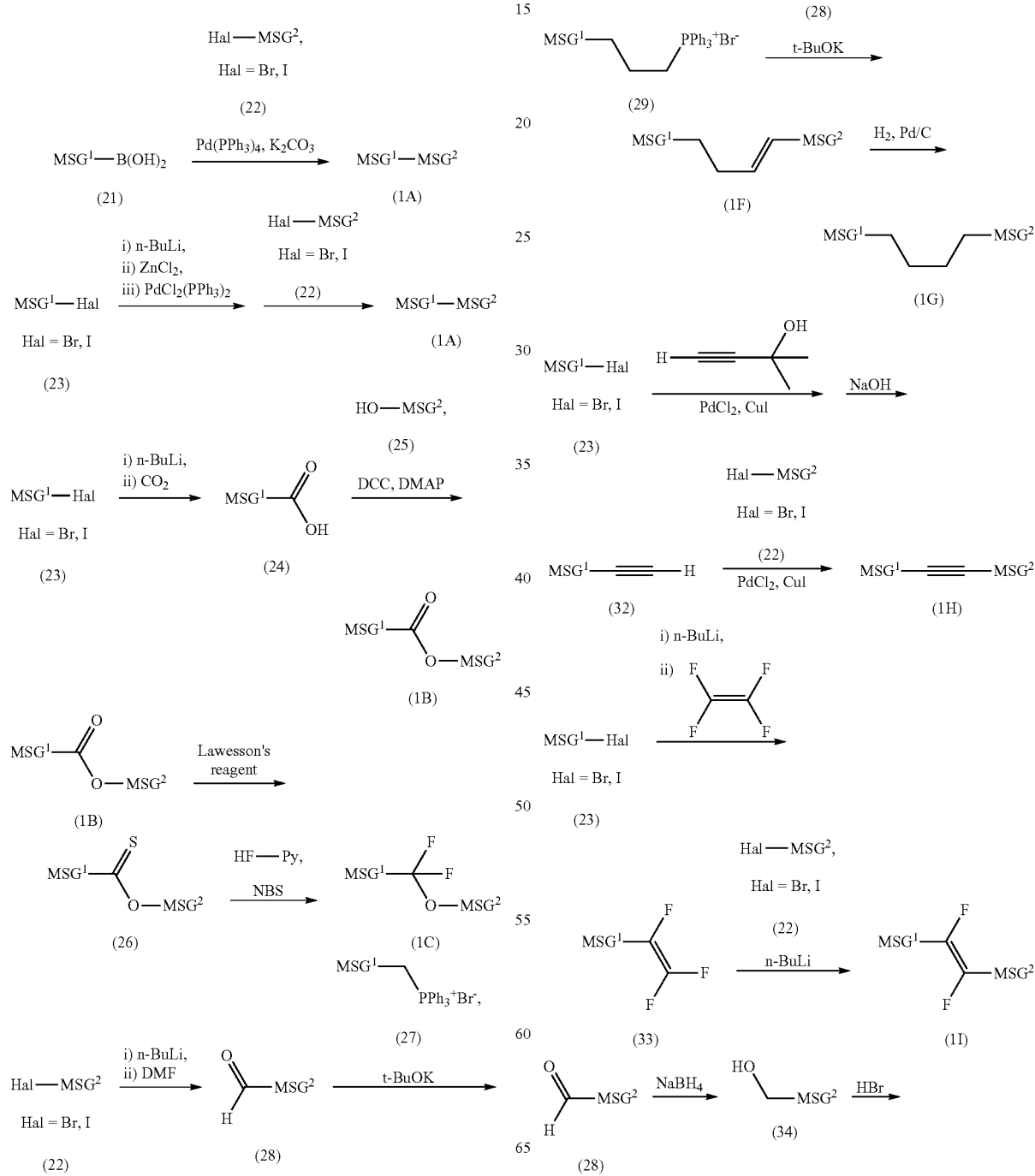

-continued

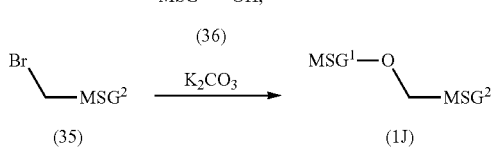

(1) Formation of a Single Bond

Compound (1A) is prepared by allowing aryl boronic acid (21) prepared according to a publicly known method to react with halide (22) in the presence of a carbonate and a catalyst such as tetrakis(triphenylphosphine)palladium. Compound (1A) is also prepared by allowing halide (23) prepared according to a publicly known method to react with n-butyllithium and subsequently with zinc chloride, and further with halide (22) in the presence of a catalyst such as dichlorobis(triphenylphosphine)palladium.

(2) Formation of —COO—

Carboxylic acid (24) is obtained by allowing halide (23) to react with n-butyllithium and subsequently with carbon dioxide. Compound (IB) is prepared by dehydration of compound (25) prepared according to a publicly known method and carboxylic acid (24) in the presence of 1,3-dicyclohexylcarbodiimide (DCC) and 4-dimethylaminopyridine (DMAP).

(3) Formation of —CF$_2$O—

Thionoester (26) is obtained by treating compound (IB) with a thiation reagent such as Lawesson's reagent. Compound (IC) is prepared by fluorinating thionoester (26) with a hydrogen fluoride-pyridine complex and N-bromosuccinimide (NBS). Refer to M. Kuroboshi et al., Chem. Lett., 1992, 827. Compound (IC) is also prepared by fluorinating thionoester (26) with (diethylamino)sulfur trifluoride (DAST). Refer to W. H. Bunnelle et al., J. Org. Chem. 1990, 55, 768. The bonding group can also be formed according to the method described in Peer. Kirsch et al., Angew. Chem. Int. Ed. 2001, 40, 1480.

(4) Formation of —CH=CH—

Aldehyde (28) is obtained by treating halide (22) with n-butyllithium and then allowing the treated halide to react with formamide such as N,N-dimethylformamide (DMF). Phosphorus ylide is generated by treating phosphonium salt (27) prepared according to a publicly known method with a base such as potassium t-butoxide. Compound (ID) is prepared by allowing the phosphorus ylide to react with aldehyde (28). A cis isomer may be generated depending on reaction conditions, and therefore the cis isomer is isomerized into a trans isomer according to a publicly known method when necessary.

(5) Formation of —CH$_2$CH$_2$—

Compound (1E) is prepared by hydrogenating compound (ID) in the presence of a catalyst such as palladium on carbon.

(6) Formation of —(CH$_2$)$_2$—CH=CH— and —(CH$_2$)$_4$—

Compound (1F) is obtained by using phosphonium salt (29) in place of phosphonium salt (27) according to the method in method (4). Compound (1G) is prepared by performing catalytic hydrogenation of the compound obtained.

(7) Formation of —C≡C—

Compound (32) is obtained by allowing halide (23) to react with 2-methyl-3-butyn-2-ol in the presence of a catalyst including dichloropalladium and copper halide, and then performing deprotection under basic conditions. Compound (1H) is prepared by allowing compound (32) to react with halide (22) in the presence of the catalyst including dichloropalladium and copper halide.

(8) Formation of —CF=CF—

Compound (33) is obtained by treating halide (23) with n-butyllithium and then allowing the treated halide to react with tetrafluoroethylene. Compound (1I) is prepared by treating halide (22) with n-butyllithium and then allowing the treated halide to react with compound (33).

(9) Formation of —OCH$_2$—

Compound (34) is obtained by reducing aldehyde (28) with a reducing agent such as sodium borohydride. Bromide (35) is obtained by brominating compound (34) with hydrobromic acid or the like. Compound (1J) is prepared by allowing bromide (35) to react with compound (36) in the presence of a base such as potassium carbonate.

(10) Formation of —CF$_2$CF$_2$—

A compound having —(CF$_2$)$_2$— is obtained by fluorinating diketone (—COCO—) with sulfur tetrafluoride, in the presence of a hydrogen fluoride catalyst, according to the method described in J. Am. Chem. Soc., 2001, 123, 5414.

2-2. Method for Preparing Compound (1)

In compound (1), an example of a method for preparing compound (1-15) in which R$^1$ is alkoxy having 1 to 9 carbons, R$^2$ is —CH=CH$_2$, and both of a and b are 0 is as described below. A Grignard reagent adjusted from compound (52) prepared according to a publicly known method is allowed to act on compound (51) to obtain compound (53). PTSA (p-toluenesulfonic acid monohydrate) is allowed to act on compound (53) in the presence of ethylene glycol, and thus compound (53) is dehydrated to obtain compound (54). Compound (54) is hydrogenated with a Raney nickel catalyst to obtain compound (55). Compound (55) is hydrogenated with a Palladium-on-carbon catalyst to obtain compound (56). Compound (56) is reduced with lithium aluminum hydride to obtain compound (57). Compound (57) is etherified using sodium hydride and alkyl bromide (58) to obtain compound (59). Compound (59) is deprotected with formic acid to obtain compound (60). A Wittig reaction is applied to compound (60) using (methoxymethyl)triphenylphosphonium chloride and potassium t-butoxide to obtain compound (61). PTSA is allowed to act on compound (61) in methanol to obtain compound (62). Formic acid is allowed to act on compound (62) to obtain compound (63), and then the Wittig reaction is applied thereto using methyltriphenylphosphonium bromide and potassium t-butoxide to prepare compound (1-15). In the compounds, a definition of R$^3$ is identical to a definition of a symbol described in item 6.

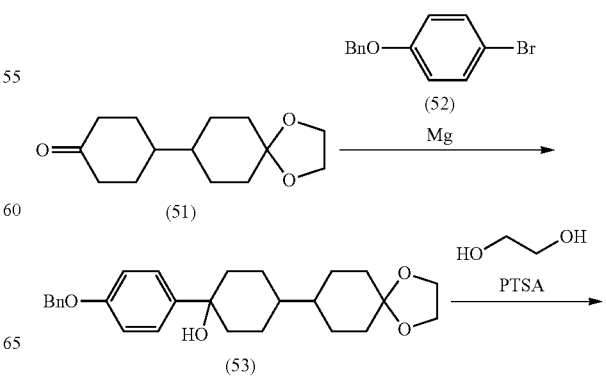

-continued

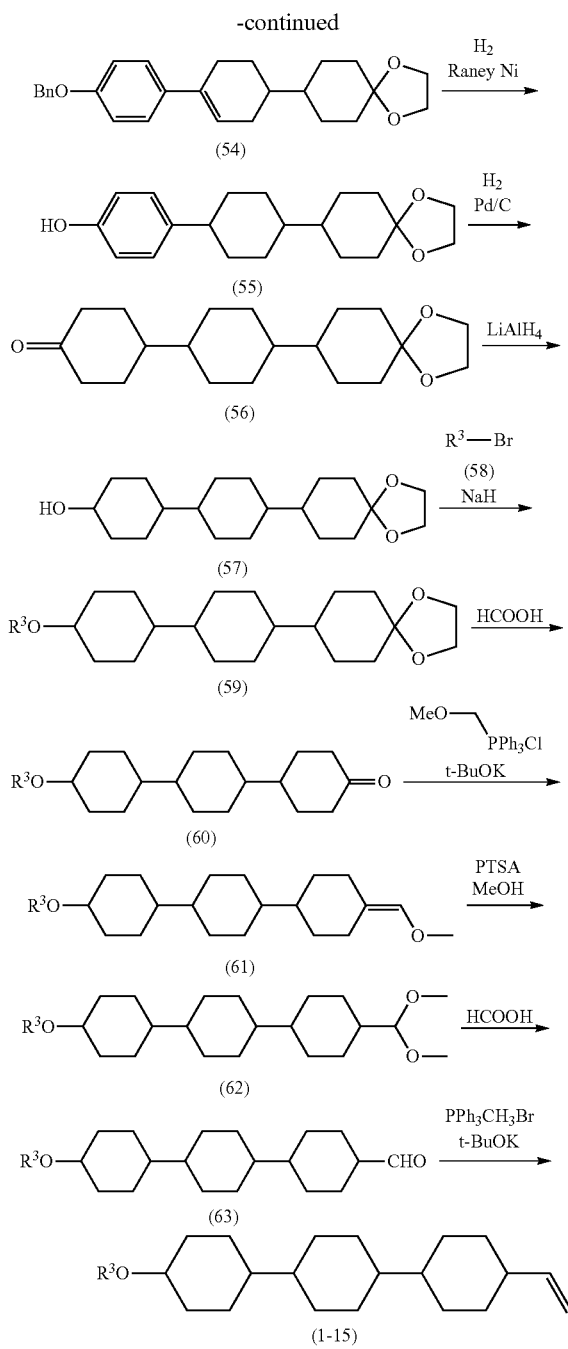

3. Liquid Crystal Composition
3-1. Component Compound

A liquid crystal composition of the invention will be described. The composition contains at least one compound (1) as component A. The composition may contain two, three or more compounds (1). A component in the composition may be only compound (1). In order to develop excellent physical properties, the composition preferably contains at least one of compounds (1) in the range of about 1% by weight to about 99% by weight. In a composition having positive dielectric anisotropy, a preferred content of compound (1) is in the range of about 5% by weight to about 60% by weight. In a composition having negative dielectric anisotropy, a preferred content of compound (1) is about 30% by weight or less.

The composition contains compound (1) as component A, and preferably, further contains a liquid crystal compound selected from components B, C, D and E described below. Component B includes compounds (2) to (4). Component C includes compounds (5) to (7). Component D includes compound (8). Component E includes compounds (9) to (15). The composition may contain any other liquid crystal compound different from compounds (2) to (15). The composition may not contain any other liquid crystal compound. When the composition is prepared, components B, C, D and E are preferably selected by taking into account the positive or negative dielectric anisotropy and magnitude of the dielectric anisotropy. A composition in which the components are suitably selected has high stability to heat and light, high maximum temperature, low minimum temperature, small viscosity, suitable optical anisotropy (more specifically, large optical anisotropy or small optical anisotropy), large dielectric anisotropy, large specific resistance and a suitable elastic constant (more specifically, a large elastic constant or a small elastic constant).

Component B includes a compound in which two terminal groups are alkyl or the like. Preferred examples of component B include compounds (2-1) to (2-11), compounds (3-1) to (3-19) and compounds (4-1) to (4-7). In the compounds, $R^{11}$ and $R^{12}$ are independently alkyl having 1 to 10 carbons or alkenyl having 2 to 10 carbons, and in the groups, at least one piece of —$CH_2$— may be replaced by —O—, and in the monovalent groups, at least one piece of hydrogen may be replaced by fluorine.

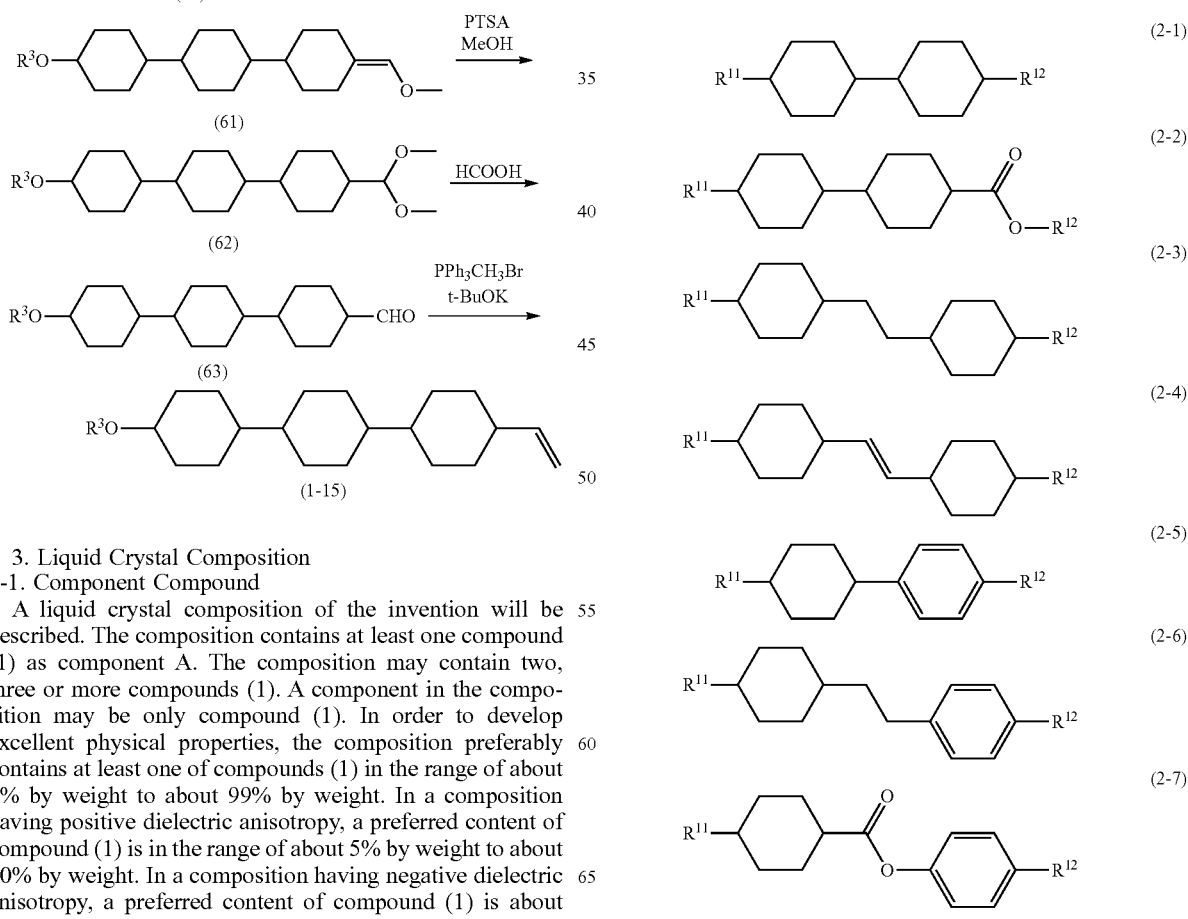

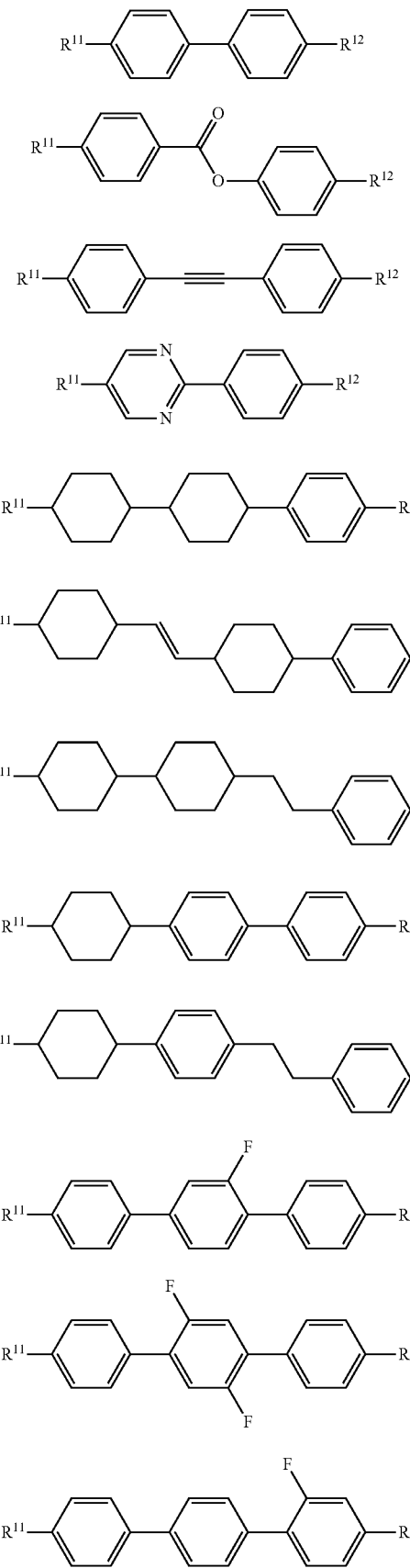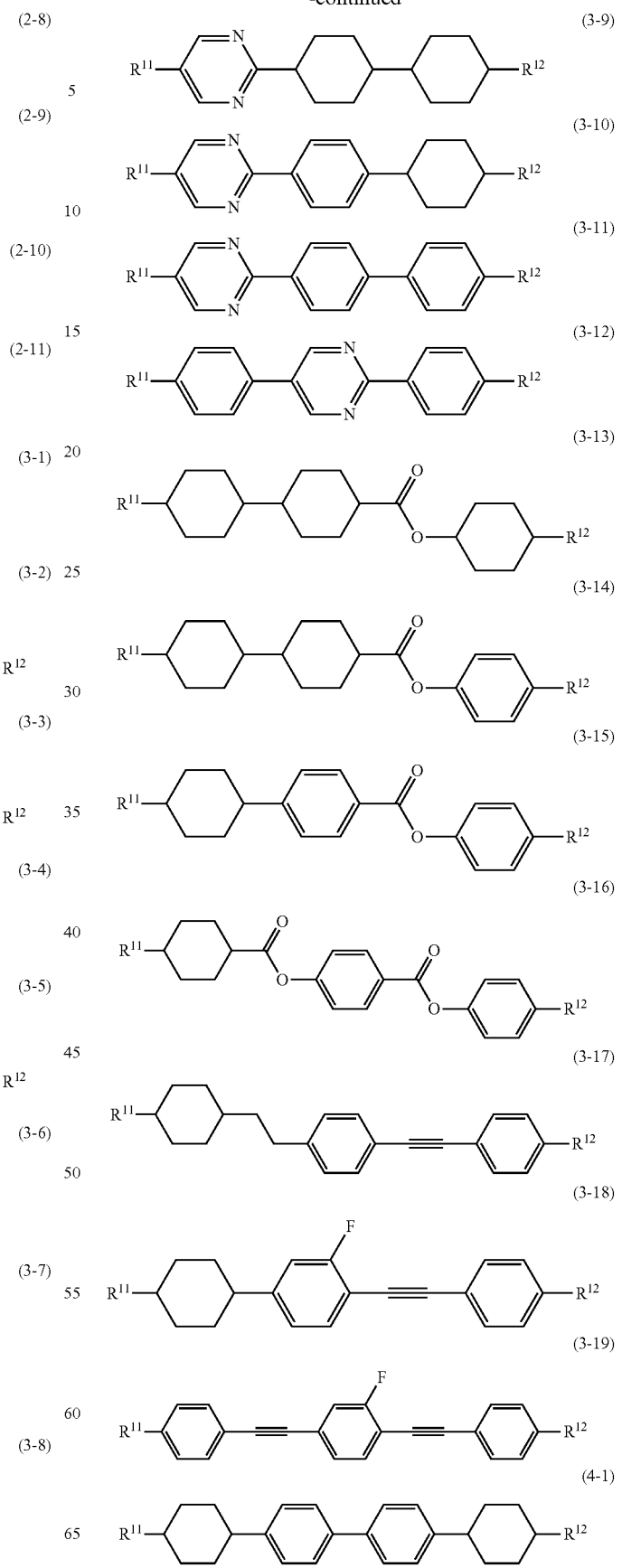

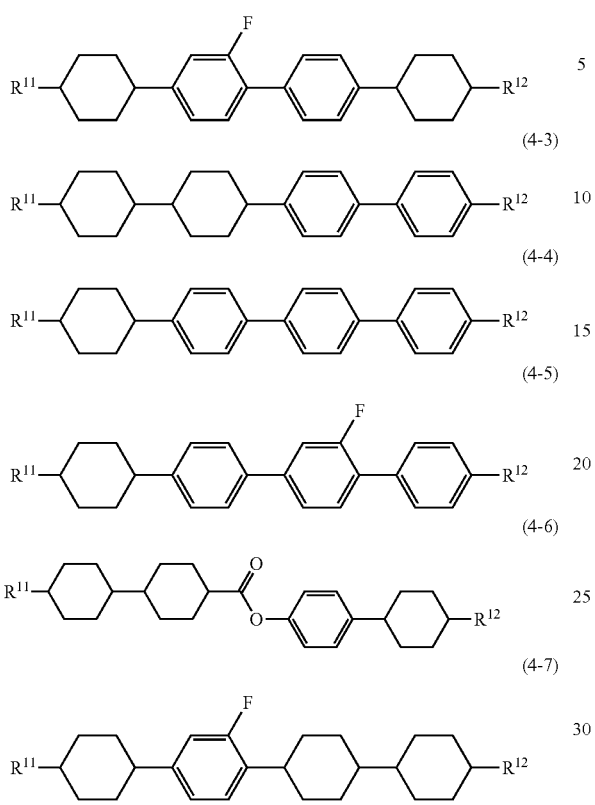

Component B has small dielectric anisotropy. Component B is close to neutrality. Compound (2) is effective in decreasing viscosity or adjusting optical anisotropy. Compounds (3) and (4) are effective in extending a temperature range of a nematic phase by increasing maximum temperature, or in adjusting the optical anisotropy.

As a content of component B is increased, the viscosity of the composition is decreased, and the dielectric anisotropy is decreased. Thus, as long as a desired value of a threshold voltage of the device is met, the content is preferably as large as possible. When a composition for the IPS mode, the VA mode or the like is prepared, the content of component B is preferably about 30% by weight or more, and further preferably about 40% by weight or more, based on the weight of the liquid crystal composition.

Component C is a compound having a halogen-containing group or a fluorine-containing group at a right terminal. Preferred examples of component C include compounds (5-1) to (5-16), compounds (6-1) to (6-113) and compounds (7-1) to (7-57). In the compounds, $R^{13}$ is alkyl having 1 to 10 carbons or alkenyl having 2 to 10 carbons, and in the groups, at least one piece of —$CH_2$— may be replaced by —O—, and in the monovalent groups, at least one piece of hydrogen may be replaced by fluorine; and $X^{11}$ is fluorine, chlorine, —$OCF_3$, —$OCHF_2$, —$CF_3$, —$CHF_2$, —$CH_2F$, —$OCF_2CHF_2$ or —$OCF_2CHFCF_3$.

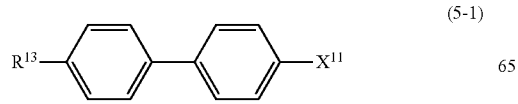

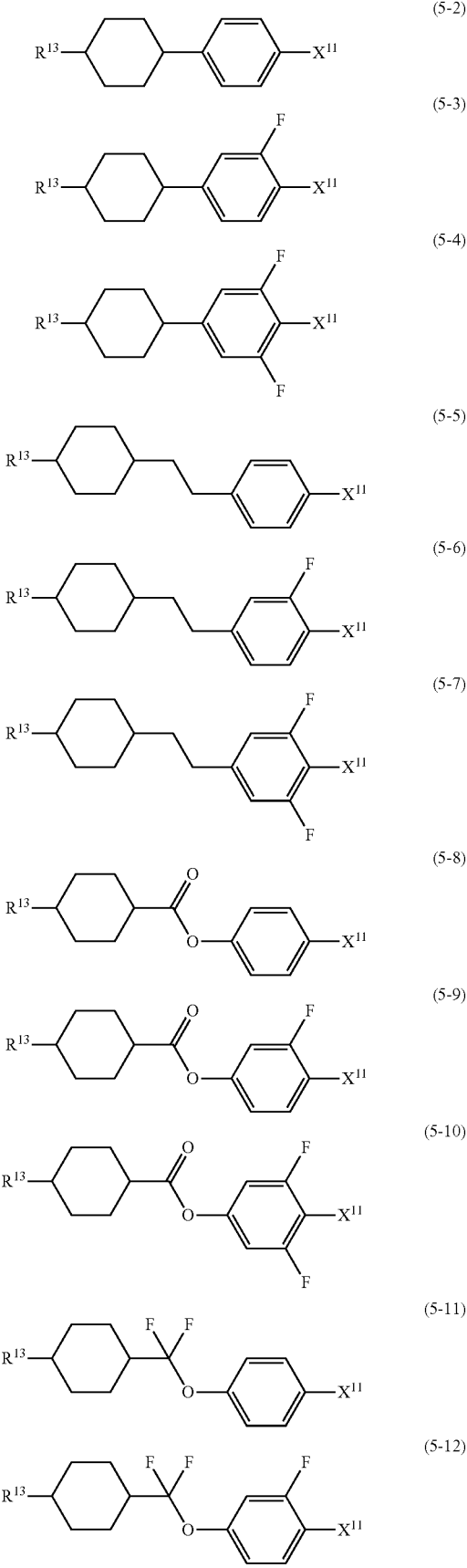

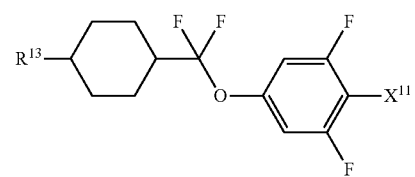 (5-13)
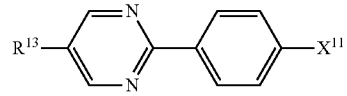 (5-14)
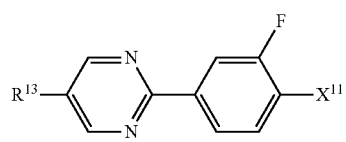 (5-15)
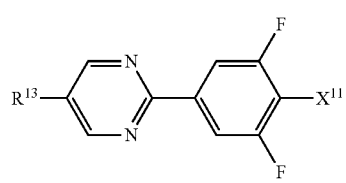 (5-16)
 (6-1)
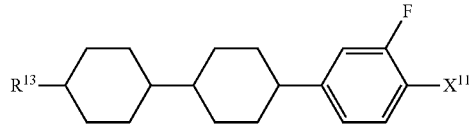 (6-2)
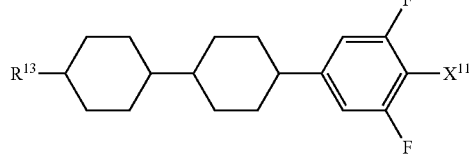 (6-3)
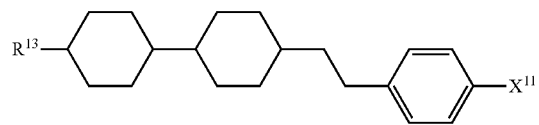 (6-4)
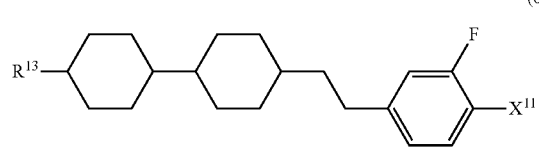 (6-5)
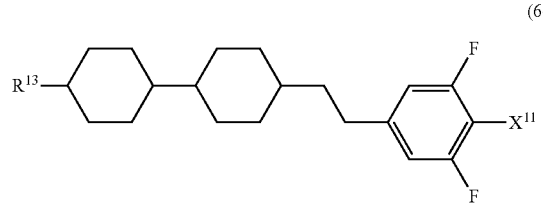 (6-6)
 (6-7)
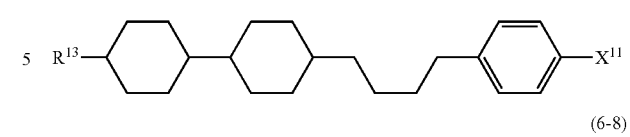 (6-8)
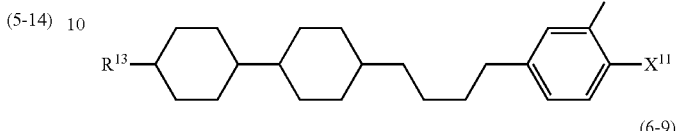 (6-9)
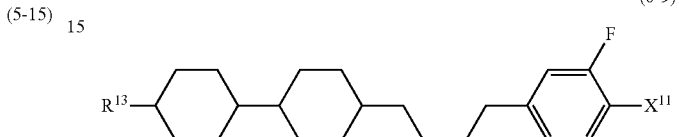 (6-10)
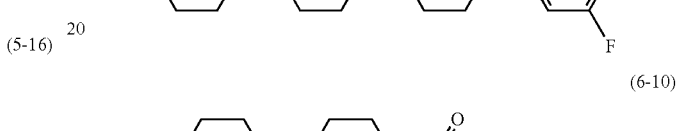 (6-11)
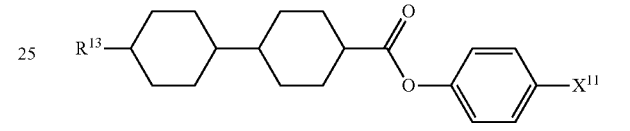 (6-12)
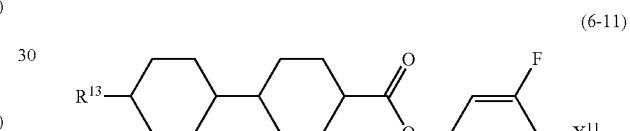 (6-13)
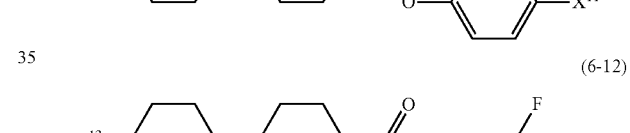 (6-14)
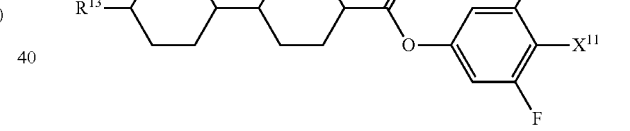 (6-15)

(6-16) 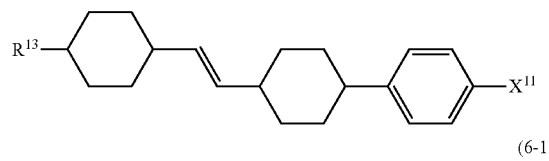
(6-17) 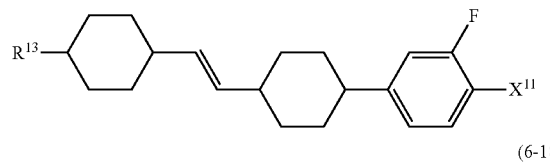
(6-18) 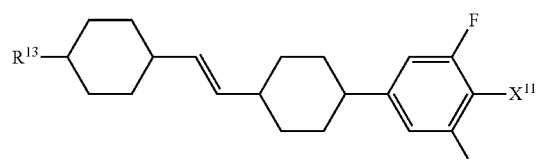
(6-19) 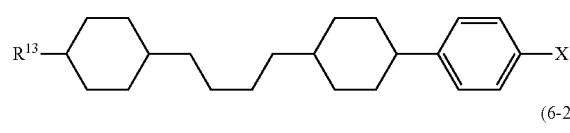
(6-20) 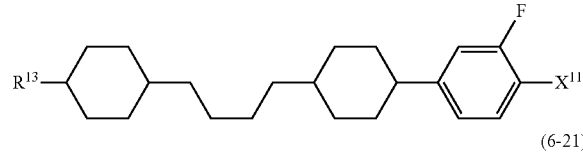
(6-21) 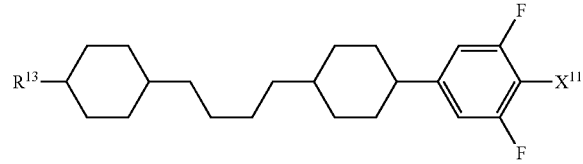
(6-22) 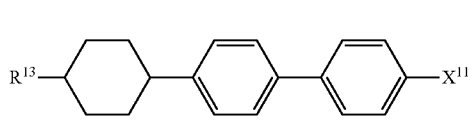
(6-23) 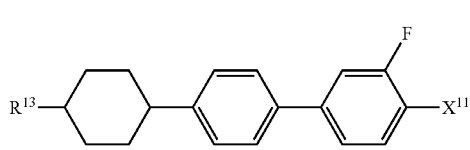
(6-24) 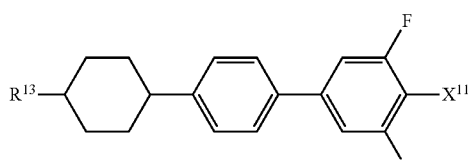
(6-25) 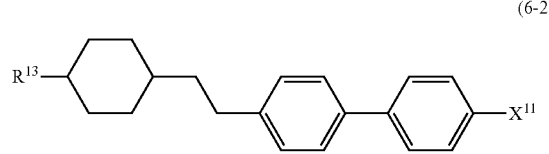
(6-26) 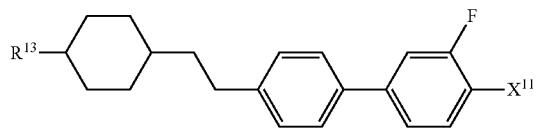
(6-27) 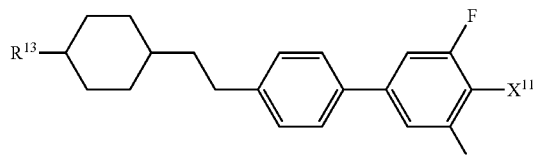
(6-28) 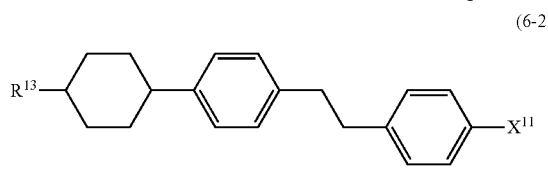
(6-29) 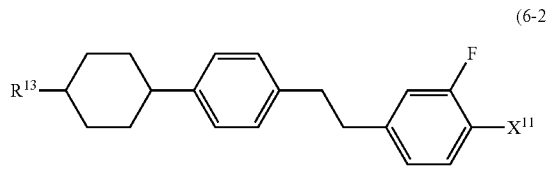
(6-30) 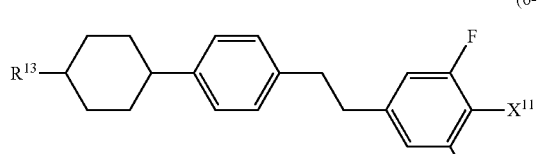
(6-31) 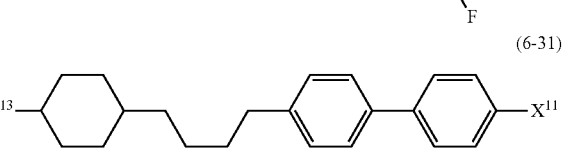
(6-32) 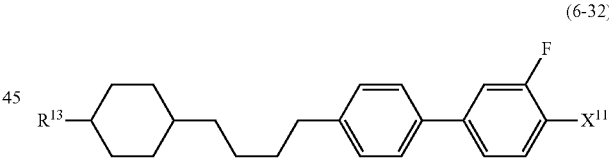
(6-33) 
(6-34) 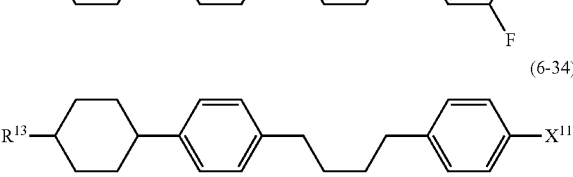
(6-35) 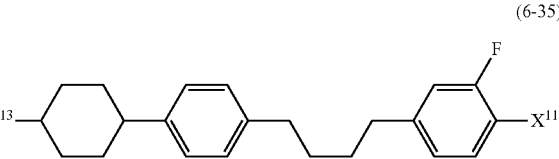

(6-36)
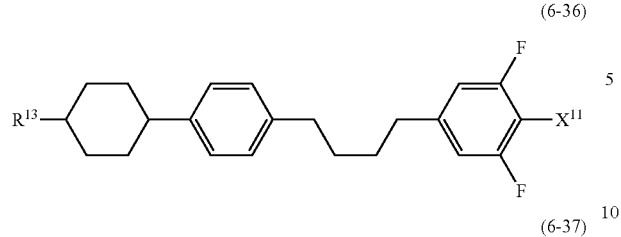
(6-37)
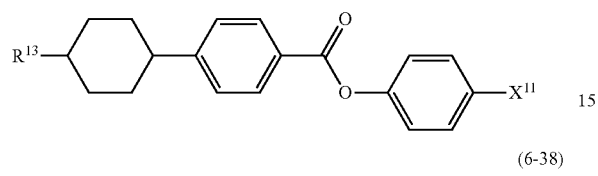
(6-38)
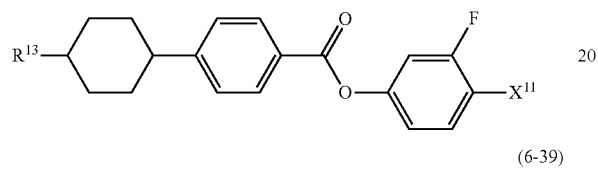
(6-39)
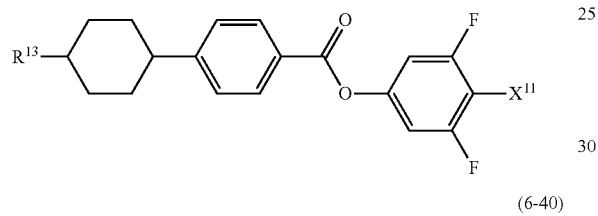
(6-40)
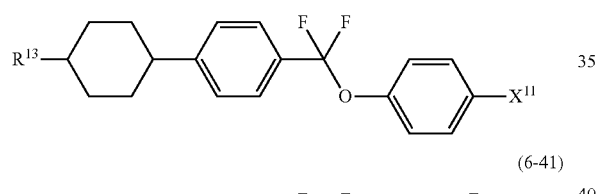
(6-41)
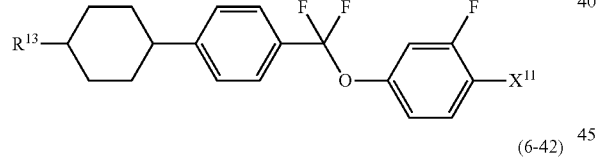
(6-42)
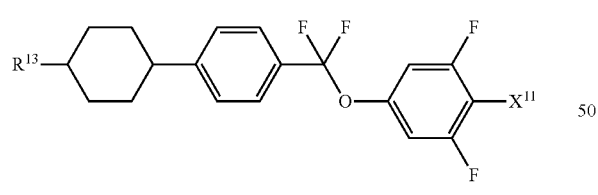
(6-43)
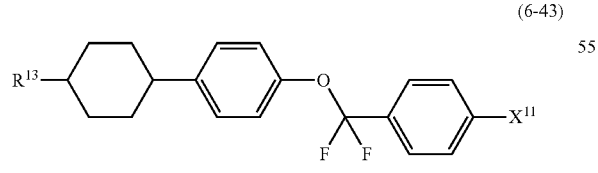
(6-44)
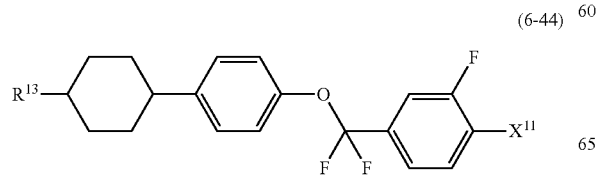
(6-45)
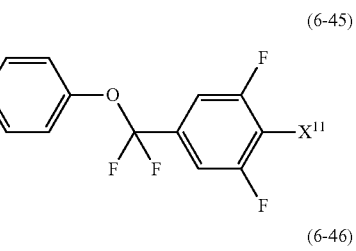
(6-46)
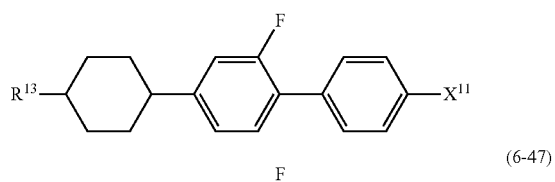
(6-47)
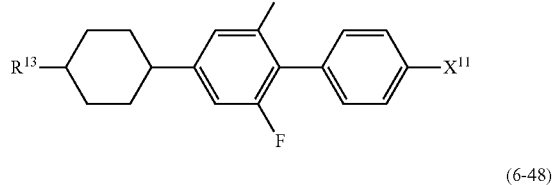
(6-48)
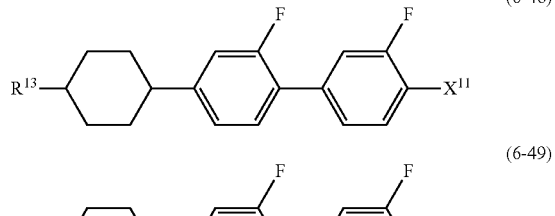
(6-49)
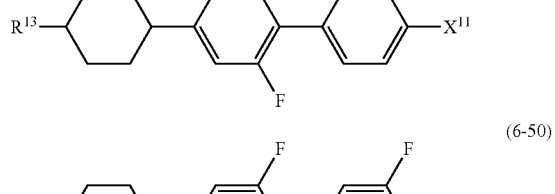
(6-50)
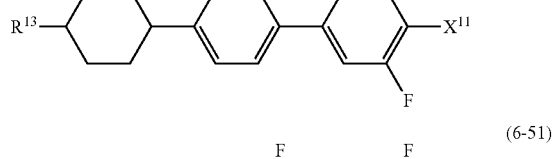
(6-51)
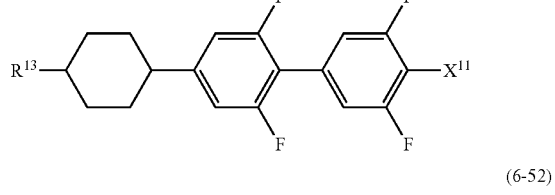
(6-52)
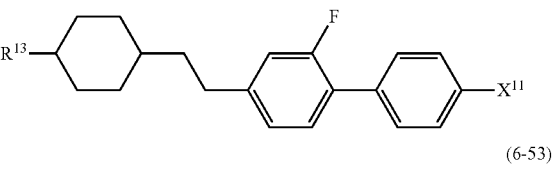
(6-53)
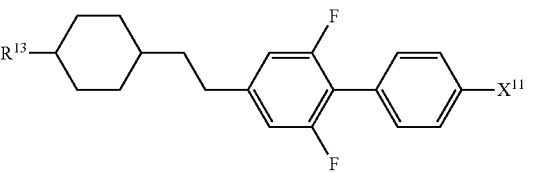

(6-54)
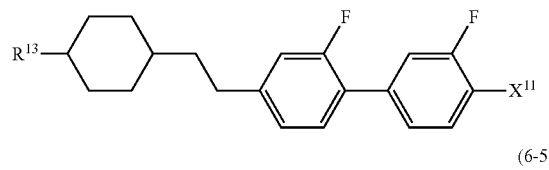
(6-55)
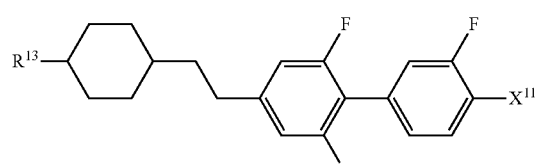
(6-56)
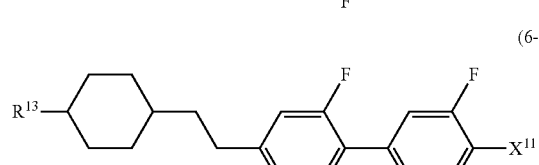
(6-57)
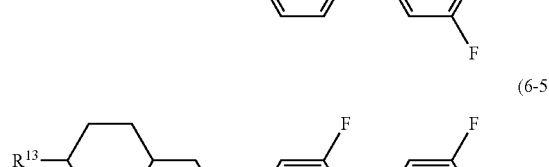
(6-58)
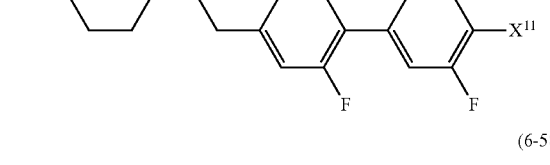
(6-59)
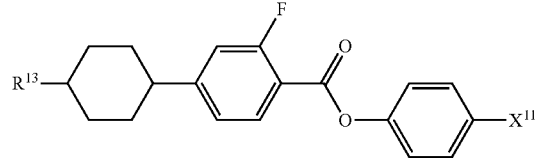
(6-60)
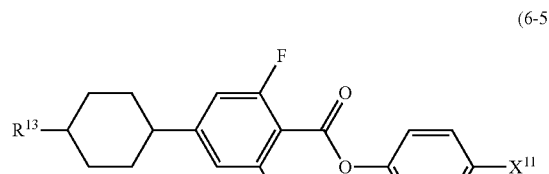
(6-61)
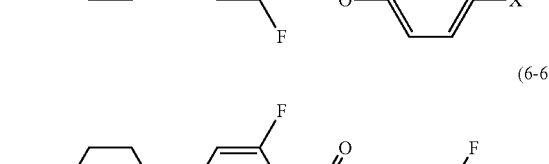
(6-62)
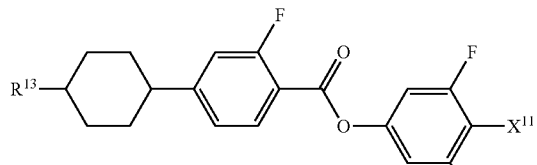
(6-63)
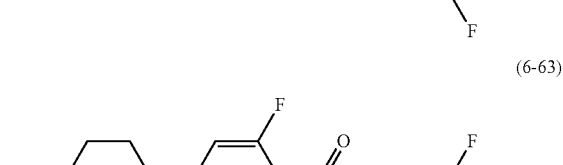
(6-64)
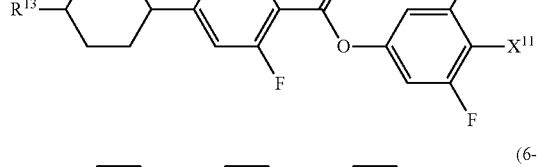
(6-65)
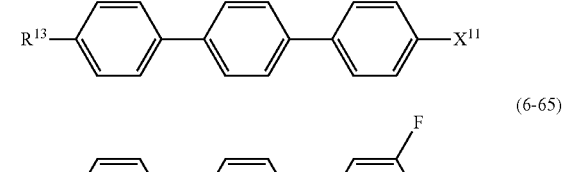
(6-66)
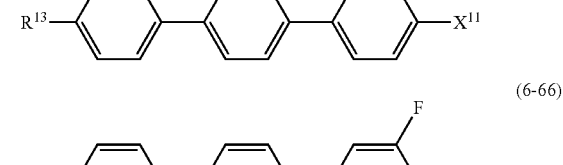
(6-67)
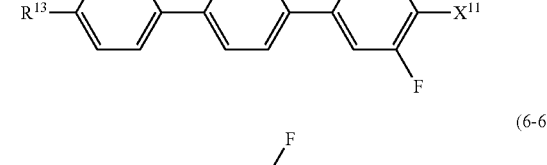
(6-68)
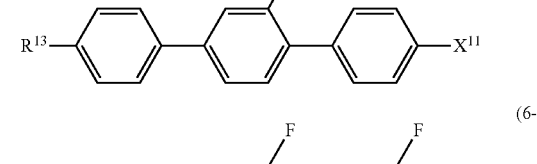
(6-69)
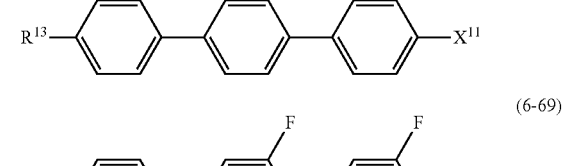
(6-70)
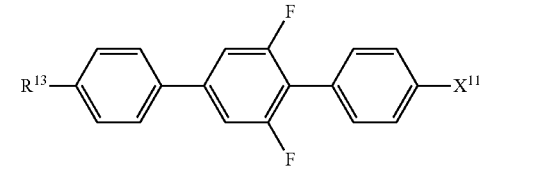

(6-71) 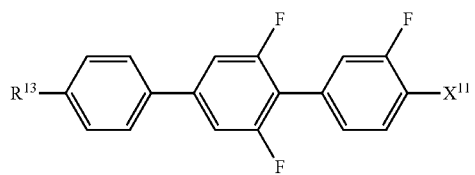
(6-72) 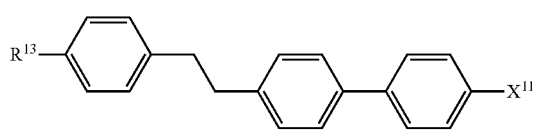
(6-73) 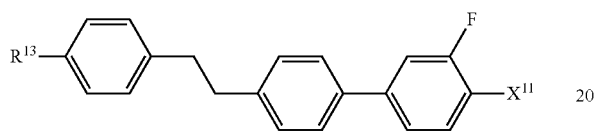
(6-74) 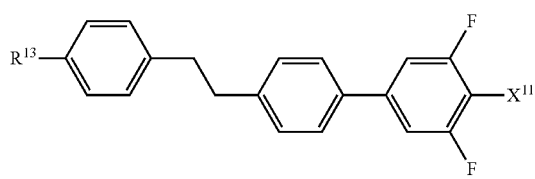
(6-75) 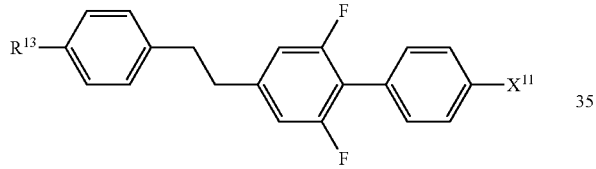
(6-76) 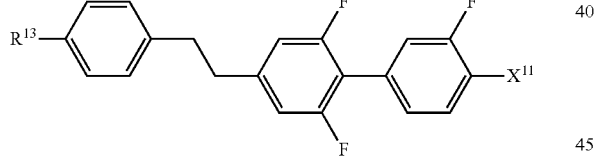
(6-77) 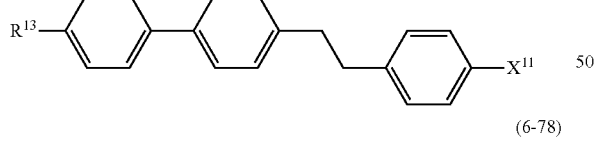
(6-78) 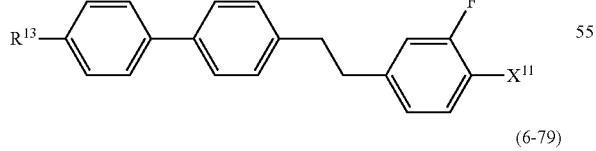
(6-79) 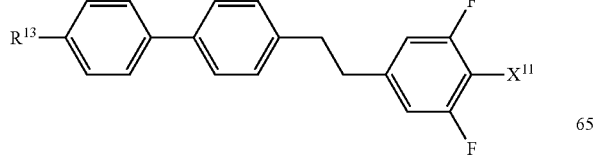
(6-80) 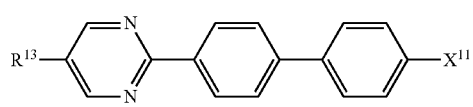
(6-81) 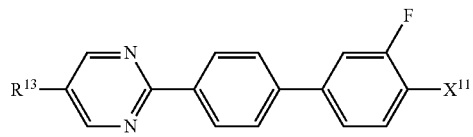
(6-82) 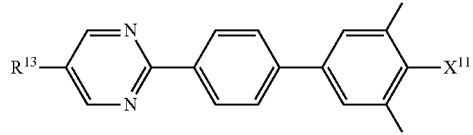
(6-83) 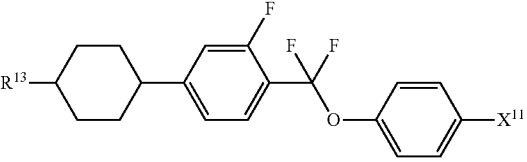
(6-84) 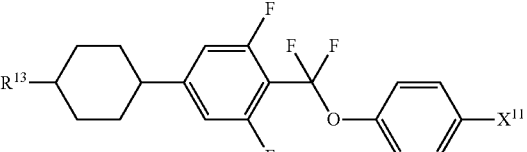
(6-85) 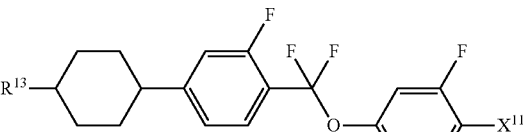
(6-86) 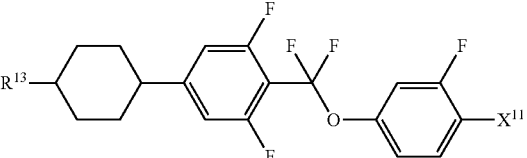
(6-87) 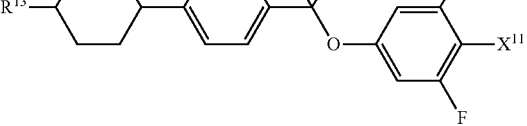

(6-88) 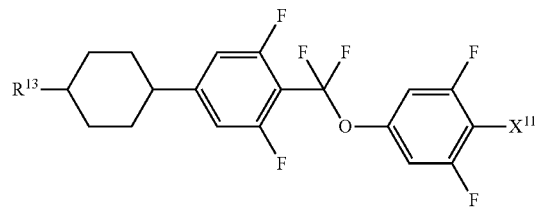
(6-89) 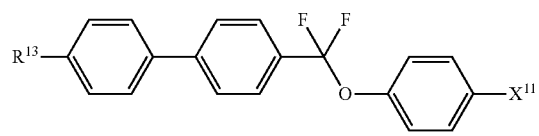
(6-90) 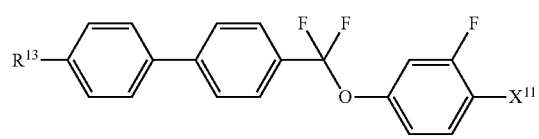
(6-91) 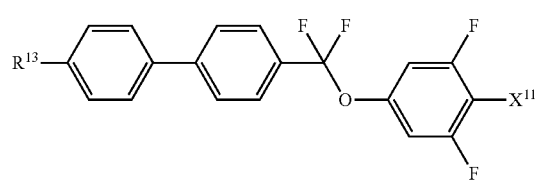
(6-92) 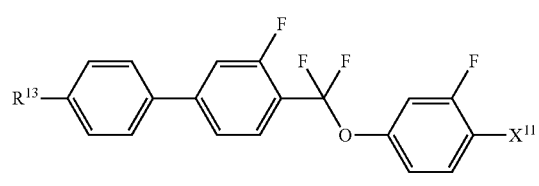
(6-93) 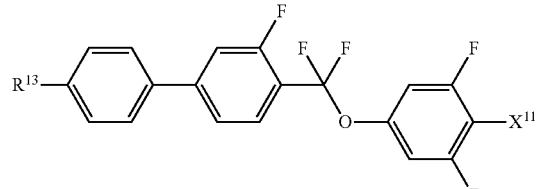
(6-94) 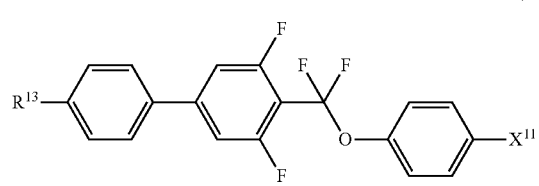
(6-95) 
(6-96) 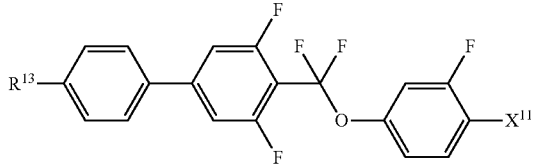
(6-97) 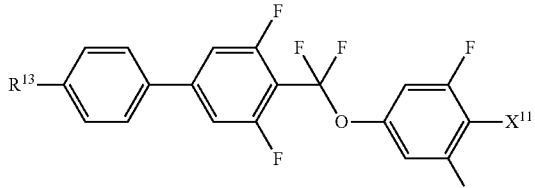
(6-98) 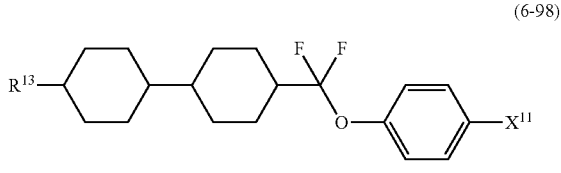
(6-99) 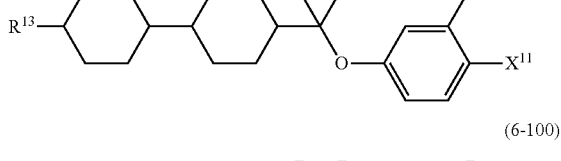
(6-100) 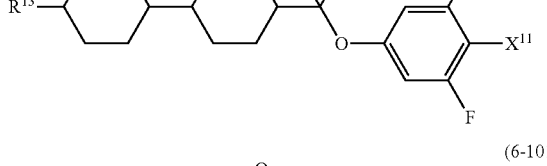
(6-101) 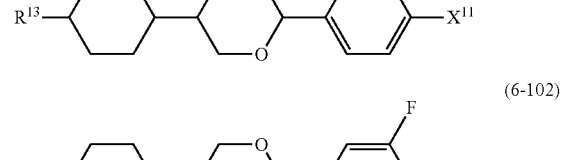
(6-102) 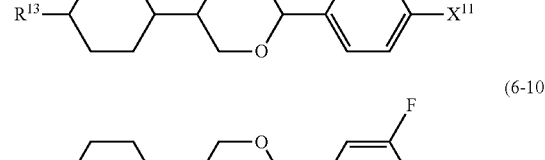
(6-103) 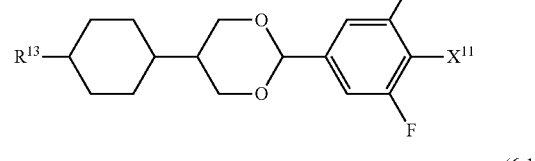
(6-104)

(6-105)
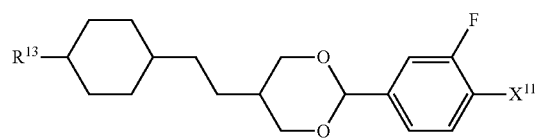
(6-106)
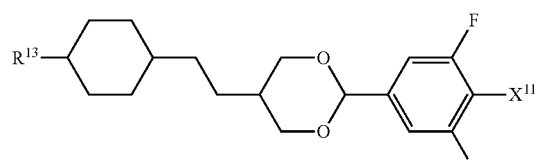
(6-107)
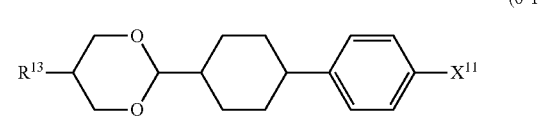
(6-108)
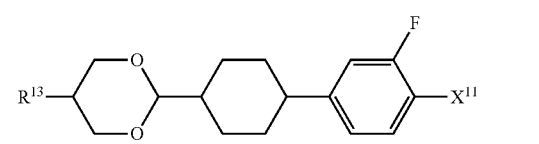
(6-109)
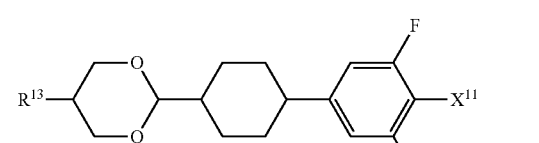
(6-110)
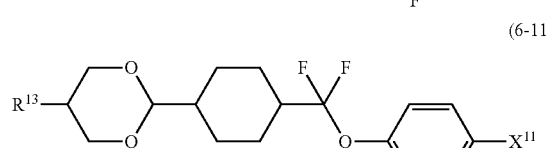
(6-111)
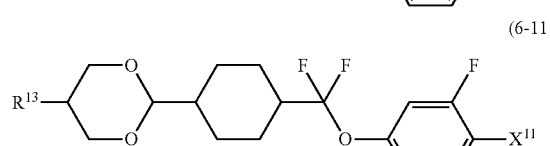
(6-112)
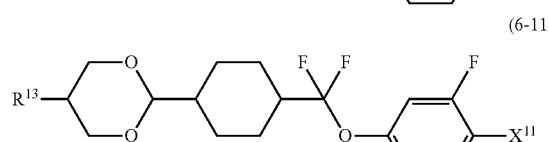
(6-113)
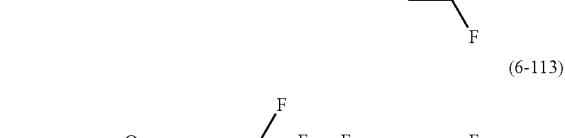
(7-1)
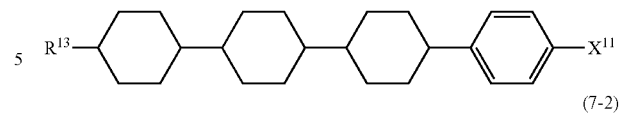
(7-2)
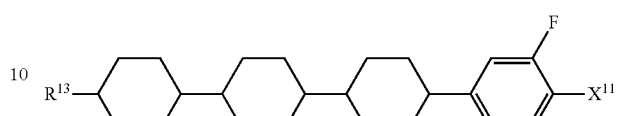
(7-3)
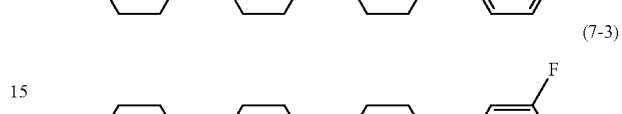
(7-4)
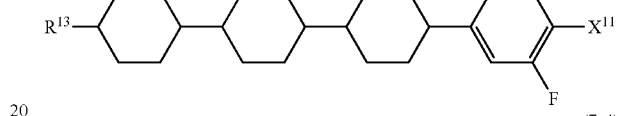
(7-5)
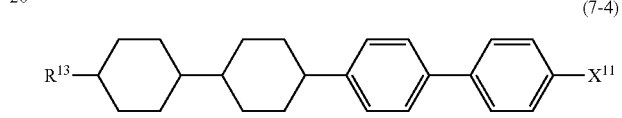
(7-6)
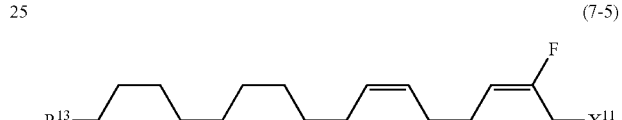
(7-7)
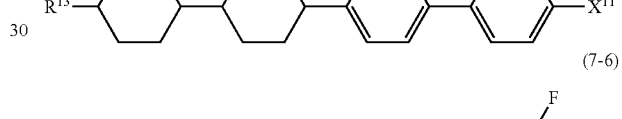
(7-8)
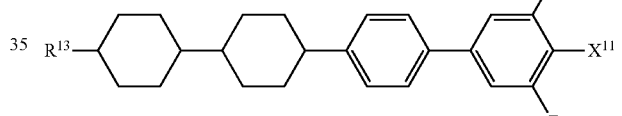
(7-9)
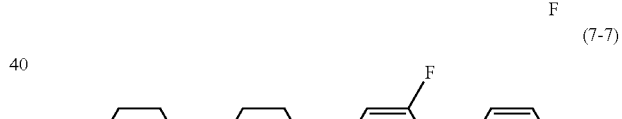
(7-10)
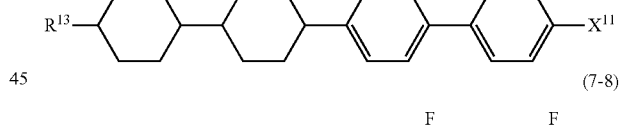

(7-11) 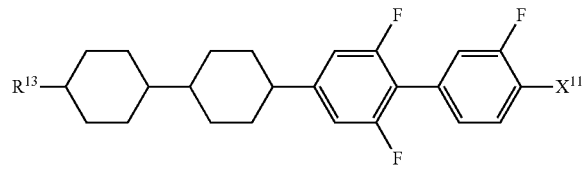
(7-12) 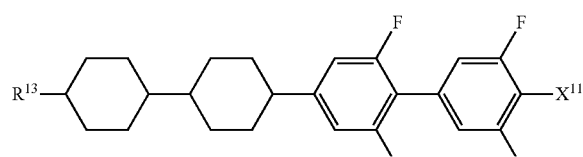
(7-13) 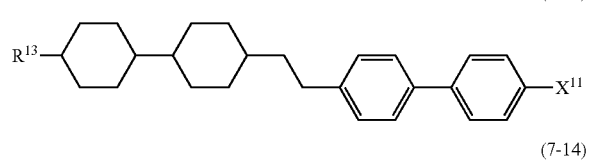
(7-14) 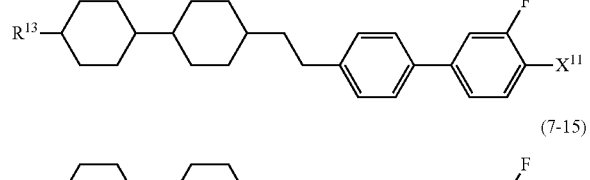
(7-15) 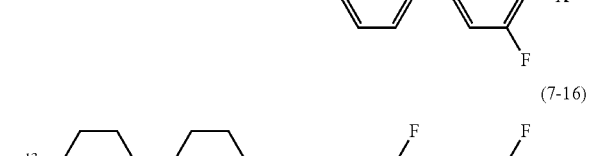
(7-16) 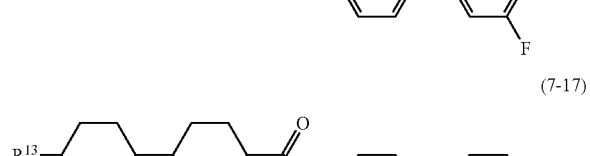
(7-17) 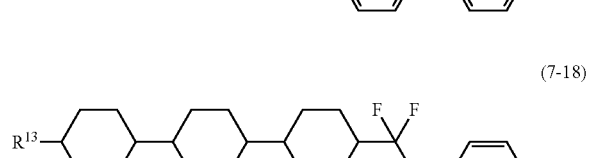
(7-18) 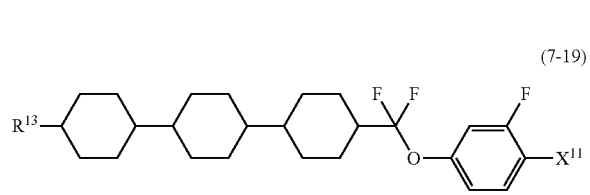
(7-19) 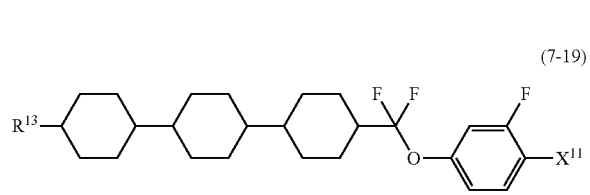
(7-20) 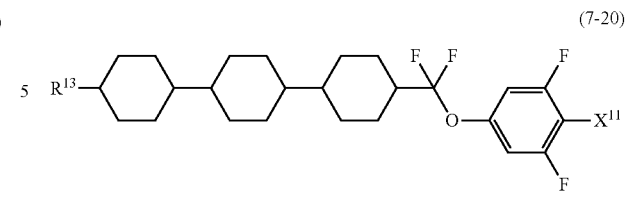
(7-21) 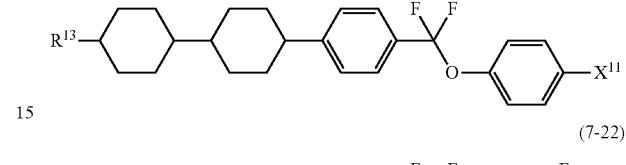
(7-22) 
(7-23) 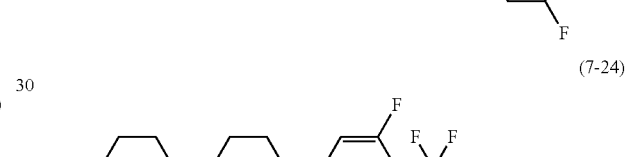
(7-24) 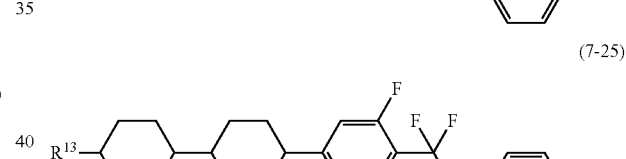
(7-25) 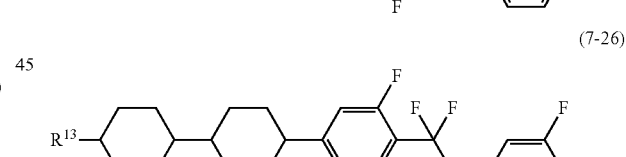
(7-26) 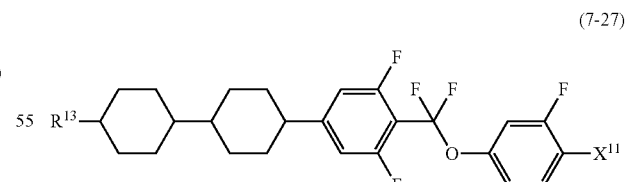
(7-27) 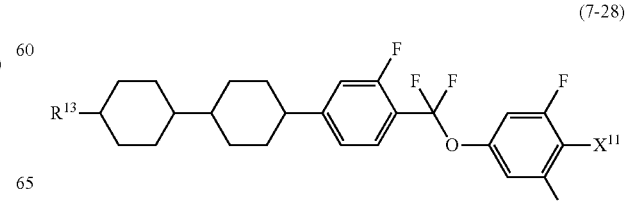
(7-28) 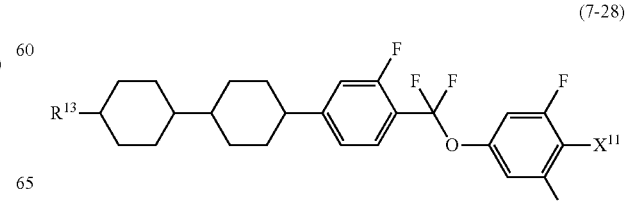

(7-29)
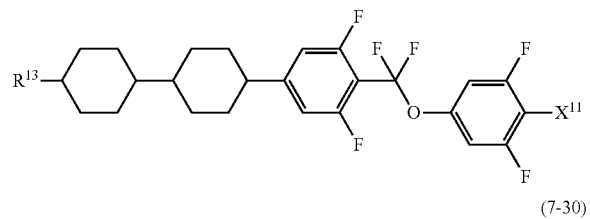
(7-30)
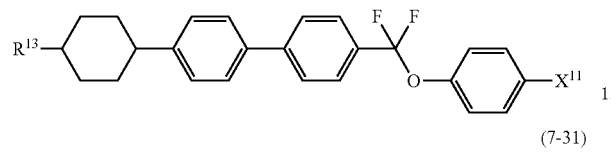
(7-31)
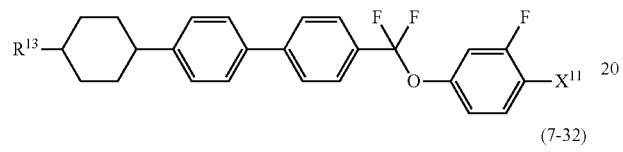
(7-32)
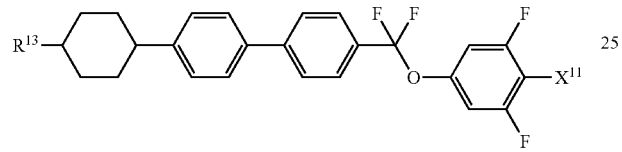
(7-33)
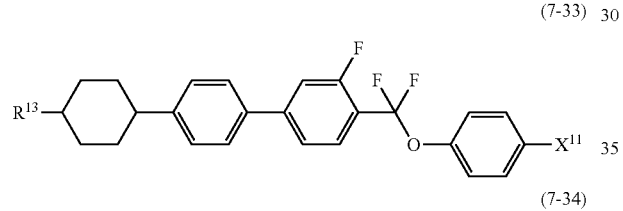
(7-34)
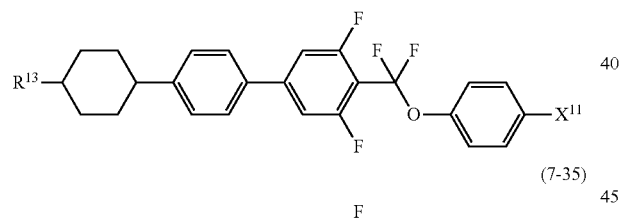
(7-35)
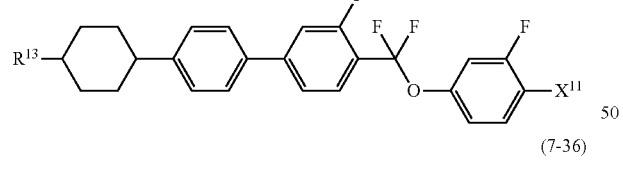
(7-36)
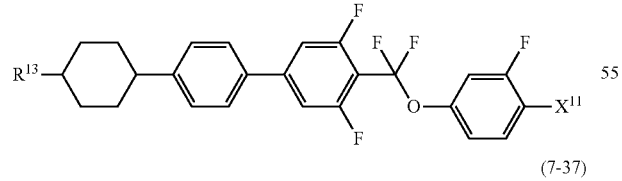
(7-37)
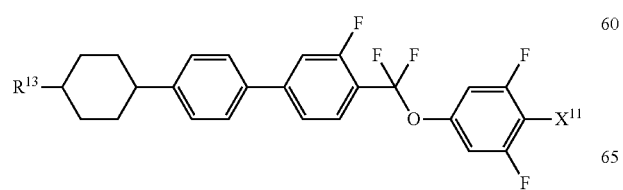
(7-38)
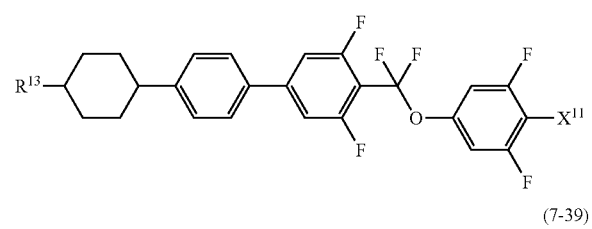
(7-39)
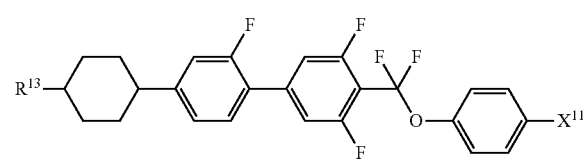
(7-40)
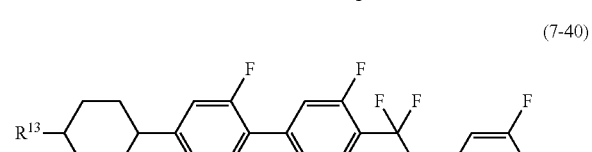
(7-41)
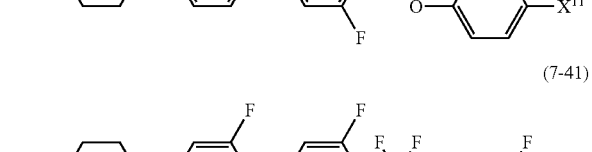
(7-42)
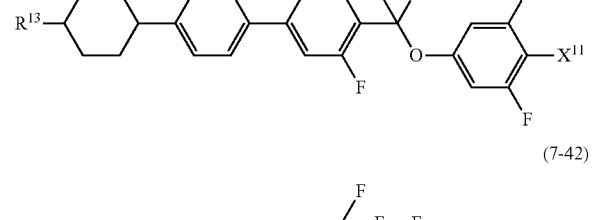
(7-43)
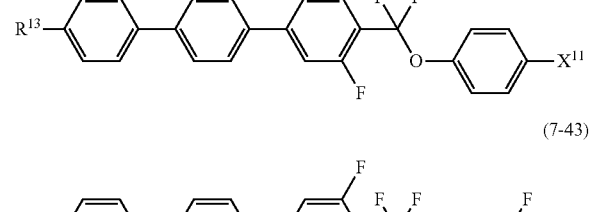
(7-44)
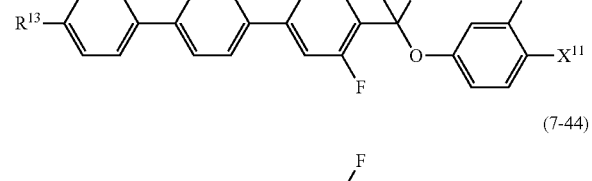
(7-45)
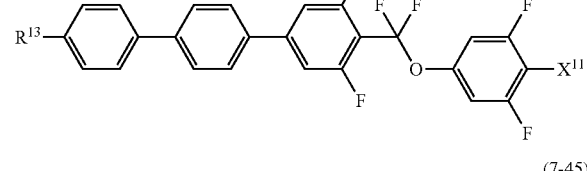
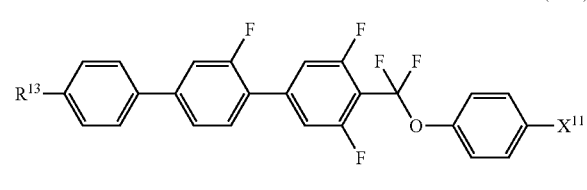

(7-46)
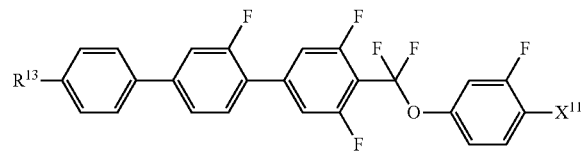

(7-47)
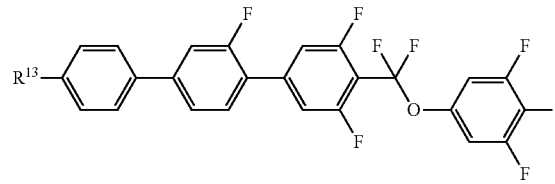

(7-48)
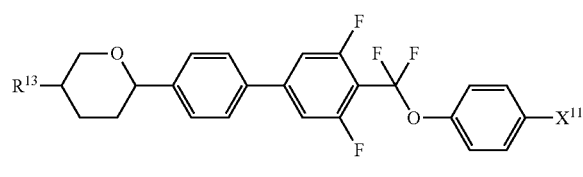

(7-49)
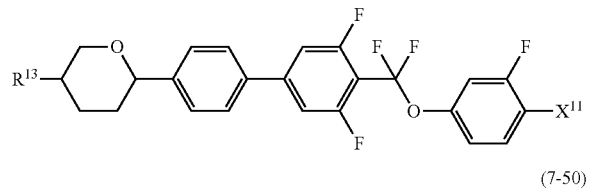

(7-50)
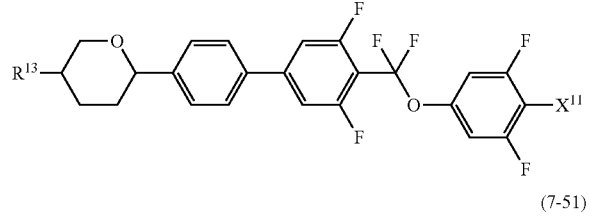

(7-51)
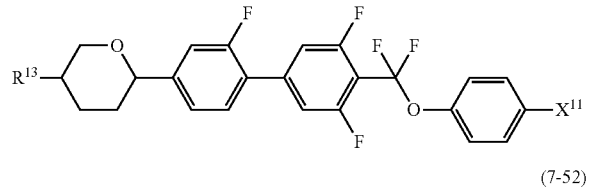

(7-52)
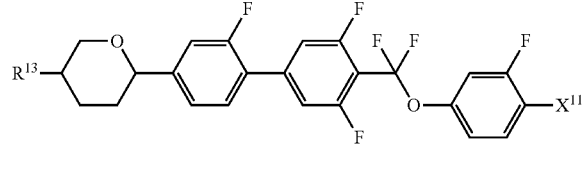

(7-53)
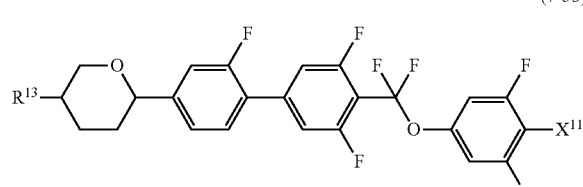

(7-54)
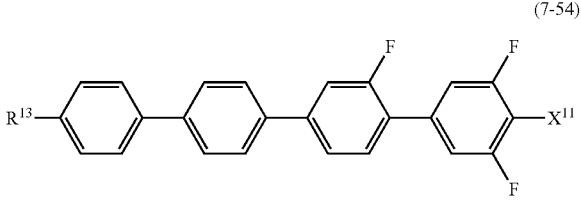

(7-55)
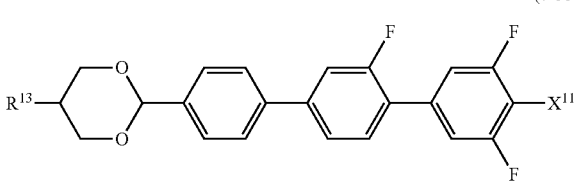

(7-56)
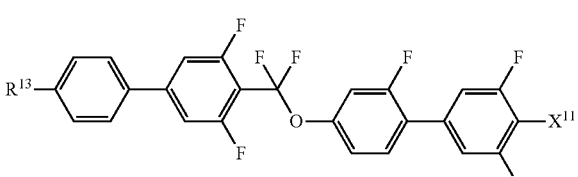

(7-57)
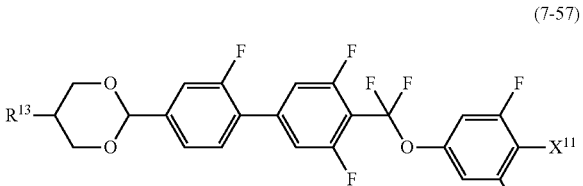

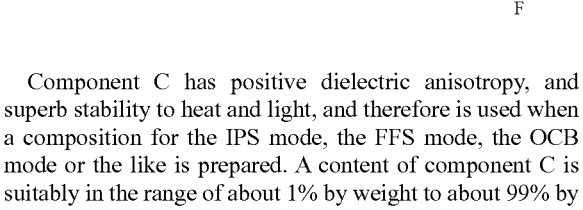

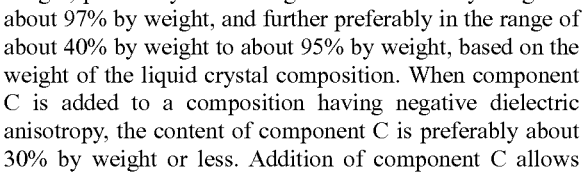

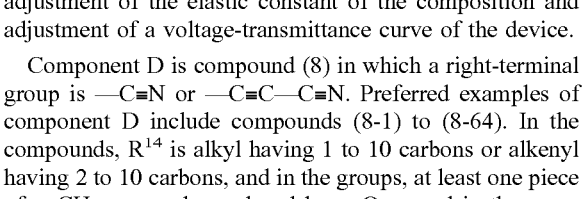

Component C has positive dielectric anisotropy, and superb stability to heat and light, and therefore is used when a composition for the IPS mode, the FFS mode, the OCB mode or the like is prepared. A content of component C is suitably in the range of about 1% by weight to about 99% by weight, preferably in the range of about 10% by weight to about 97% by weight, and further preferably in the range of about 40% by weight to about 95% by weight, based on the weight of the liquid crystal composition. When component C is added to a composition having negative dielectric anisotropy, the content of component C is preferably about 30% by weight or less. Addition of component C allows adjustment of the elastic constant of the composition and adjustment of a voltage-transmittance curve of the device.

Component D is compound (8) in which a right-terminal group is —C≡N or —C≡C—C≡N. Preferred examples of component D include compounds (8-1) to (8-64). In the compounds, $R^{14}$ is alkyl having 1 to 10 carbons or alkenyl having 2 to 10 carbons, and in the groups, at least one piece of —CH$_2$— may be replaced by —O—, and in the monovalent groups, at least one piece of hydrogen may be replaced by fluorine; and $X^{12}$ is —C≡N or —C≡C—C≡N.

(8-1)
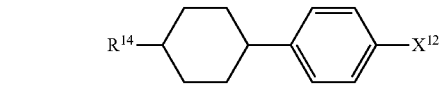

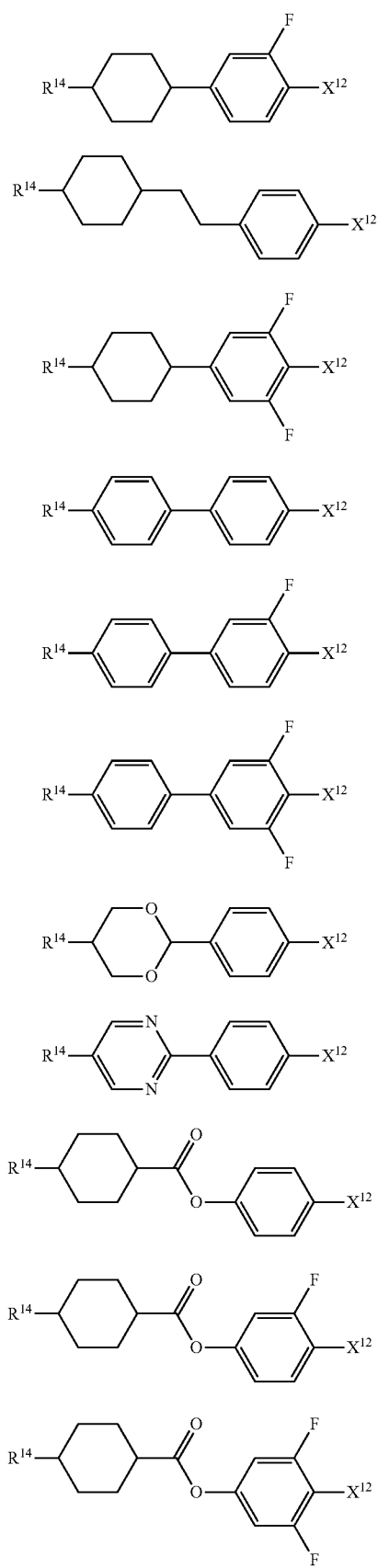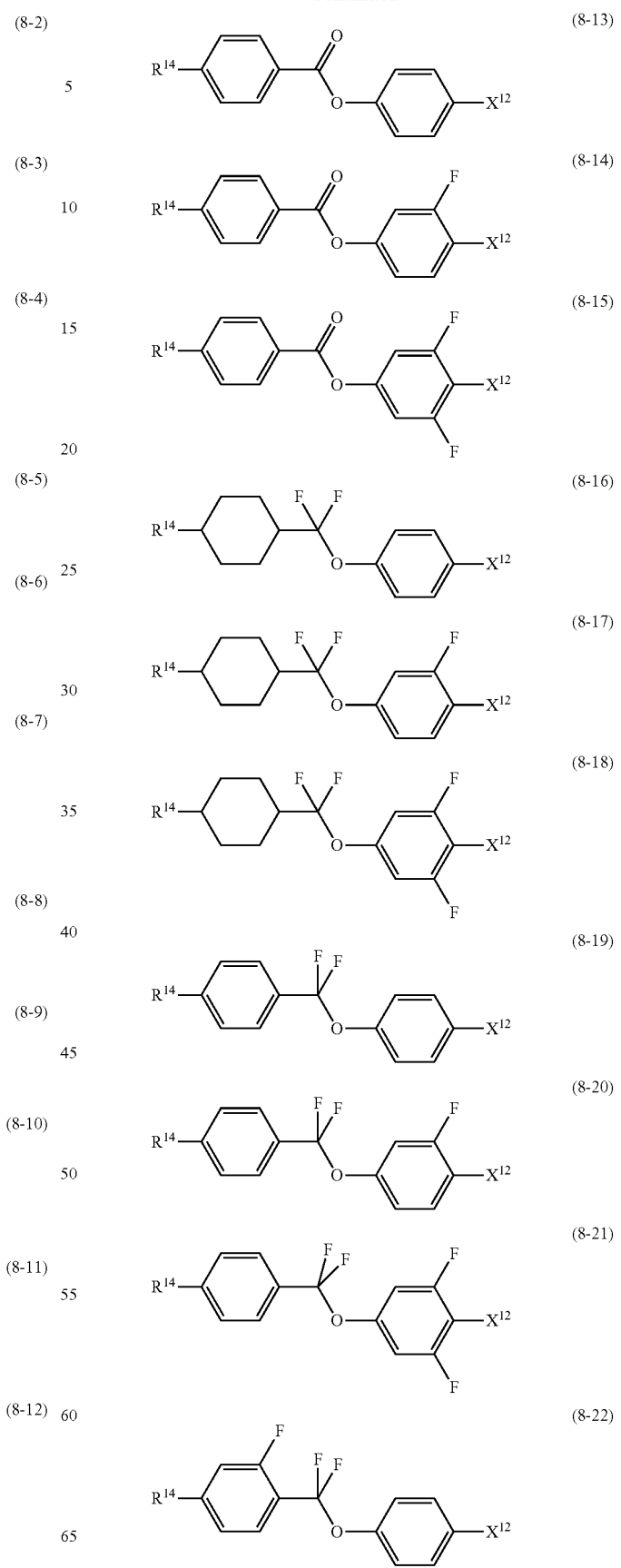

(8-23) 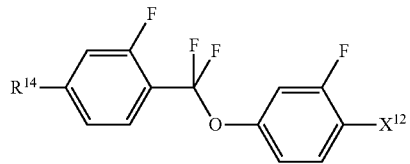
(8-24) 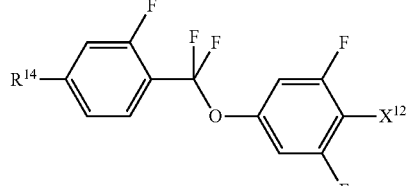
(8-25) 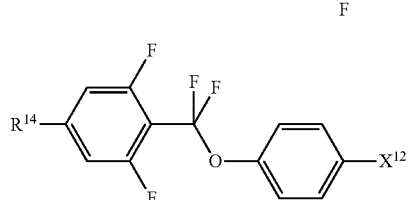
(8-26) 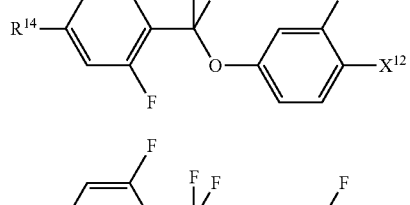
(8-27) 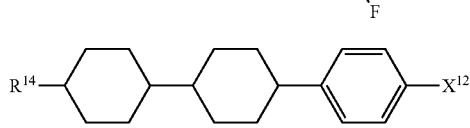
(8-28) 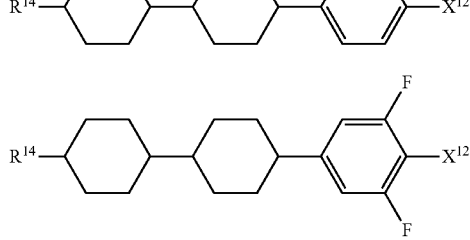
(8-29) 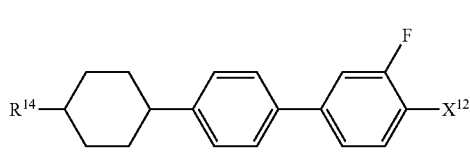
(8-30) 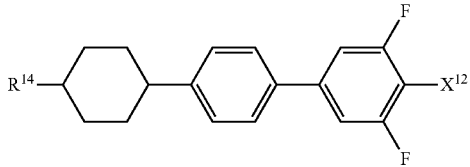
(8-31) 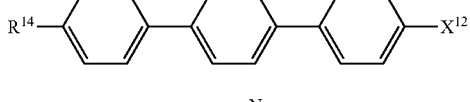
(8-32) 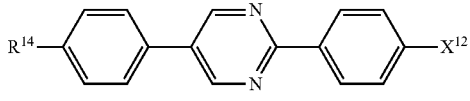
(8-33) 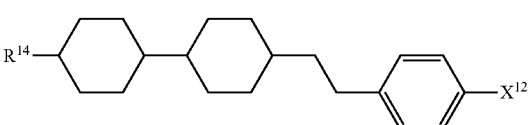
(8-34) 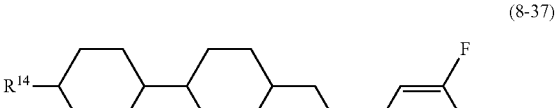
(8-35) 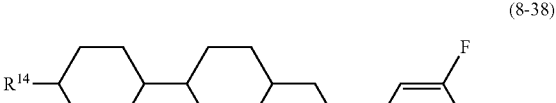
(8-36) 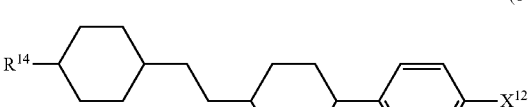
(8-37) 
(8-38) 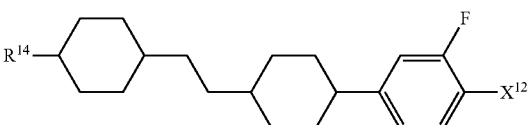
(8-39) 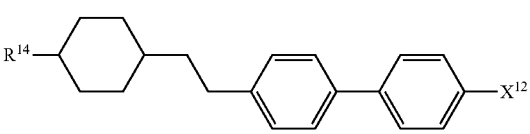

(8-43) 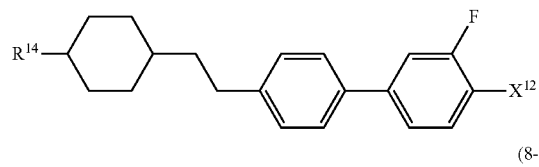
(8-44) 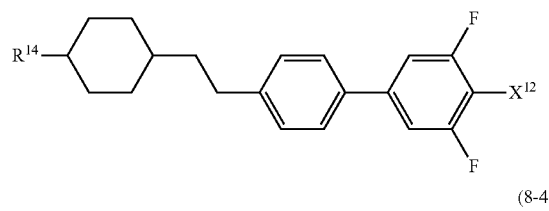
(8-45) 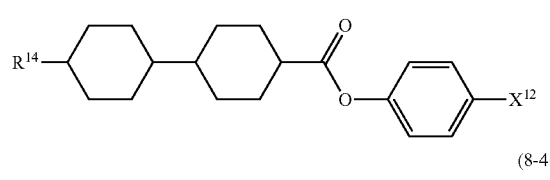
(8-46) 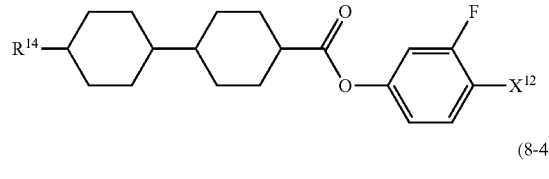
(8-47) 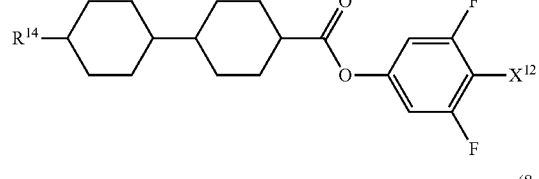
(8-48) 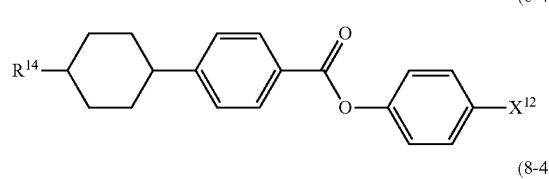
(8-49) 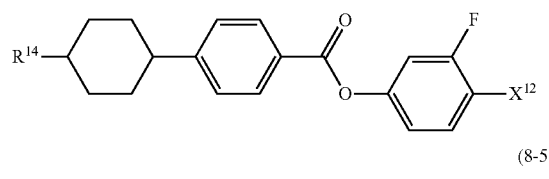
(8-50) 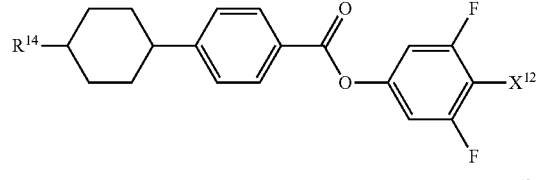
(8-51) 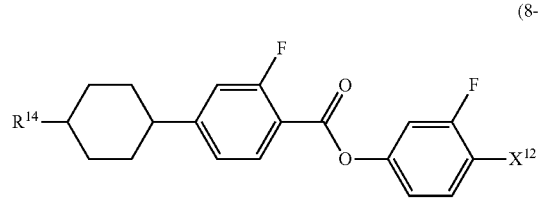
(8-52) 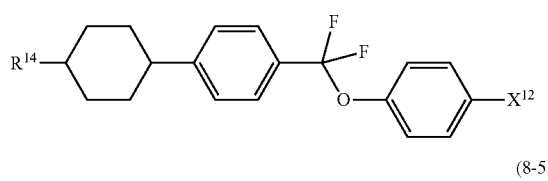
(8-53) 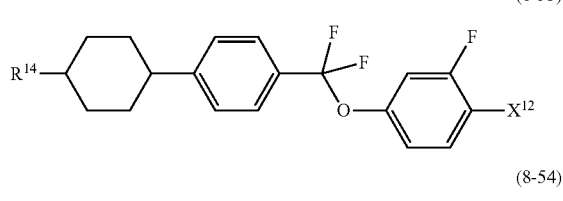
(8-54) 
(8-55) 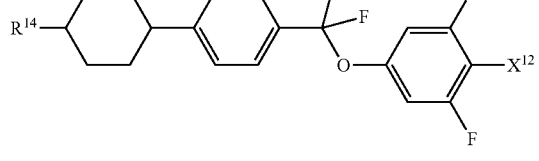
(8-56) 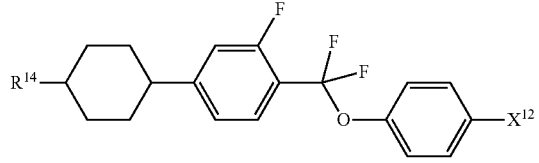
(8-57) 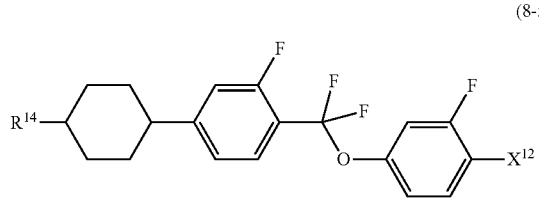
(8-58) 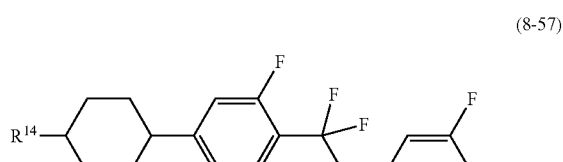
(8-59) 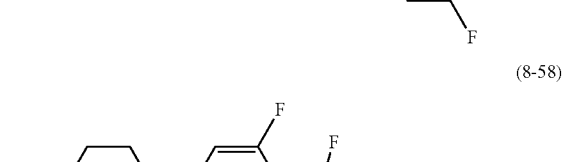

(8-60)
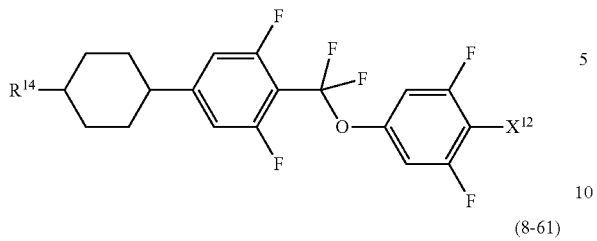

(8-61)
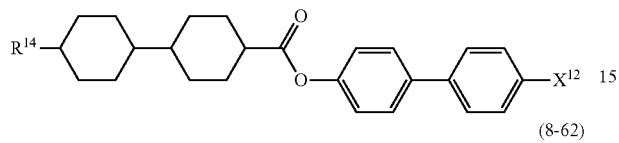

(8-62)
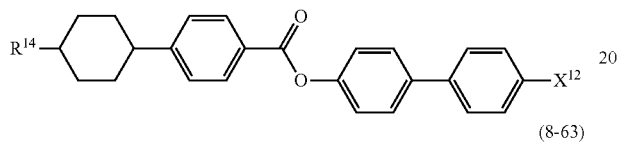

(8-63)
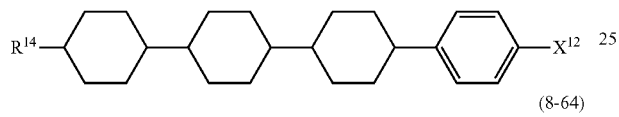

(8-64)
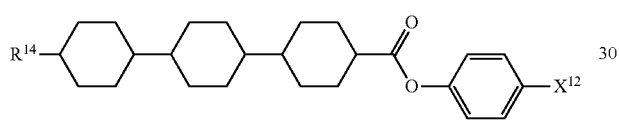

Component D has positive dielectric anisotropy and a value thereof is large, and therefore is used when a composition for the TN mode or the like is prepared. Addition of component D can increase the dielectric anisotropy of the composition. Component D is effective in extending the temperature range of the liquid crystal phase, adjusting the viscosity or adjusting the optical anisotropy. Component D is also useful for adjustment of the voltage-transmittance curve of the device.

When the composition for the TN mode or the like is prepared, a content of component D is suitably in the range of about 1% by weight to about 99% by weight, preferably in the range of about 10% by weight to about 97% by weight, and further preferably in the range of about 40% by weight to about 95% by weight, based on the weight of the liquid crystal composition. When component D is added to a composition having negative dielectric anisotropy, the content of component D is preferably about 30% by weight or less. Addition of component D allows adjustment of the elastic constant of the composition and adjustment of the voltage-transmittance curve of the device.

Component E includes compounds (9) to (15). The compounds have phenylene in which hydrogen in lateral positions are replaced by two pieces of halogen, such as 2,3-difluoro-1,4-phenylene. Preferred examples of component E include compounds (9-1) to (9-8), compounds (10-1) to (10-17), compound (11-1), compounds (12-1) to (12-3), compounds (13-1) to (13-11), compounds (14-1) to (14-3) and compounds (15-1) to (15-3). In the compounds, $R^{15}$ and $R^{16}$ are independently alkyl having 1 to 10 carbons or alkenyl having 2 to 10 carbons, and in the groups, at least one piece of —CH$_2$— may be replaced by —O—, and in the monovalent groups, at least one piece of hydrogen may be replaced by fluorine; and $R^{17}$ is hydrogen, fluorine, alkyl having 1 to 10 carbons or alkenyl having 2 to 10 carbons, and in the alkyl and the alkenyl, at least one piece of —CH$_2$— may be replaced by —O—, and in the monovalent groups, at least one piece of hydrogen may be replaced by fluorine.

(9-1)
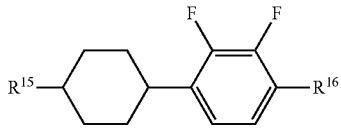

(9-2)
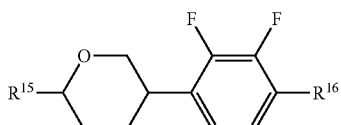

(9-3)
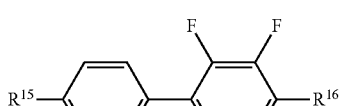

(9-4)

(9-5)
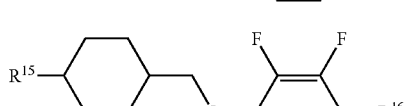

(9-6)
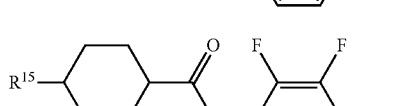

(9-7)
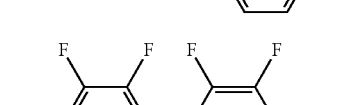

(9-8)
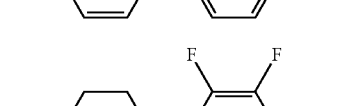

(10-1)
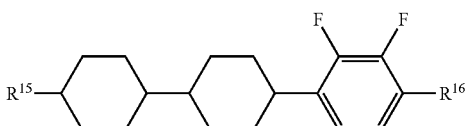

(10-2)
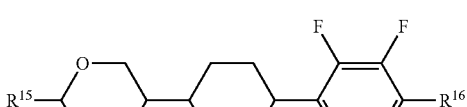

(10-3) 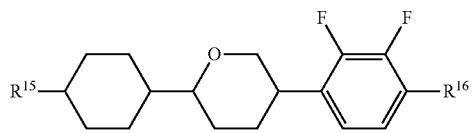
(10-4) 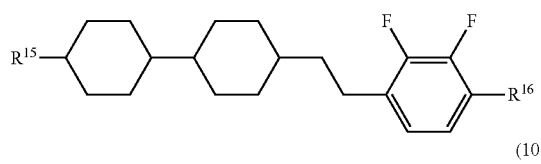
(10-5) 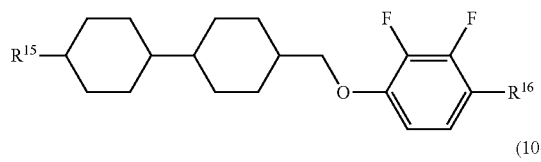
(10-6) 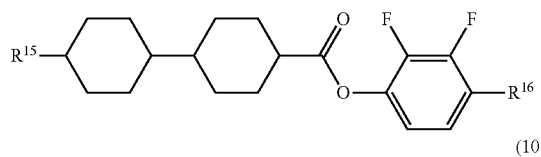
(10-7) 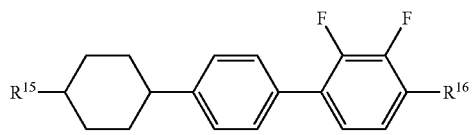
(10-8) 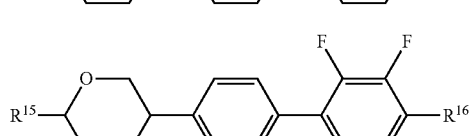
(10-9) 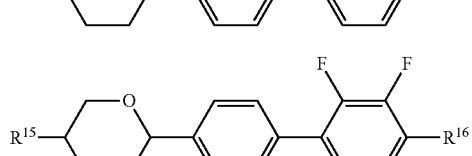
(10-10) 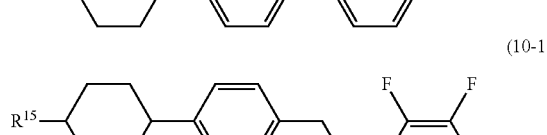
(10-11) 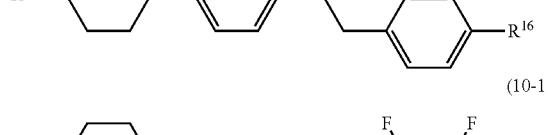
(10-12) 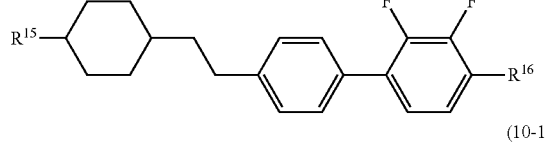
(10-13) 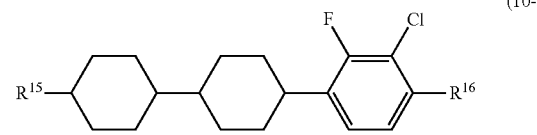
(10-14) 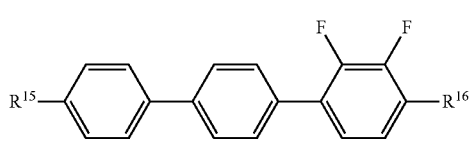
(10-15) 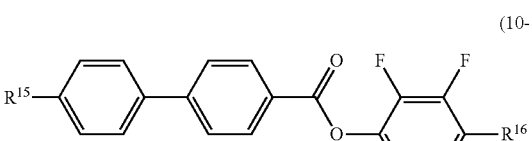
(10-16) 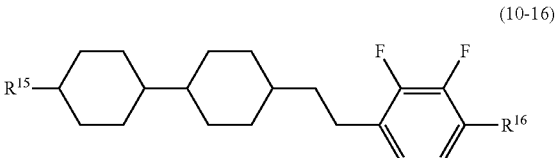
(10-17) 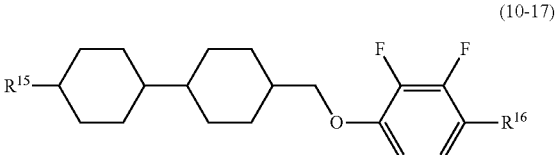
(11-1) 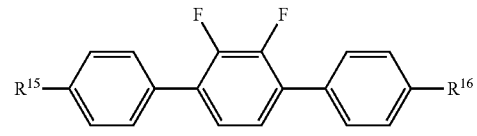
(12-1) 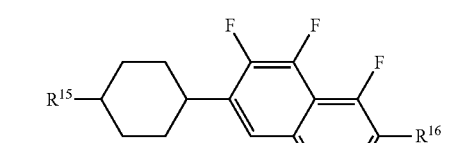
(12-2) 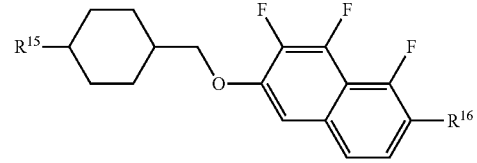
(12-3) 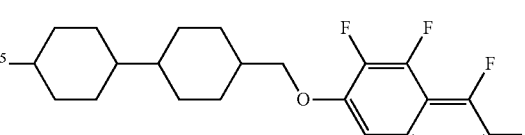
(13-1) 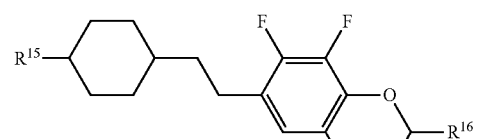

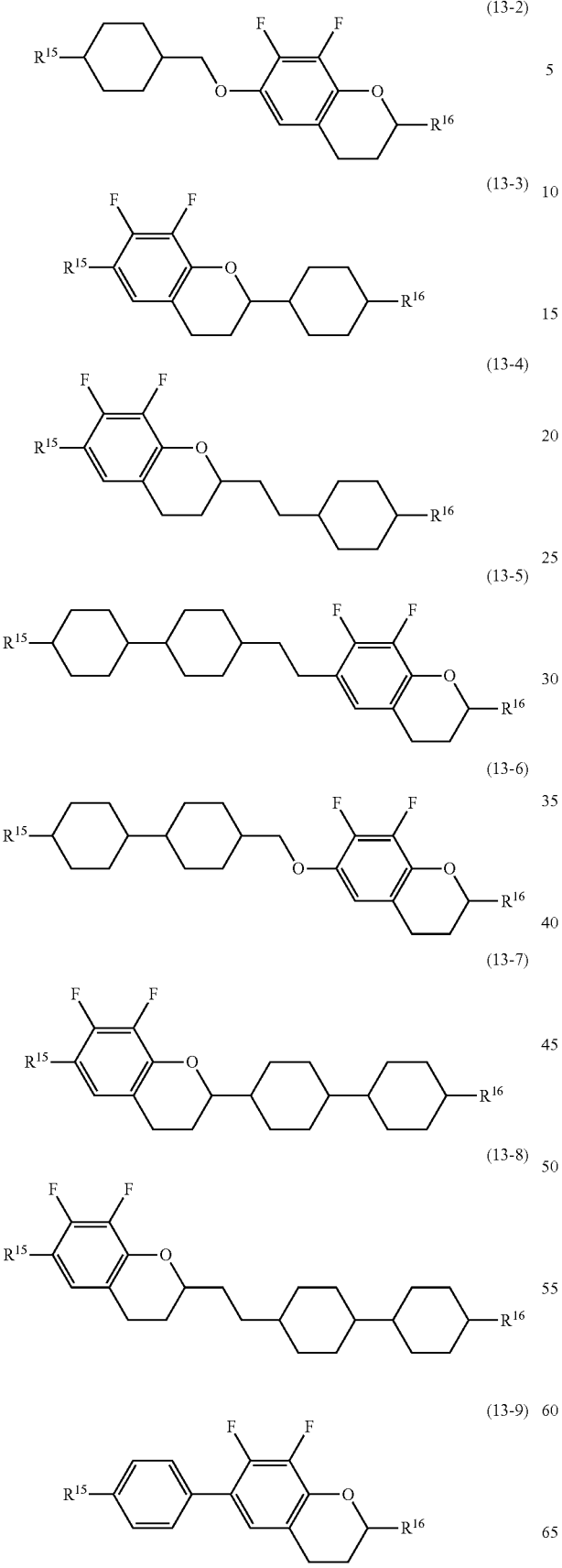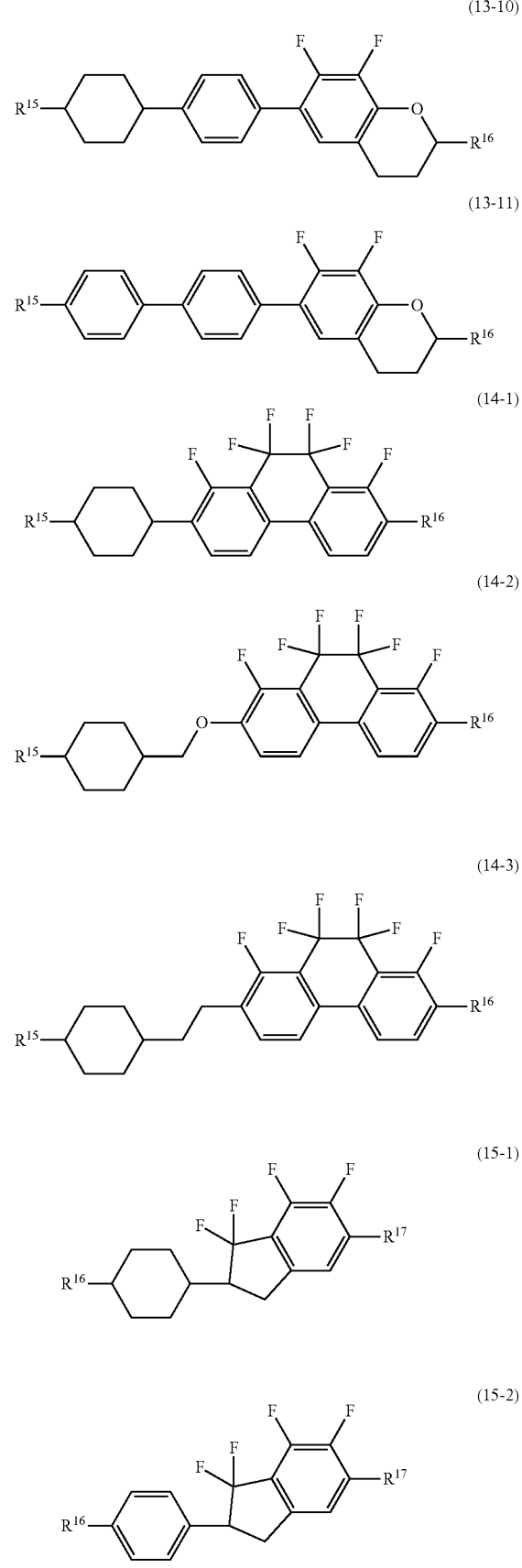

(15-3)

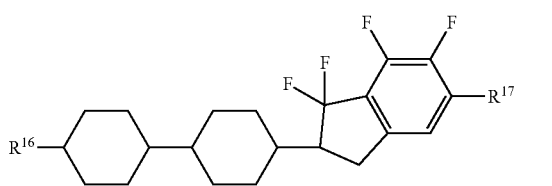

Component E has negatively large dielectric anisotropy. Component E is used when a composition for the IPS mode, the VA mode, the PSA mode or the like is prepared. As a content of component E is increased, the dielectric anisotropy of the composition is negatively increased, but the viscosity is increased. Thus, as long as a desired value of a threshold voltage of the device is met, the content is preferably as small as possible. When the dielectric anisotropy at a degree of −5 is taken into account, the content is preferably about 40% by weight or more in order to allow a sufficient voltage driving.

Among types of component E, compound (9) is a bicyclic compound, and therefore is effective in decreasing the viscosity, adjusting the optical anisotropy or increasing the dielectric anisotropy. Compounds (10) and (11) are a tricyclic compound, and therefore are effective in increasing the maximum temperature, the optical anisotropy or the dielectric anisotropy. Compounds (12) to (15) are effective in increasing the dielectric anisotropy.

When a composition for the IPS mode, the VA mode, the PSA mode or the like is prepared, the content of component E is preferably about 40% by weight or more, and further preferably in the range of about 50% by weight to about 95% by weight, based on the weight of the liquid crystal composition. When component E is added to a composition having positive dielectric anisotropy, the content of component E is preferably about 30% by weight or less. Addition of component E allows adjustment of the elastic constant of the composition and adjustment of the voltage-transmittance curve of the device.

The liquid crystal composition satisfying at least one of physical properties such as high stability to heat and light, high maximum temperature, low minimum temperature, small viscosity, suitable optical anisotropy, large dielectric anisotropy, large specific resistance and a suitable elastic constant can be prepared by suitably combining components B, C, D and E with compound (1). The device including such a composition has a wide temperature range in which the device can be used, a short response time, a large voltage holding ratio, low threshold voltage, a large contrast ratio, a small flicker rate and a long service life.

If the device is used for a long period of time, a flicker may be occasionally generated on a display screen. The flicker rate (%) can be represented by a formula (|luminance when applying positive voltage−luminance when applying negative voltage|)/(average luminance)×100. In a device having the flicker rate in the range of about 0% to about 1%, a flicker is hardly generated on the display screen even if the device is used for a long period of time. The flicker is associated with image persistence, and is presumed to be generated according to a difference in electric potential between a positive frame and a negative frame in driving at alternating current. The composition containing compound (1) is also useful for a decrease in generation of the flicker.

3-2. Additive

A liquid crystal composition is prepared according to a publicly known method. For example, the component compounds are mixed and dissolved in each other by heating. According to an application, an additive may be added to the composition. Specific examples of the additives include the polymerizable compound, the polymerization initiator, the polymerization inhibitor, the optically active compound, the antioxidant, the ultraviolet light absorber, the light stabilizer, the heat stabilizer, the dye and the antifoaming agent. Such additives are well known to those skilled in the art, and described in literature.

In a liquid crystal display device having the polymer sustained alignment (PSA) mode, the composition contains a polymer. The polymerizable compound is added for the purpose of forming the polymer in the composition. The polymerizable compound is polymerized by irradiation with ultraviolet light while voltage is applied between electrodes, and thus the polymer is formed in the composition. A suitable pretilt is achieved by the method, and therefore the device in which a response time is shortened and the image persistence is improved is prepared.

Specific examples of a preferred polymerizable compound include acrylate, methacrylate, a vinyl compound, a vinyloxy compound, propenyl ether, an epoxy compound (oxirane, oxetane) and vinyl ketone. Further preferred examples include a compound having at least one piece of acryloyloxy, and a compound having at least one piece of methacryloyloxy. Still further preferred examples also include a compound having both acryloyloxy and methacryloyloxy.

Still further preferred examples include compounds (M-1) to (M-18). In the compounds, $R^{25}$ to $R^{31}$ are independently hydrogen or methyl; $R^{32}$, $R^{33}$ and $R^{34}$ are independently hydrogen or alkyl having 1 to 5 carbons, and at least one of $R^{32}$, $R^{33}$ and $R^{34}$ is alkyl having 1 to 5 carbons; s, v and x are independently 0 or 1; and t and u are independently an integer from 1 to 10. $L^{21}$ to $L^{26}$ are independently hydrogen or fluorine; and $L^{27}$ and $L^{28}$ are independently hydrogen, fluorine or methyl.

(M-1)

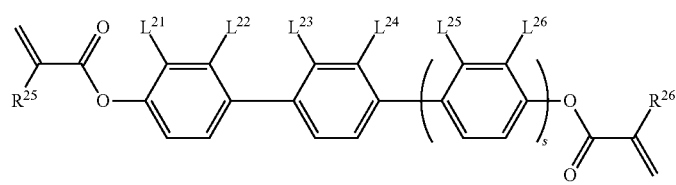

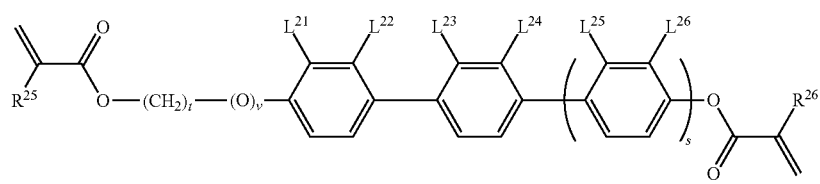
(M-2)
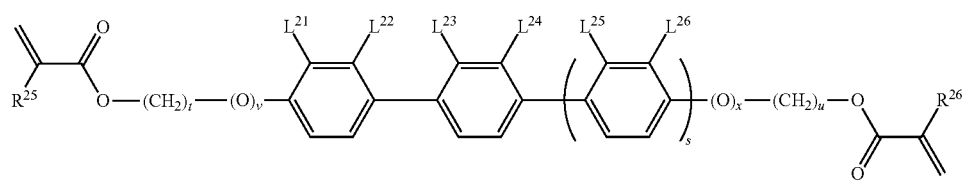
(M-3)
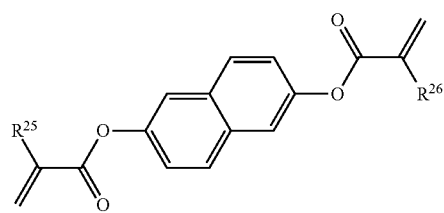
(M-4)
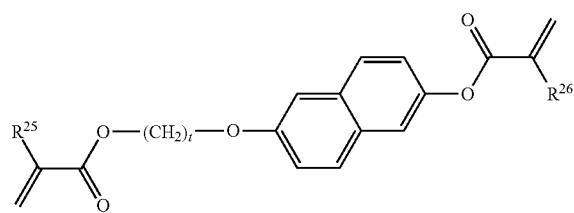
(M-5)
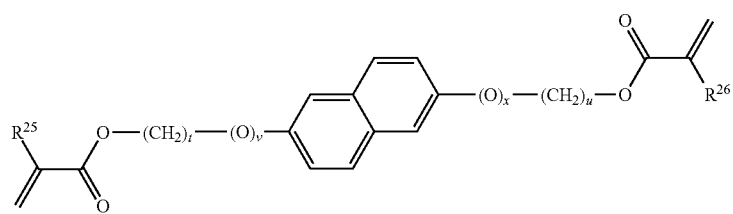
(M-6)
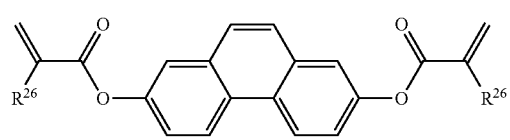
(M-7)
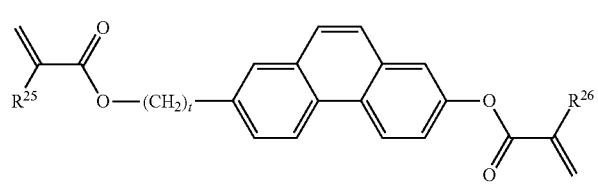
(M-8)
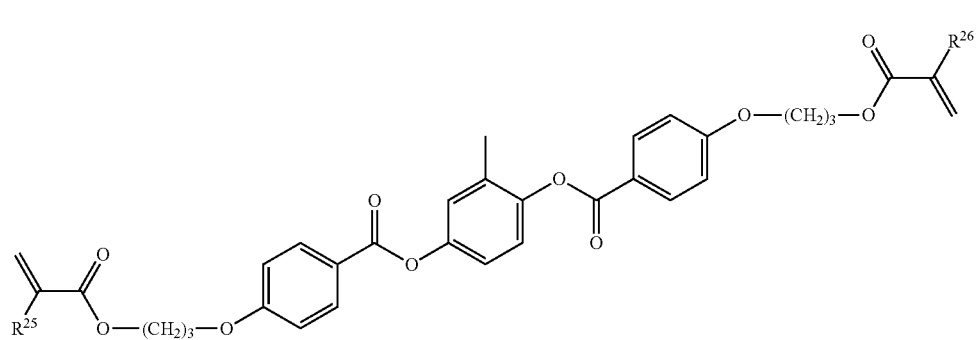
(M-9)

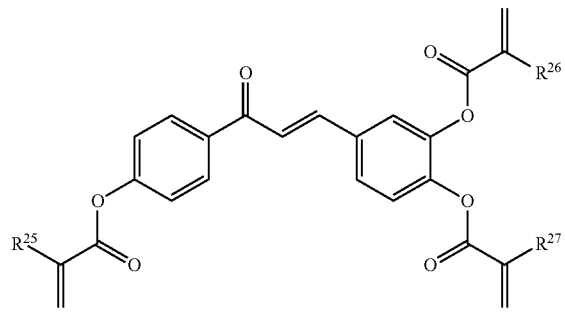
(M-10)
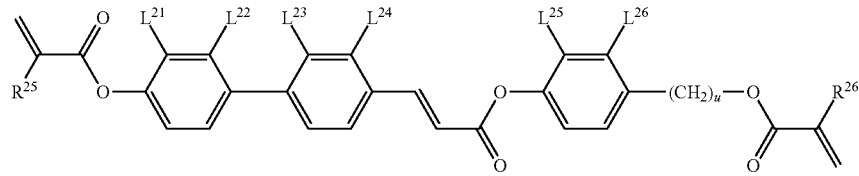
(M-11)
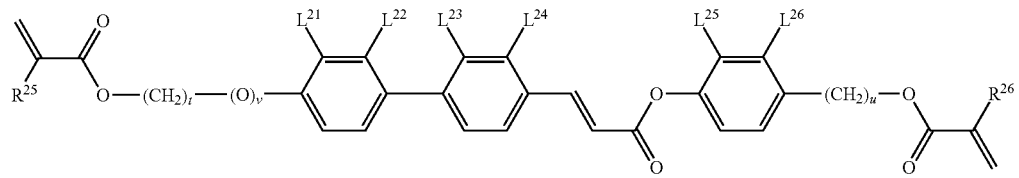
(M-12)
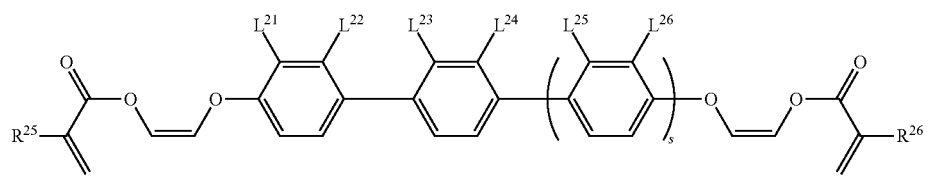
(M-13)
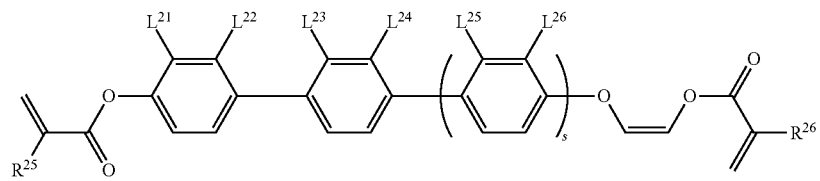
(M-14)
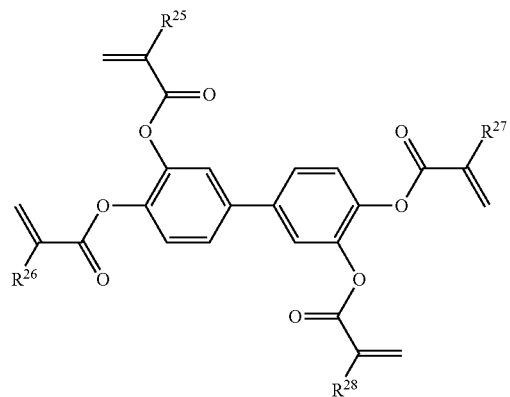
(M-15)

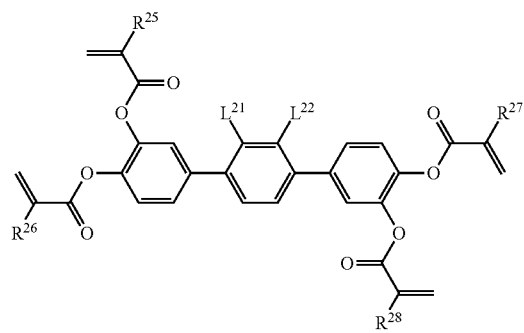
(M-16)

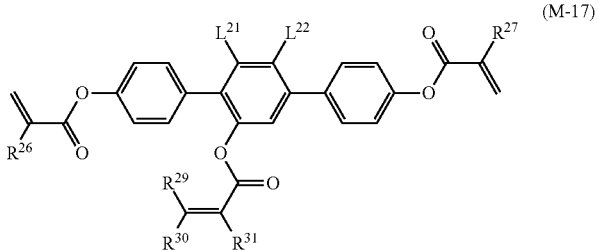
(M-17)

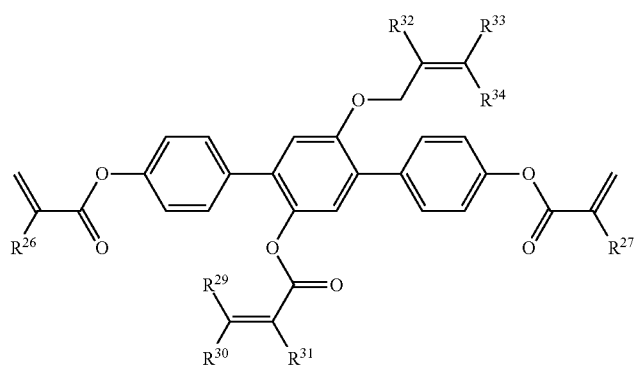
(M-18)

The polymerizable compound can be rapidly polymerized by adding the polymerization initiator. An amount of a remaining polymerizable compound can be decreased by optimizing a reaction temperature. Specific examples of a photoradical polymerization initiator include TPO, 1173 and 4265 from Darocur series of BASF SE, and 184, 369, 500, 651, 784, 819, 907, 1300, 1700, 1800, 1850 and 2959 from Irgacure series thereof.

Additional examples of the photoradical polymerization initiator include 4-methoxyphenyl-2,4-bis(trichloromethyl) triazine, 2-(4-butoxystyryl)-5-trichloromethyl-1,3,4-oxadiazole, 9-phenylacridine, 9,10-benzphenazine, a benzophenone-Michler's ketone mixture, a hexaarylbiimidazole-mercaptobenzimidazole mixture, 1-(4-isopropylphenyl)-2-hydroxy-2-methylpropane-1-one, benzyl dimethyl ketal, 2-methyl-1-[4-(methylthio)phenyl]-2-morpholinopropane-1-one, a mixture of 2,4-diethylxanthone and methyl p-dimethylaminobenzoate and a mixture of benzophenone and methyltriethanolamine.

After the photoradical polymerization initiator is added to the liquid crystal composition, polymerization can be performed by irradiation with ultraviolet light while an electric field is applied. However, an unreacted polymerization initiator or a decomposition product of the polymerization initiator may cause a poor display such as the image persistence in the device. In order to prevent such an event, photopolymerization may be performed with no addition of the polymerization initiator. A preferred wavelength of irradiation light is in the range of about 150 nanometers to about 500 nanometers. A further preferred wavelength is in the range of about 250 nanometers to about 450 nanometers, and a most preferred wavelength is in the range of about 300 nanometers to about 400 nanometers.

Upon storing the polymerizable compound, the polymerization inhibitor may be added thereto for preventing polymerization. The polymerizable compound is ordinarily added to the composition without removing the polymerization inhibitor. Specific examples of the polymerization inhibitor include hydroquinone, a hydroquinone derivative such as methylhydroquinone, 4-t-butylcatechol, 4-methoxyphenol and phenothiazine.

The optically active compound is effective in inducing a helical structure in liquid crystal molecules to give a required twist angle, and thereby preventing a reverse twist. A helical pitch can be adjusted by adding the optically active compound thereto. Two or more optically active compounds may be added for the purpose of adjusting temperature dependence of the helical pitch. Specific examples of a preferred optically active compound include compounds (Op-1) to (Op-18) described below. In compound (Op-18), ring F is 1,4-cyclohexylene or 1,4-phenylene, and $R^{21}$ is alkyl having 1 to 10 carbons. Asterisk mark (*) represents asymmetrical carbon.

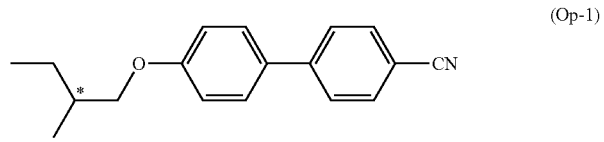
(Op-1)

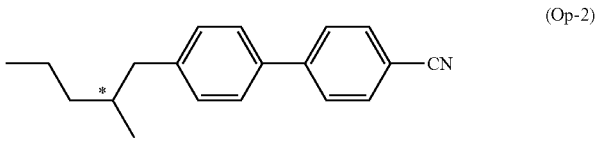
(Op-2)

-continued
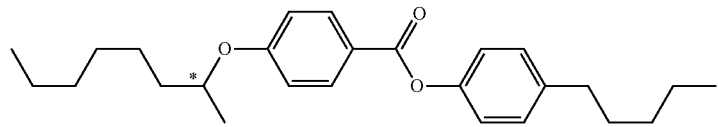
(Op-3)
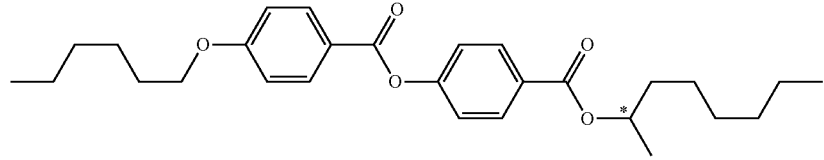
(Op-4)
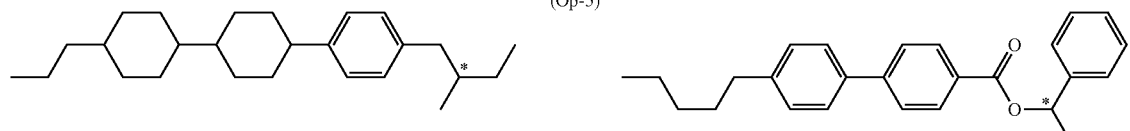
(Op-5)              (Op-6)
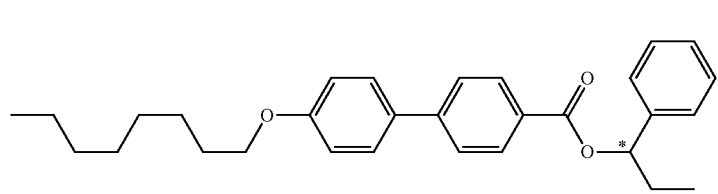
(Op-7)
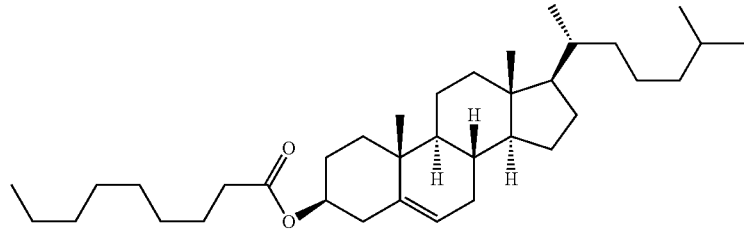
(Op-8)
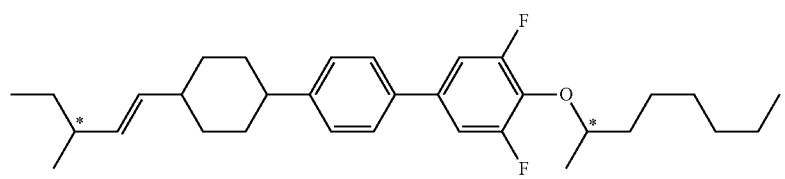
(Op-9)
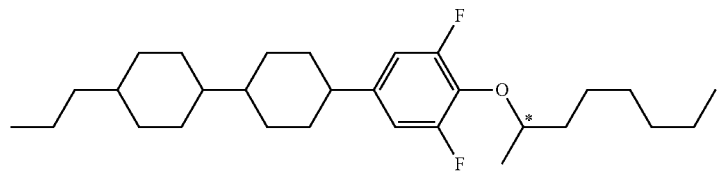
(Op-10)
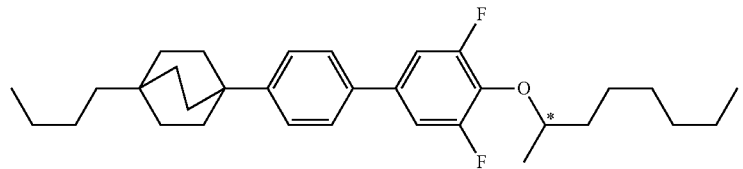
(Op-11)
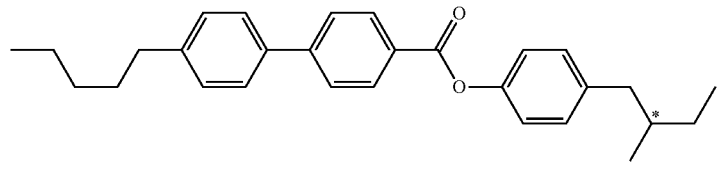
(Op-12)

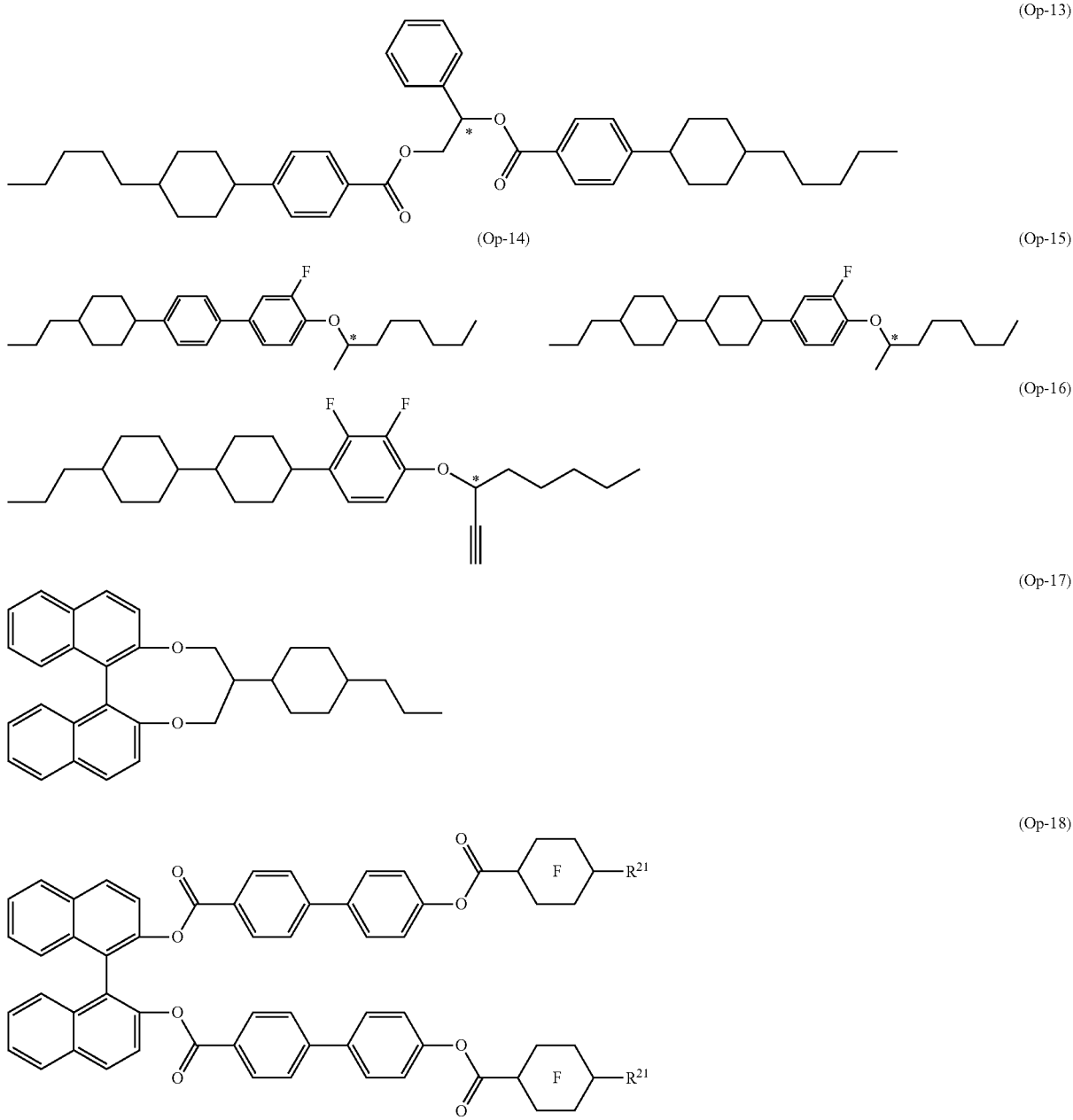

The antioxidant is effective for maintaining the large voltage holding ratio. Specific examples of a preferred antioxidant include compounds (AO-1) and (AO-2) described below; and Irganox 415, Irganox 565, Irganox 1010, Irganox 1035, Irganox 3114 and Irganox 1098 (trade names; BASF SE). The ultraviolet light absorber is effective for preventing a decrease of the maximum temperature. Preferred examples of the ultraviolet light absorbers include a benzophenone derivative, a benzoate derivative and a triazole derivative, and specific examples include compounds (AO-3) and (AO-4) described below; Tinuvin 329, Tinuvin P, Tinuvin 326, Tinuvin 234, Tinuvin 213, Tinuvin 400, Tinuvin 328 and Tinuvin 99-2 (trade names; BASF SE); and 1,4-diazabicyclo[2.2.2]octane (DABCO).

The light stabilizer such as an amine having steric hindrance is preferred for maintaining the large voltage holding ratio. Specific examples of a preferred light stabilizer include compounds (AO-5), (AO-6) and (AO-7) described below; Tinuvin 144, Tinuvin 765 and Tinuvin 770DF (trade names; BASF SE); and LA-77Y and LA-77G (trade names; ADEKA Corporation). The heat stabilizer is also effective for maintaining the large voltage holding ratio, and specific preferred examples include Irgafos 168 (trade name; BASF SE). A dichroic dye such as an azo dye or an anthraquinone dye is added to the composition to be adapted for a device having a guest host (GH) mode. The antifoaming agent is effective for preventing foam formation. Specific examples of a preferred antifoaming agent include dimethyl silicone oil and methylphenyl silicone oil.

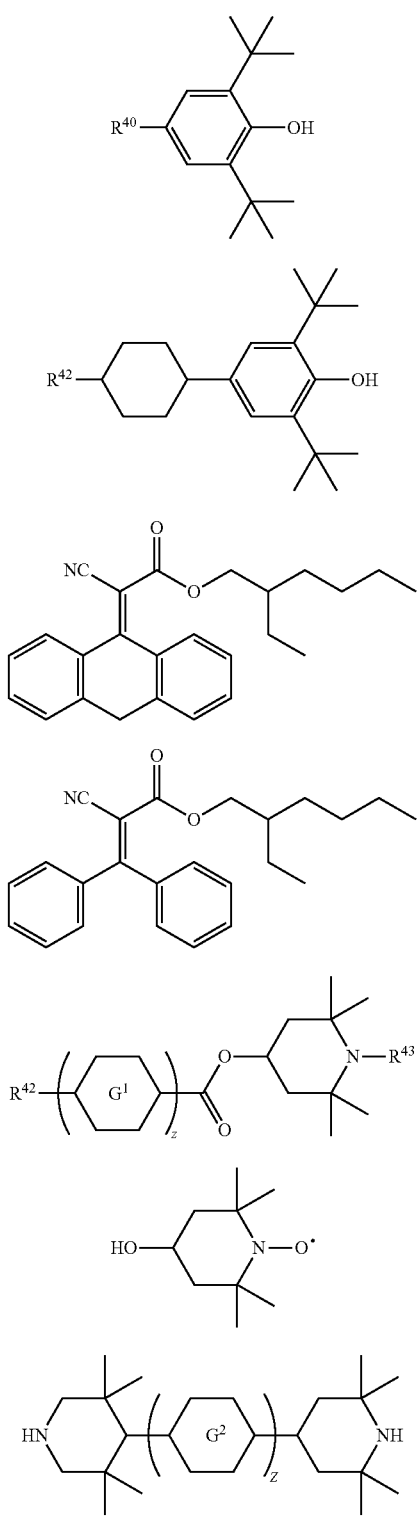

(AO-1)
(AO-2)
(AO-3)
(AO-4)
(AO-5)
(AO-6)
(AO-7)

In compound (AO-1), $R^{40}$ is alkyl having 1 to 20 carbons, alkoxy having 1 to 20 carbons, —COOR$^{41}$ or —CH$_2$CH$_2$COOR$^{41}$, in which $R^{41}$ is alkyl having 1 to 20 carbons. In compounds (AO-2) and (AO-5), $R^{42}$ is alkyl having 1 to 20 carbons. In compound (AO-5), $R^{43}$ is hydrogen, methyl or O$^-$ (oxygen radical); and ring $G^1$ is 1,4-cyclohexylene or 1,4-phenylene; and in compound (AO-7), ring $G^2$ is 1,4-cyclohexylene, 1,4-phenylene or 1,4-phenylene in which at least one piece of hydrogen is replaced by fluorine; and in compounds (AO-5) and (AO-7), z is 1, 2 or 3.

4. Liquid Crystal Display Device

The liquid crystal composition can be used for the liquid crystal display device having an operating mode such as the PC mode, the TN mode, the STN mode, the OCB mode and the PSA mode, and driven by an active matrix. The composition can also be used for the liquid crystal display device having the operating mode such as the PC mode, the TN mode, the STN mode, the OCB mode, the VA mode and the IPS mode, and driven by a passive matrix mode. The devices can be applied to any of a reflective type, a transmissive type and a transflective type.

The composition is also suitable for a nematic curvilinear aligned phase (NCAP) device, and the composition is microencapsulated herein. The composition can also be used for a polymer dispersed liquid crystal display device (PDLCD) and a polymer network liquid crystal display device (PNLCD). In the compositions, a lot of polymerizable compounds are added. On the other hand, when an amount of adding the polymerizable compound is about 10% by weight or less based on the weight of the liquid crystal composition, the liquid crystal display device having the PSA mode can be prepared. A preferred proportion is in the range of about 0.1% by weight to about 2% by weight. A further preferred proportion is in the range of about 0.2% by weight to about 1.0% by weight.

EXAMPLES

The invention will be described in greater detail by way of Examples (including Synthesis Examples and Use Examples). However, the invention is not limited by the Examples. The invention includes a mixture of a composition in Use Example 1 and a composition in Use Example 2. The invention also includes a composition prepared by mixing at least two of compositions in the Use Examples.

1. Example of Compound (1)

Compound (1) was prepared according to procedures described below. The thus prepared compound was identified by methods such as an NMR analysis. Physical properties of the compound and the composition and characteristics of a device were measured by methods described below.

NMR analysis: For measurement, DRX-500 made by Bruker BioSpin Corporation was used. In $^1$H-NMR measurement, a sample was dissolved in a deuterated solvent such as CDCl$_3$, and measurement was carried out under conditions of room temperature, 500 MHz and 16 times of accumulation. Tetramethylsilane was used as an internal standard. In $^{19}$F-NMR measurement, CFCl$_3$ was used as an internal standard, and measurement was carried out under conditions of 24 times of accumulation. In explaining nuclear magnetic resonance spectra obtained, s, d, t, q, quin, sex and m stand for a singlet, a doublet, a triplet, a quartet, a quintet, a sextet and a multiplet, and br being broad, respectively.

Gas chromatographic analysis: For measurement, GC-2010 Gas Chromatograph made by Shimadzu Corporation was used. As a column, a capillary column DB-1 (length 60 m, bore 0.25 mm, film thickness 0.25 μm) made by Agilent Technologies, Inc. was used. As a carrier gas, helium (1 mL/minute) was used. A temperature of a sample vaporizing chamber and a temperature of a detector (FID) part were set to 300° C. and 300° C., respectively. A sample was dissolved in acetone and prepared to be a 1 weight % solution, and then 1 microliter of the solution obtained was injected into the sample vaporizing chamber. As a recorder, GC Solution System made by Shimadzu Corporation or the like was used.

HPLC Analysis: For measurement, Prominence (LC-20AD; SPD-20A) made by Shimadzu Corporation was used. As a column, YMC-Pack ODS-A (length 150 mm, bore 4.6 mm, particle diameter 5 μm) made by YMC Co., Ltd. was used. As an eluate, acetonitrile and water were appropriately mixed and used. As a detector, a UV detector, an RI detector, a CORONA detector or the like was appropriately used. When the UV detector was used, a detection wavelength was set at 254 nanometers. A sample was dissolved in acetonitrile and prepared to be a 0.1 weight % solution, and then 1 microliter of the solution was injected into a sample chamber. As a recorder, C-R7Aplus made by Shimadzu Corporation was used.

Ultraviolet-Visible Spectrophotometry: For measurement, PharmaSpec UV-1700 made by Shimadzu Corporation was used. A detection wavelength was adjusted in the range of 190 nanometers to 700 nanometers. A sample was dissolved in acetonitrile and prepared to be a 0.01 mmol/L solution, and measurement was carried out by putting the solution in a quartz cell (optical path length: 1 cm).

Sample for measurement: Upon measuring phase structure and a transition temperature (a clearing point, a melting point, a polymerization starting temperature or the like), a compound itself was used as a sample. Upon measuring physical properties such as maximum temperature of a nematic phase, viscosity, optical anisotropy and dielectric anisotropy, a mixture of a compound and a base liquid crystal was used as a sample.

When the sample prepared by mixing the compound with the base liquid crystal was used, an extrapolated value was calculated according to the following formula and the calculated value was described: [extrapolated value]=(100×[measured value of a sample]−[% by weight of a base liquid crystal]×[measured value of the base liquid crystal])/[% by weight of a compound].

Base liquid crystal (A): When the dielectric anisotropy of the compound was zero or positive, base liquid crystal (A) described below was used. A proportion of each component was expressed in terms of % by weight.

A ratio of the compound to base liquid crystal (A) was adjusted to (15% by weight:85% by weight). When crystals (or a smectic phase) precipitated at 25° C. at the ratio, a ratio of the compound to base liquid crystal (A) was changed in the order of (10% by weight:90% by weight), (5% by weight:95% by weight) and (1% by weight:99% by weight), and the sample was measured at a ratio at which no crystal (or no smectic phase) precipitated at 25° C. In addition, unless otherwise noted, the ratio of the compound to base liquid crystal (A) was (15% by weight:85% by weight).

Base liquid crystal (B): In Comparative Example 2, base liquid crystal (B) having a fluorine-based compound described below as a component was also used. A proportion of a component of base liquid crystal (B) was expressed in terms of % by weight.

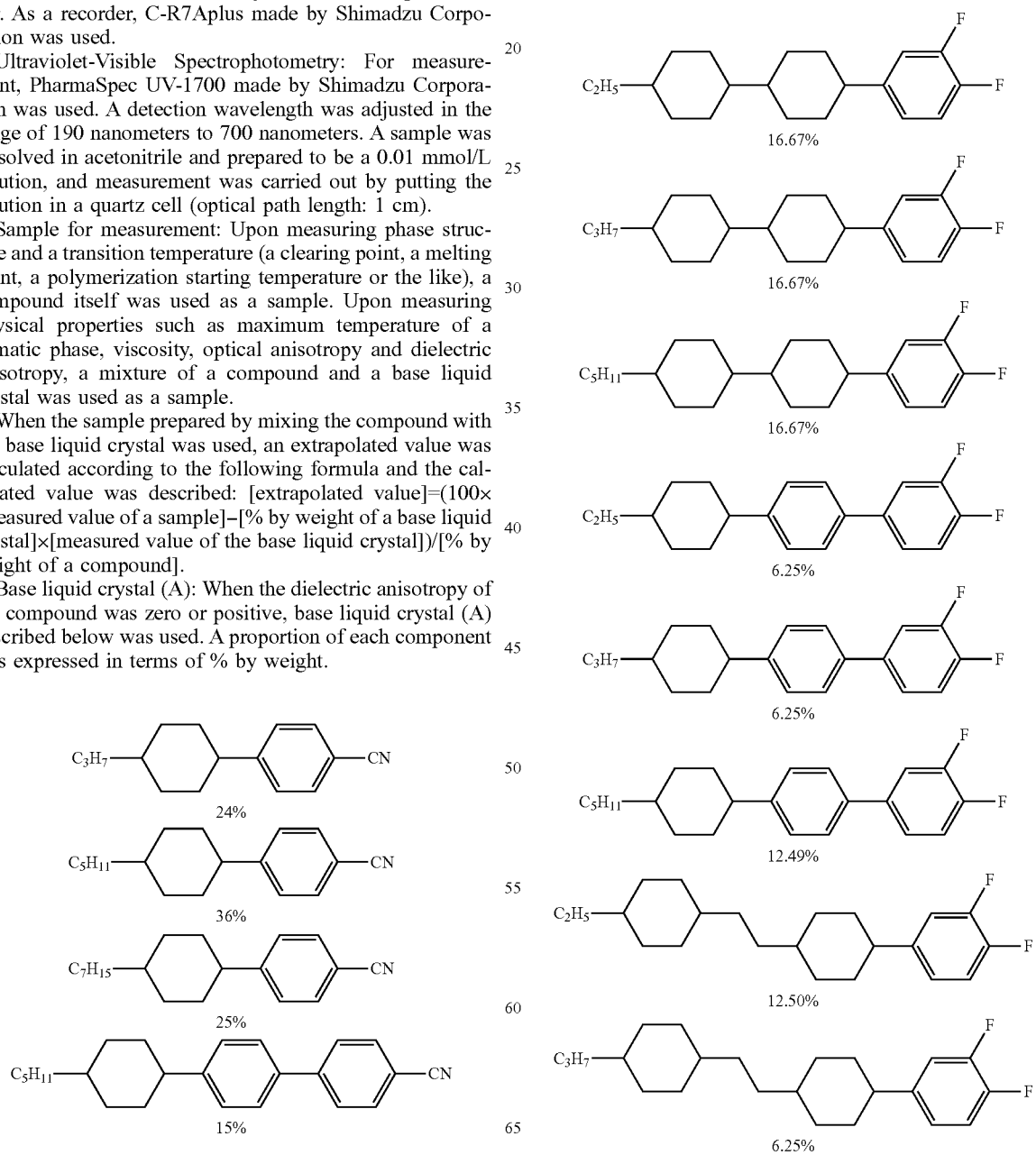

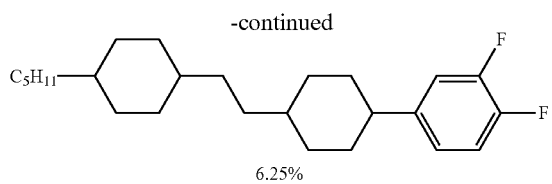

6.25%

A ratio of the compound to base liquid crystal (B) was adjusted to (20% by weight:80% by weight). When crystals (or a smectic phase) precipitated at 25° C. at the ratio, a ratio of the compound to base liquid crystal (B) was changed in the order of (15% by weight:85% by weight), (10% by weight:90% by weight), (5% by weight:95% by weight) and (1% by weight:99% by weight), and physical properties of the sample were measured at a ratio at which no crystal (or no smectic phase) precipitated at 25° C. In addition, unless otherwise noted, the ratio of the compound to base liquid crystal (B) was (20% by weight:80% by weight).

Measuring method: Physical properties were measured according to methods described below. Most of the methods are described in the Standard of Japan Electronics and Information Technology Industries Association (JEITA) discussed and established in JEITA (JEITA ED-2521B). A modified method was also applied. No thin film transistor (TFT) was attached to a TN device used for measurement.

(1) Phase structure: A sample was placed on a hot plate in a melting point apparatus (FP-52 Hot Stage made by Mettler-Toledo International Inc.) equipped with a polarizing microscope. A state of phase and a change thereof were observed with the polarizing microscope while the sample was heated at a rate of 3° C. per minute, and a kind of the phase was specified.

(2) Transition temperature (° C.): For measurement, a differential scanning calorimeter, Diamond DSC System, made by PerkinElmer, Inc., or a high sensitivity differential scanning calorimeter, X-DSC7000, made by SII NanoTechnology Inc. was used. A sample was heated and then cooled at a rate of 3° C. per minute, and a starting point of an endothermic peak or an exothermic peak caused by a phase change of the sample was determined by extrapolation, and thus a transition temperature was determined. A melting point and a polymerization starting temperature of a compound were also measured using the apparatus. Temperature at which a compound undergoes transition from a solid to a liquid crystal phase such as the smectic phase and the nematic phase may be occasionally abbreviated as "minimum temperature of the liquid crystal phase." Temperature at which the compound undergoes transition from the liquid crystal phase to liquid may be occasionally abbreviated as "clearing point."

A crystal was expressed as C. When kinds of the crystals were distinguishable, each of the crystals was expressed as $C_1$ or $C_2$. The smectic phase or the nematic phase was expressed as S or N. When smectic A phase, smectic B phase, smectic C phase or smectic F phase was distinguishable among the smectic phases, the phases were expressed as $S_A$, $S_B$, $S_C$ or $S_F$, respectively. A liquid (isotropic) was expressed as I. A transition temperature was expressed as "C 50.0 N, 100.0 I," for example. The expression indicates that a transition temperature from the crystals to the nematic phase is 50.0° C., and a transition temperature from the nematic phase to the liquid is 100.0° C.

(3) Compatibility at low temperature: Samples in which the base liquid crystal and the compound were mixed for proportions of the compounds to be 20% by weight, 15% by weight, 10% by weight, 5% by weight, 3% by weight and 1% by weight were prepared, and put in glass vials. After the glass vials were kept in freezers at –10° C. or –20° C. for a predetermined period of time, whether or not crystals or a smectic phase precipitated was observed.

(4) Maximum temperature of nematic phase ($T_{NI}$ or NI; ° C.): A sample was placed on a hot plate in a melting point apparatus equipped with a polarizing microscope, and heated at a rate of 1° C. per minute. Temperature when part of the sample began to change from a nematic phase to an isotropic liquid was measured. When the sample was a mixture of compound (1) and the base liquid crystal, the maximum temperature was expressed in terms of a symbol $T_{NI}$. When the sample was a mixture of compound (1) and a compound such as components B, C and D, the maximum temperature was expressed as a symbol NI. A maximum temperature of the nematic phase may be occasionally abbreviated as "maximum temperature."

(5) Minimum temperature of nematic phase ($T_C$; ° C.): Samples each having a nematic phase were put in glass vials and kept in freezers at temperatures of 0° C., –10° C., –20° C., –30° C. and –40° C. for 10 days, and then liquid crystal phases were observed. For example, when the sample maintained the nematic phase at –20° C. and changed to crystals or a smectic phase at –30° C., $T_C$ was expressed as $T_C$<–20° C. A minimum temperature of the nematic phase may be occasionally abbreviated as "minimum temperature."

(6) Viscosity (bulk viscosity; η; measured at 20° C.; mPa·s): For measurement, a cone-plate (E type) rotational viscometer made by Tokyo Keiki Inc. was used.

(7) Viscosity (rotational viscosity; γ1; measured at 25° C.; mPa·s): Measurement was carried out according to a method described in M. Imai et al., Molecular Crystals and Liquid Crystals, Vol. 259, p. 37 (1995). A sample was put in a TN device in which a twist angle was 0 degrees and a distance (cell gap) between two glass substrates was 5 micrometers. Voltage was applied stepwise to the device in the range of 16 V to 19.5 V at an increment of 0.5 V. After a period of 0.2 second with no voltage application, voltage was repeatedly applied under conditions of only one rectangular wave (rectangular pulse; 0.2 second) and no voltage application (2 seconds). A peak current and a peak time of transient current generated by the applied voltage were measured. A value of rotational viscosity was obtained from the measured values and calculation equation (8) described on page 40 of the paper presented by M. Imai et al. A value of dielectric anisotropy required for the calculation was determined using the device by which the rotational viscosity was measured and by a method described below.

(8) Optical anisotropy (refractive index anisotropy; measured at 25° C.; Δn): Measurement was carried out by an Abbe refractometer with a polarizing plate mounted on an ocular, using light at a wavelength of 589 nanometers. A surface of a main prism was rubbed in one direction, and then a sample was added dropwise onto the main prism. A refractive index (n∥) was measured when a direction of polarized light was parallel to a direction of rubbing. A refractive index (n⊥) was measured when the direction of polarized light was perpendicular to the direction of rubbing. A value of optical anisotropy (Δn) was calculated from an equation: Δn=n∥–n⊥.

(9) Dielectric anisotropy (Δε; measured at 25° C.): A sample was put in a TN device in which a distance (cell gap) between two glass substrates was 9 micrometers and a twist angle was 80 degrees. Sine waves (10 V, 1 kHz) were applied to the device, and after 2 seconds, a dielectric constant (ε∥) of liquid crystal molecules in a major axis direction was measured. Sine waves (0.5 V, 1 kHz) were applied to the device, and after 2 seconds, a dielectric constant ($\varepsilon\perp$) of liquid crystal molecules in a minor axis direction was measured. A value of dielectric anisotropy was calculated from an equation: $\Delta\varepsilon=\varepsilon\|-\varepsilon\perp$.

(10) Elastic constant (K; measured at 25° C.; pN): For measurement, HP4284A LCR Meter made by Yokogawa-Hewlett-Packard Co. was used. A sample was put in a horizontal alignment device in which a distance (cell gap) between two glass substrates was 20 micrometers. An electric charge of 0 V to 20 V was applied to the device, and electrostatic capacity (C) and applied voltage (V) were measured. The measured values were fitted to equation (2.98) and equation (2.101) on page 75 of "Liquid Crystal Device Handbook" (Ekisho Debaisu Handobukku in Japanese; Nikkan Kogyo Shimbun, Ltd.) and values of $K_{11}$ and $K_{33}$ were obtained from equation (2.99). Next, $K_{22}$ was calculated using the previously determined values of $K_{11}$ and $K_{33}$ in equation (3.18) on page 171. Elastic constant K was expressed in terms of a mean value of the thus determined $K_{11}$, $K_{22}$ and $K_{33}$.

(11) Threshold voltage (Vth; measured at 25° C.; V): For measurement, an LCD-5100 luminance meter made by Otsuka Electronics Co., Ltd. was used. A light source was a halogen lamp. A sample was put in a normally white mode TN device in which a distance (cell gap) between two glass substrates was 0.45/Δn (μm) and a twist angle was 80 degrees. A voltage (32 Hz, rectangular waves) to be applied to the device was stepwise increased from 0 V to 10 V at an increment of 0.02 V. On the occasion, the device was irradiated with light from a direction perpendicular to the device, and an amount of light transmitted through the device was measured. A voltage-transmittance curve was prepared, in which the maximum amount of light corresponds to 100% transmittance and the minimum amount of light corresponds to 0% transmittance. A threshold voltage is expressed in terms of a voltage at 90% transmittance.

(12) Voltage holding ratio (VHR-1; measured at 25° C.; %): A TN device used for measurement had a polyimide alignment film, and a distance (cell gap) between two glass substrates was 5 micrometers. A sample was put in the device, and then the device was sealed with an ultraviolet-curable adhesive. The device was charged by applying a pulse voltage (60 microseconds at 5 V) at 25° C. A decaying voltage was measured for 16.7 milliseconds with a high-speed voltmeter, and area A between a voltage curve and a horizontal axis in a unit cycle was determined. Area B is an area without decay. A voltage holding ratio is expressed in terms of a percentage of area A to area B.

(13) Voltage holding ratio (VHR-2; measured at 80° C.; %): A voltage holding ratio was measured by a method described above except that the voltage holding ratio was measured at 80° C. in place of 25° C. The results were expressed in terms of a symbol VHR-2.

(14) Specific resistance (ρ; measured at 25° C.; Ωcm): Into a vessel equipped with electrodes, 1.0 milliliter of sample was injected. A direct current voltage (10 V) was applied to the vessel, and a direct current after 10 seconds was measured. Specific resistance was calculated from the following equation: (specific resistance)={(voltage)×(electric capacity of a vessel)}/{(direct current)×(dielectric constant of vacuum)}.

(15) Response time (i; measured at 25° C.; ms): For measurement, an LCD-5100 luminance meter made by Otsuka Electronics Co., Ltd. was used. A light source was a halogen lamp. A low-pass filter was set to 5 kHz. A sample was put in a normally white mode TN device in which a distance (cell gap) between two glass substrates was 5.0 micrometers and a twist angle was 80 degrees. A voltage (rectangular waves; 60 Hz, 5 V, 0.5 second) was applied to the device. On the occasion, the device was irradiated with light from a direction perpendicular to the device, and an amount of light transmitted through the device was measured. The maximum amount of light corresponds to 100% transmittance, and the minimum amount of light corresponds to 0% transmittance. A rise time (τr; millisecond) was expressed in terms of time required for a change from 90% transmittance to 10% transmittance. A fall time (τf; millisecond) was expressed in terms of time required for a change from 10% transmittance to 90% transmittance. A response time was expressed by a sum of the rise time and the fall time thus obtained.

(16) Flicker rate (measured at 25° C.; %): For measurement, 3298F Multimedia Display Tester made by Yokogawa Electric Corporation was used. A light source was LED. A sample was put in a normally black mode FFS device in which a distance (cell gap) between two glass substrates was 3.5 micrometers and a rubbing direction was anti-parallel. The device was sealed with an ultraviolet-curable adhesive. Voltage was applied to the device, and a voltage having a maximum amount of light transmitted through the device was measured. A flicker rate displayed thereon was read by bringing a sensor unit close to the device while voltage was applied to the device.

Raw material: Solmix (registered trade name) A-11 is a mixture of ethanol (85.5%), methanol (13.4%) and isopropanol (1.1%), and was purchased from Japan Alcohol Trading Co., Ltd.

Synthesis Example 1

Synthesis of Compound (No. 1-1-4)

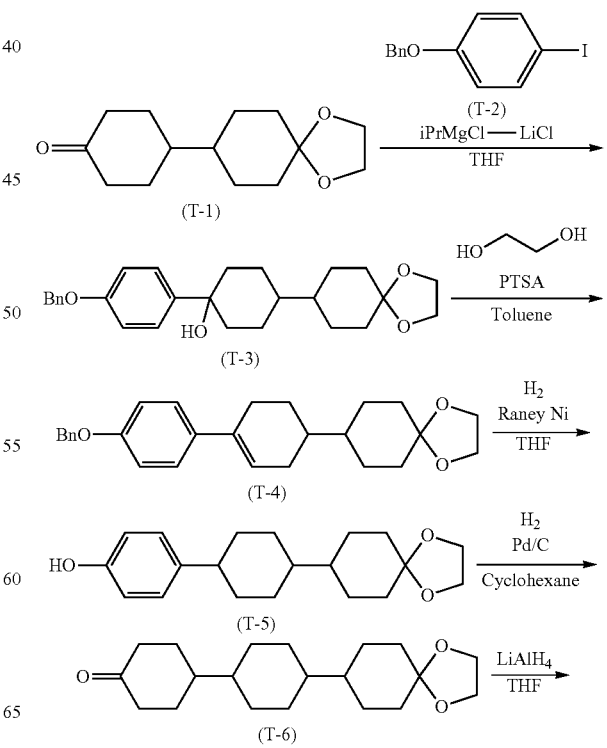

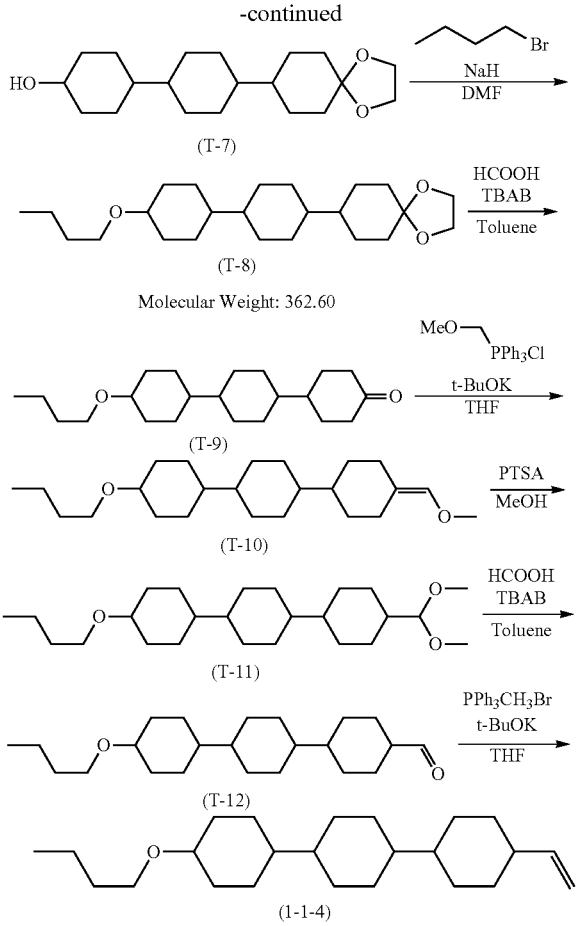

Third Step:

Compound (T-4) (180 g), Raney nickel (18.8 g) and THF (1.88 L) were put in a reaction vessel, and the resulting mixture was stirred for 12 hours under a hydrogen atmosphere. A catalyst was separated by filtrating the resulting mixture, and then the resulting material was concentrated under reduced pressure, and the residue was purified by silica gel chromatography (toluene/ethyl acetate=2/1 in a volume ratio). The residue was further purified by recrystallization from heptane to obtain compound (T-5) (22.2 g, yield: 16%).

Fourth Step:

Compound (T-5) (22.2 g), a palladium on carbon catalyst (NX type of 10% Pd/C (50% wet); 2.22 g; made by N.E. Chemcat Corporation) and cyclohexane (222 mL) were put in an autoclave, and the resulting mixture was heated to 55° C. under hydrogen pressurization and stirred for 2 days. The catalyst was separated by filtrating the resulting mixture, and then the resulting material was concentrated under reduced pressure, and the residue was purified by silica gel chromatography (toluene/ethyl acetate=5/1 in a volume ratio) to obtain compound (T-6) (12.1 g, 54%).

Fifth Step:

Under a nitrogen atmosphere, lithium aluminum hydride (0.860 g) and tetrahydrofuran (THF) (60.0 mL) were put in a reaction vessel, and the resulting mixture was cooled down to −10° C. A THF (60.0 mL) solution of compound (T-6) (12.1 g) was slowly added dropwise thereto, and further stirred for 12 hours while returning to room temperature. The resulting reaction mixture was poured into a saturated aqueous solution of ammonium chloride, an insoluble matter was separated by filtrating the resulting mixture, and then an aqueous layer was subjected to extraction with ethyl acetate. Combined organic layers were washed with water, and dried over anhydrous magnesium sulfate. The solution was concentrated under reduced pressure, and the residue was purified by recrystallization from (toluene/heptane=5/1 in a volume ratio) to obtain compound (T-7) (12.0 g, yield: 98%).

Sixth Step:

Under a nitrogen atmosphere, compound (T-7) (12.0 g), sodium hydride (3.25 g) and DMF (N,N-dimethylformamide) (60.0 mL) were put therein, and the resulting mixture was heated to 70° C. Then, 1-bromobutane (8.00 mL) was added dropwise thereto, and the resulting mixture was stirred for 8 hours while maintaining at 70° C. The resulting reaction mixture was poured into ice water, and an aqueous layer was subjected to extraction with ethyl acetate. Combined organic layers were washed with water, and dried over anhydrous magnesium sulfate. The solution was concentrated under reduced pressure, and the residue was purified by silica gel chromatography (toluene/ethyl acetate=10/1 in a volume ratio). The residue was further purified by recrystallization from (toluene/heptane=1/1 in a volume ratio) to obtain compound (T-8) (7.30 g, yield: 52%).

Seventh Step:

Under a nitrogen atmosphere, compound (T-8) (7.30 g), formic acid (21.9 mL), TBAB (tetrabutylammonium bromide) (1.86 g) and toluene (73.0 mL) were put in a reaction vessel, and the resulting mixture was stirred at room temperature for 12 hours. The resulting organic layer was separated, washed with water, a saturated aqueous solution of sodium hydrogencarbonate and water in the order thereof, and dried over anhydrous magnesium sulfate. The solution was concentrated under reduced pressure, and the residue was purified by silica gel column chromatography (toluene) to obtain compound (T-9) (6.40 g, yield: 99%).

First Step:

Under a nitrogen atmosphere, an isopropylmagnesium chloride-lithium chloride complex (1.30 M; THF solution; 381 mL) and THF (tetrahydrofuran) (700 mL) were put in a reaction vessel, and the resulting mixture was cooled down to 0° C. Compound (T-2) (140 g) was slowly added thereto, and stirred for 1 hour while maintaining at 0° C. Next, compound (T-1) (113 g) was slowly added, and stirred for 12 hours while returning to room temperature. The resulting reaction mixture was poured into a saturated aqueous solution of ammonium chloride, and an aqueous layer was subjected to extraction with toluene. Combined organic layers were washed with water, and dried over anhydrous magnesium sulfate. The solution was concentrated under reduced pressure, and the residue was purified by silica gel column chromatography (toluene/ethyl acetate=5/1 in a volume ratio) to obtain compound (T-3) (188 g, yield: 99%).

Second Step:

Under a nitrogen atmosphere, compound (T-3) (188 g), ethylene glycol (9.42 g), PTSA (p-toluenesulfonic acid monohydrate) (5.65 g) and toluene (1.88 L) were put in a reaction vessel, and the resulting mixture was heated and refluxed for 3 hours while distilled-off water was removed. The resulting reaction mixture was washed with water, and dried over anhydrous magnesium sulfate. The solution was concentrated under reduced pressure, and the residue was purified by silica gel chromatography (toluene/ethyl acetate=10/1 in a volume ratio) to obtain compound (T-4) (180 g, 100%).

Eighth Step:

Under a nitrogen atmosphere, (methoxymethyl)triphenylphosphonium chloride (9.84 g) and THF (34.0 mL) were put in a reaction vessel, and the resulting mixture was cooled down to −30° C. Potassium t-butoxide (3.22 g) was added thereto, and the resulting mixture was stirred for 1 hour while maintaining at −30° C. Next, a THF (30.0 mL) solution of compound (T-9) (6.40 g) was slowly added dropwise thereto, and after being added dropwise, the resulting mixture was heated to room temperature. The resulting reaction mixture was poured into water, and an aqueous layer was subjected to extraction with toluene. Combined organic layers were washed with saturated brine and water in the order thereof, and dried over anhydrous magnesium sulfate. The solution was concentrated under reduced pressure, and the residue was purified by silica gel column chromatography (toluene/heptane=2/1 in a volume ratio) to obtain compound (T-10) (6.93 g, yield: 100%).

Ninth Step:

Under a nitrogen atmosphere, compound (T-10) (6.93 g), PTSA (2.18 g) and methanol (64.0 mL) were put in a reaction vessel, and the resulting mixture was stirred under heating reflux for 8 hours. The resulting reaction mixture was poured into water, and an aqueous layer was subjected to extraction with toluene. Combined organic layers were washed with a saturated aqueous solution of sodium hydrogencarbonate, water and brine in the order thereof, and dried over anhydrous magnesium sulfate. The solution was concentrated under reduced pressure, and the residue was purified by recrystallization from heptane to obtain compound (T-11) (5.40 g, yield: 72%).

Tenth Step:

Under a nitrogen atmosphere, compound (T-11) (5.40 g), formic acid (2.62 mL), TBAB (1.32 g) and toluene (55.0 mL) were put in a reaction vessel, and the resulting mixture was stirred at room temperature for 12 hours. The resulting organic layer was separated, washed with water, a saturated aqueous solution of sodium hydrogencarbonate and water in the order thereof, and dried over anhydrous magnesium sulfate. The solution was concentrated under reduced pressure to obtain compound (T-12) (4.67 g, yield: 98%).

Eleventh Step:

Under a nitrogen atmosphere, methyltriphenylphosphonium bromide (5.26 g) and THF (25.0 mL) were put in a reaction vessel, and the resulting mixture was cooled down to −30° C. Potassium t-butoxide (1.65 g) was added thereto, and the resulting mixture was stirred for 1 hour while maintaining at −30° C. Next, a THF (25.0 mL) solution of compound (T-12) (4.67 g) was slowly added dropwise thereto, and after being added dropwise, the resulting mixture was heated to room temperature. The resulting reaction mixture was poured into water, and an aqueous layer was subjected to extraction with toluene. Combined organic layers were washed with saturated brine and water in the order thereof, and dried over anhydrous magnesium sulfate. The solution was concentrated under reduced pressure, and the residue was purified by silica gel column chromatography (toluene). The residue was further purified by recrystallization from (Solmix (registered trade name) A-11/heptane=1/1 in a volume ratio) to obtain compound (No. 1-1-4) (2.59 g, yield: 56%).

$^1$H-NMR (ppm; CDCl$_3$): δ 5.82-5.72 (m, 1H), 5.00-4.82 (m, 2H), 3.44 (t, J=6.6 Hz, 2H), 3.11 (tt, J=10.9 Hz, J=4.1 Hz, 1H), 2.09-1.99 (m, 2H), 1.93-1.68 (m, 11H), 1.58-1.49 (m, 2H), 1.42-1.30 (m, 2H), 1.21-0.87 (m, 19H).

Transition temperature: S$_B$ 221 I.

Maximum temperature (T$_{NI}$)=172° C.; dielectric anisotropy (Δε)=0.30; optical anisotropy (Δn)=0.084; viscosity (η)=27.0 mPa·s.

Synthesis Example 2

Synthesis of Compound (No. 1-1-1)

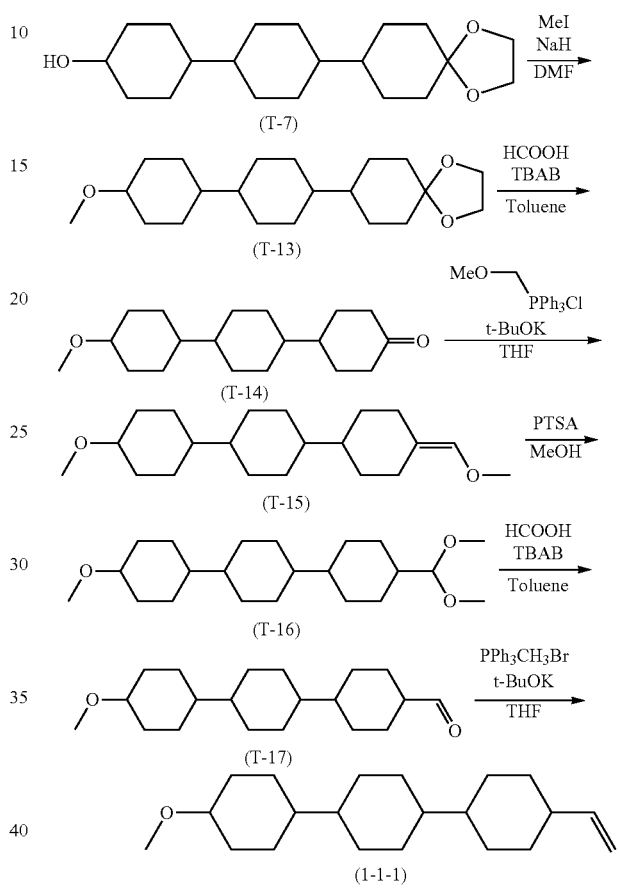

First Step:

Compound (T-13) (7.20 g, 70%) was obtained by using Iodomethane in place of 1-bromobutane in a manner similar to the technique in the sixth step in Synthesis Example 1.

Second Step:

Compound (T-14) (6.01 g, 96%) was obtained by using compound (T-13) (7.20 g) as a raw material in a manner similar to the technique in the seventh step in Synthesis Example 1.

Third Step:

Compound (T-15) (6.52 g, 99%) was obtained by using compound (T-14) (6.01 g) as a raw material in a manner similar to the technique in the eighth step in Synthesis Example 1.

Fourth Step:

Compound (T-16) (5.38 g, 75%) was obtained by using compound (T-15) (6.52 g) as a raw material in a manner similar to the technique in the ninth step in Synthesis Example 1.

Fifth Step:

Compound (T-17) (4.63 g, 99%) was obtained by using compound (T-16) (5.38 g) as a raw material in a manner similar to the technique in the tenth step in Synthesis Example 1.

Sixth Step:
Compound (1-1-1) (2.90 g, 63%) was obtained by using compound (T-17) (4.63 g) as a raw material in a manner similar to the technique in the eleventh step in Synthesis Example 1.

$^1$H-NMR (ppm; CDCl$_3$): δ 5.81-5.71 (m, 1H), 5.00-4.85 (m, 2H), 3.34 (s, 3H), 3.04 (tt, J=10.8 Hz, J=4.2 Hz, 1H), 2.10-2.01 (m, 2H), 1.90-1.68 (m, 11H), 1.20-0.89 (m, 16H).

Transition temperature: C, 38.8 S$_B$, 168 N, 198 I.

Maximum temperature (T$_{NI}$)=162° C.; dielectric anisotropy (Δε)=2.77; optical anisotropy (Δn)=0.084; viscosity (η)=36.7 mPa·s.

Synthesis Example 3

Synthesis of Compound (No. 1-1-2)

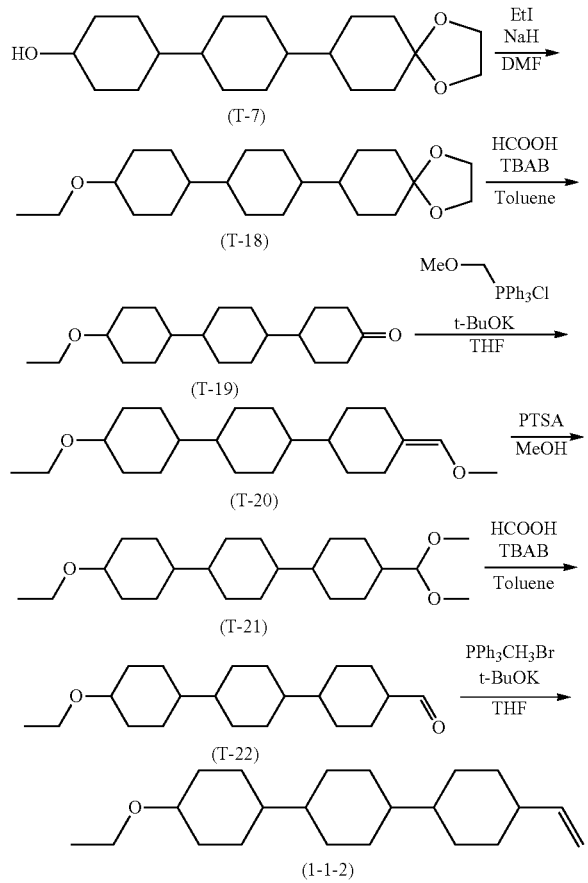

First Step:
Compound (T-18) (6.98 g, 63%) was obtained by using Iodoethane in place of 1-bromobutane in a manner similar to the technique in the sixth step in Synthesis Example 1.

Second Step:
Compound (T-19) (5.92 g, 97%) was obtained by using compound (T-18) (6.98 g) as a raw material in a manner similar to the technique in the seventh step in Synthesis Example 1.

Third Step:
Compound (T-20) (6.40 g, 99%) was obtained by using compound (T-19) (5.92 g) as a raw material in a manner similar to the technique in the eighth step in Synthesis Example 1.

Fourth Step:
Compound (T-21) (4.84 g, 69%) was obtained by using compound (T-20) (6.40 g) as a raw material in a manner similar to the technique in the ninth step in Synthesis Example 1.

Fifth Step:
Compound (T-22) (4.23 g, 100%) was obtained by using compound (T-21) (4.84 g) as a raw material in a manner similar to the technique in the tenth step in Synthesis Example 1.

Sixth Step:
Compound (1-1-2) (2.65 g, 63%) was obtained by using compound (T-22) (4.23 g) as a raw material in a manner similar to the technique in the eleventh step in Synthesis Example 1.

$^1$H-NMR (ppm; CDCl$_3$): δ 5.82-5.71 (m, 1H), 5.00-4.82 (m, 2H), 3.51 (q, J=7.0 Hz, 2H), 3.13 (tt, J=10.9 Hz, J=4.1 Hz, 1H), 2.08-2.00 (m, 2H), 1.92-1.68 (m, 11H), 1.23-1.12 (m, 5H), 1.12-0.89 (m, 14H).

Transition temperature: C, 23.7 S$_B$, 192 N, 222 I.

Maximum temperature (T$_{NI}$)=179° C.; dielectric anisotropy (Δε)=1.43; optical anisotropy (Δn)=0.097; viscosity (η)=25.7 mPa·s.

Synthesis Example 4

Synthesis of Compound (No. 1-1-3)

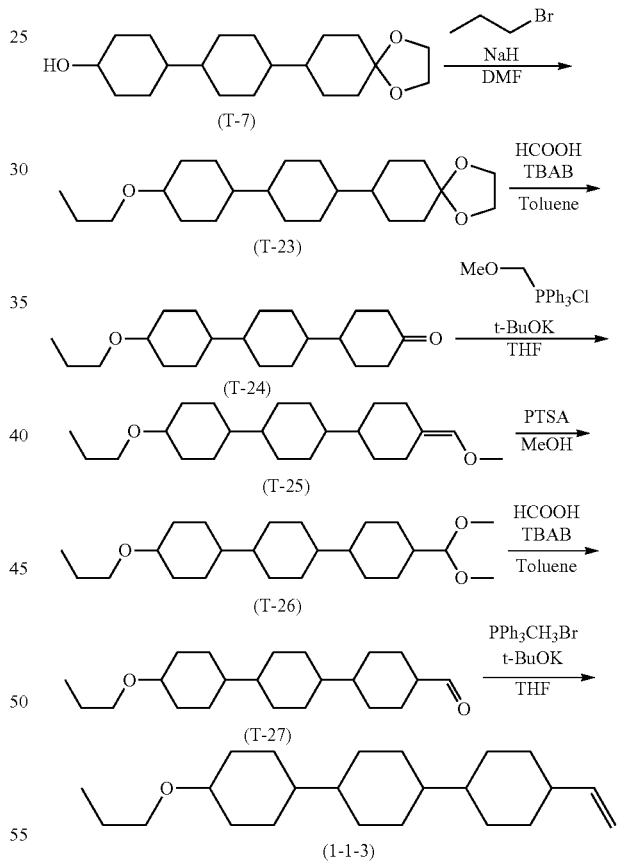

First Step:
Compound (T-23) (4.33 g, 48%) was obtained by using 1-bromopropane in place of 1-bromobutane in a manner similar to the technique in the sixth step in Synthesis Example 1.

Second Step:
Compound (T-24) (3.69 g, 97%) was obtained by using compound (T-23) (4.33 g) as a raw material in a manner similar to the technique in the seventh step in Synthesis Example 1.

Third Step:

Compound (T-25) (3.85 g, 96%) was obtained by using compound (T-24) (3.69 g) as a raw material in a manner similar to the technique in the eighth step in Synthesis Example 1.

Fourth Step:

Compound (T-26) (2.86 g, 68%) was obtained by using compound (T-25) (3.85 g) as a raw material in a manner similar to the technique in the ninth step in Synthesis Example 1.

Fifth Step:

Compound (T-27) (2.51 g, 100%) was obtained by using compound (T-26) (2.86 g) as a raw material in a manner similar to the technique in the tenth step in Synthesis Example 1.

Sixth Step:

Compound (1-1-3) (1.62 g, 65%) was obtained by using compound (T-27) (2.51 g) as a raw material in a manner similar to the technique in the eleventh step in Synthesis Example 1.

$^1$H-NMR (ppm; CDCl$_3$): δ 5.82-5.72 (m, 1H), 4.98-4.84 (m, 2H), 3.40 (t, J=6.9 Hz, 2H), 3.11 (tt, J=11.0 Hz, J=4.1 Hz, 1H), 2.08-2.00 (m, 2H), 1.92-1.67 (m, 11H), 1.62-1.52 (m, 2H), 1.22-0.88 (m, 19H).

Transition temperature: C, 0.8 S$_B$, 215 N, 220 I.

Maximum temperature (T$_{NI}$)=176° C.; dielectric anisotropy (Δε)=1.43; optical anisotropy (Δn)=0.084; viscosity (η)=26.3 mPa·s.

Synthesis Example 5

Synthesis of Compound (No. 1-1-44)

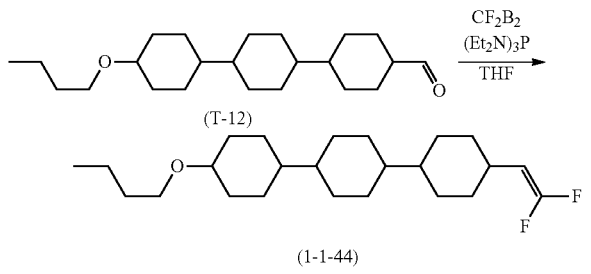

First Step:

Under a nitrogen atmosphere, dibromodifluoromethane (5.82 g) and THF (25.0 mL) were put in a reaction vessel, and the resulting mixture was cooled down to −10° C. A THF (15.0 mL) solution of trisdiethylaminophosphine (14.2 g) was slowly added thereto, and stirred for 1 hour while returning to room temperature. Next, a THF (30.0 mL) solution of compound (T-12) (6.45 g) was slowly added thereto, and stirred for 10 hours. The resulting reaction mixture was poured into ice water, and an aqueous layer was subjected to extraction with heptane. The resulting combined mixture was washed with 1 N hydrochloric acid, a saturated aqueous solution of sodium hydrogencarbonate and brine in the order thereof, and dried over anhydrous magnesium sulfate. The solution was concentrated under reduced pressure, and the residue was purified by silica gel chromatography (toluene). The residue was further purified by recrystallization from heptane to obtain compound (1-1-44) (4.73 g; 67%).

$^1$H-NMR (ppm; CDCl$_3$): δ 3.99 (ddd, J=26.1 Hz, 9.5 Hz, 3.1 Hz, 1H), 3.44 (t, J=6.8 Hz, 2H), 3.10 (tt, J=10.9 Hz, J=4.2 Hz, 1H), 2.11-2.00 (m, 2H), 1.82-1.66 (m, 11H), 1.58-1.49 (m, 2H), 1.40-1.31 (m, 2H), 1.21-0.88 (m, 19H).

Transition temperature: C, 33.4 S$_B$, 204 N, 212 I.

Maximum temperature (T$_{NI}$)=164° C.; dielectric anisotropy (Δε)=2.57; optical anisotropy (Δn)=0.077; viscosity (η)=23.8 mPa·s.

Comparative Example 1

Comparison of Physical Properties

Compounds (S-1), (S-2) and (S-3) described below were selected as a comparative compound. The reason is that an effect of having both of an oxygen-containing group and an alkenyl group at a terminal of tercyclohexyl structure, on physical properties, is defined by comparing compounds (S-1), (S-2) and (S-3) with the compounds of the invention.

Compound (S-1) was prepared according to a method described in JP H9-110734 A.

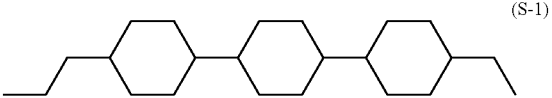 [SMILES: CCCC1CCC(C2CCC(C3CCC(CC)CC3)CC2)CC1]

$^1$H-NMR (ppm; CDCl$_3$): δ 1.80-1.64 (m, 10H), 1.41-0.72 (m, 32H).

Transition temperature: S$_B$ 220 I.

Maximum temperature (T$_{NI}$)=190° C.; dielectric anisotropy (Δε)=−1.00; optical anisotropy (Δn)=0.087; viscosity (η)=29.4 mPa·s.

In addition, a sample for measurement was prepared from 5% by weight of compound (S-1) and 95% by weight of base liquid crystal (A). The reason is that, in an ordinary ratio (15% by weight:85% by weight), a smectic phase precipitated.

Compound (S-2) was prepared according to a method described in JP H9-52851 A.

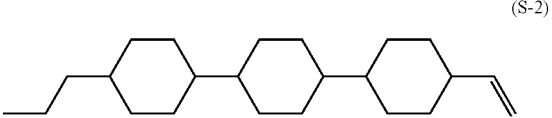 [SMILES: C=CC1CCC(C2CCC(C3CCC(CCC)CC3)CC2)CC1]

$^1$H-NMR (ppm; CDCl$_3$): δ 5.81-5.72 (m, 1H), 5.01-4.83 (m, 2H), 1.99-1.66 (m, 11H), 1.42-1.31 (m, 2H), 1.24-0.74 (m, 24H).

Transition temperature: C, 228 S$_B$, 232 I.

Maximum temperature (T$_{NI}$)=203° C.; dielectric anisotropy (Δε)=0.900; optical anisotropy (Δn)=0.084; viscosity (η)=58.0 mPa·s.

In addition, a sample for measurement was prepared from 10% by weight of compound (S-2) and 90% by weight of base liquid crystal (A). The reason is that, in an ordinary ratio (15% by weight:85% by weight), crystals precipitated.

Compound (S-3) was prepared according to a method described in Bulletin of the Chemical Society of Japan (2000), 73(8), 1875.

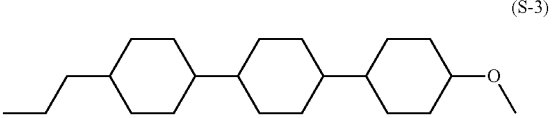 [SMILES: CCCC1CCC(C2CCC(C3CCC(OC)CC3)CC2)CC1]

$^1$H-NMR (ppm; CDCl$_3$): δ 3.34 (s, 3H), 3.05 (tt, J=10.6 Hz, J=4.4 Hz, 1H), 2.12-2.03 (m, 2H), 1.86-1.68 (m, 10H), 1.40-1.28 (m, 2H), 1.28-0.83 (m, 22H).

Transition temperature: C, 205 S$_B$, 206 I.

Maximum temperature (T$_{NI}$)=174° C.; dielectric anisotropy (Δε)=3.30; optical anisotropy (Δn)=0.057; viscosity (η)=45.5 mPa·s.

In addition, a sample for measurement was prepared from 5% by weight of compound (S-3) and 95% by weight of base liquid crystal (A). The reason is that, in an ordinary ratio (15% by weight:85% by weight), crystals precipitated.

TABLE 1

Physical properties of compound (No. 1-1-2) and comparative compounds (S-1), (S-2) and (S-3)

| | Compound (No. 1-1-2) | Comparative compound (S-1) |
|---|---|---|
| Transition temperature | C 22.7 $S_B$ 192 N 222 I | $S_B$ 220 I |
| Maximum temperature ($T_{NI}$) | 179° C. | 190° C. |
| Optical anisotropy (Δn) | 0.097 | 0.087 |
| Dielectric anisotropy (Δε) | 1.43 | −1.00 |
| Viscosity (η) | 25.7 mPa · s | 29.4 mPa · s |

| | Comparative compound (S-2) | Comparative compound (S-3) |
|---|---|---|
| Transition temperature | C 228 $S_B$ 232 I | C 205 $S_B$ 206 I |
| Maximum temperature ($T_{NI}$) | 203° C. | 174° C. |
| Optical anisotropy (Δn) | 0.084 | 0.057 |
| Dielectric anisotropy (Δε) | 0.900 | 3.30 |
| Viscosity (η) | 58.0 mPa · s | 45.5 mPa · s |

Physical properties of compound (No. 1-1-2) obtained in Synthesis Example 3 and comparative compounds (S-1), (S-2) and (S-3) are summarized in Table 1. Table 1 shows that no nematic phase was developed in the comparative compounds, but the nematic phase was developed only in compound (No. 1-1-2). Moreover, compound (No. 1-1-2) was found to be superior in view of small viscosity.

Comparative Example 2

Comparison of Compatibility at Low Temperature

Comparison of compatibility at low temperature was performed with regard to compound (No. 1-1-2) and comparative compounds (S-1), (S-2) and (S-3). In addition, the compatibility at low temperature was evaluated according to a method shown in "(3) Compatibility at low temperature in Measuring method" in such a manner that each compound was added to base liquid crystal (A) or base liquid crystal (B), and kept in the freezer at −20° C. for 30 days.

TABLE 2

Compatibility at low temperature of compound (No. 1-1-2) and comparative compounds (S-1), (S-2) and (S-3)

| | Compound (No. 1-1-2) | Comparative compound (S-1) |
|---|---|---|
| Compatibility at low temperature with base liquid crystal (A) | 5% | 1% |

TABLE 2-continued

Compatibility at low temperature of compound (No. 1-1-2) and comparative compounds (S-1), (S-2) and (S-3)

| | | |
|---|---|---|
| Compatibility at low temperature with base liquid crystal (B) | 10% | 3% |

| | Comparative compound (S-2) | Comparative compound (S-3) |
|---|---|---|
| | 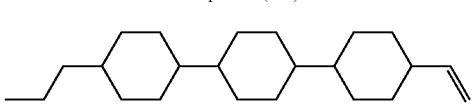 | 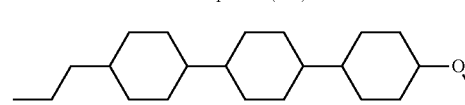 |
| Compatibility at low temperature with base liquid crystal (A) | 3% | 1% |
| Compatibility at low temperature with base liquid crystal (B) | 5% | 5% |

Compatibility at low temperature of compound (No. 1-1-2) obtained in Synthesis Example 3 and comparative compounds (S-1), (S-2) and (S-3) is summarized in Table 2. Table 2 shows that compound (No. 1-1-2) is superior in compatibility at low temperature in comparison with the comparative compounds. In general, a compound having a tercyclohexyl skeleton has no nematic phase, and therefore the compound has low compatibility with a nematic liquid crystal composition, and such a case cannot be improved even if the compound has an alkenyl group or an oxygen-containing group at one terminal, but Table 2 shows that compound (No. 1-1-2) is significantly improved in the compatibility with the liquid crystal composition because the nematic phase is developed by having both of the oxygen-containing group and the alkenyl group at a terminal.

2. Synthesis of Compound (1)

Compound (1) was prepared according to "2. Synthesis of compound (1)" and the Synthesis Examples described above. Specific examples of such a compound include compounds (No. 1-1-1) to (No. 1-1-60), (No. 1-2-1) to (No. 1-2-40), (No. 1-3-1) to (No.

| No. | |
|---|---|
| 1-1-1 |  |

C 38.8 $S_B$ 168 N 198 I
$T_{NI}$: 162, Δε: 2.77, Δn: 0.084, η: 36.7

| 1-1-2 | 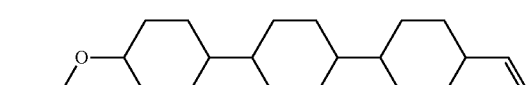 |
|---|---|

C 23.7 $S_B$ 192 N 222 I
$T_{NI}$: 179, Δε: 1.43, Δn: 0.097, η: 25.7

| 1-1-3 | 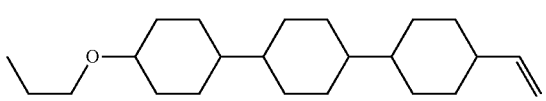 |
|---|---|

C 0.8 $S_B$ 215 N 220 I
$T_{NI}$: 176, Δε: 1.43, Δn: 0.084, η: 26.3

| 1-1-4 | 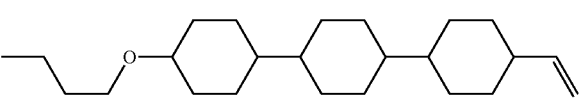 [SMILES: C=CC1CCC(C2CCC(C3CCC(OCCCC)CC3)CC2)CC1] |
|---|---|

$S_B$ 221 I
$T_{NI}$: 172, Δε: 0.30, Δn: 0.084, η: 27.0

-continued
| No. | |
|---|---|
| 1-1-5 | 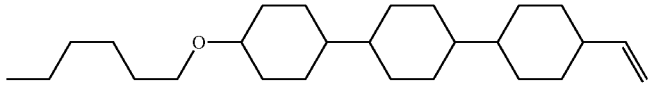 |
| 1-1-6 | 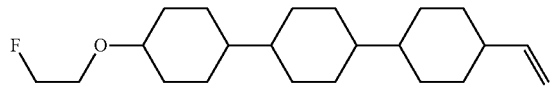 [SMILES: C=CC1CCC(C2CCC(C3CCC(OCCF)CC3)CC2)CC1] |
| 1-1-7 | 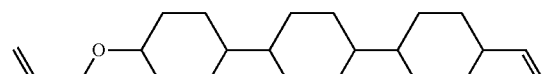 |
| 1-1-8 | 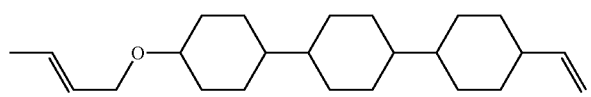 |
| 1-1-9 | 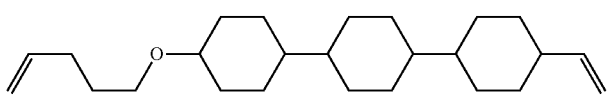 |
| 1-1-10 | 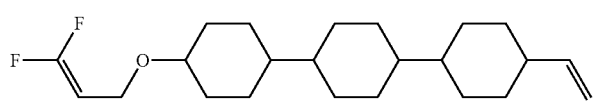 [SMILES: C=CC1CCC(C2CCC(C3CCC(OCC=C(F)F)CC3)CC2)CC1] |
| 1-1-11 | 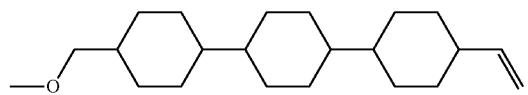 [SMILES: C=CC1CCC(C2CCC(C3CCC(COC)CC3)CC2)CC1] |
| 1-1-12 | 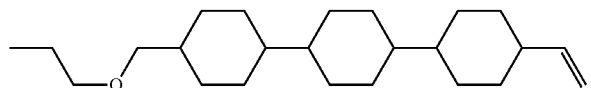 |
| 1-1-13 | 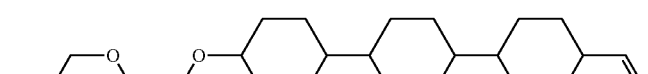 |
| 1-1-14 | 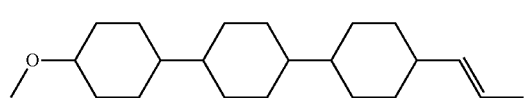 [SMILES: C/C=C/C1CCC(C2CCC(C3CCC(OC)CC3)CC2)CC1] |
| 1-1-15 |  |
| 1-1-16 | 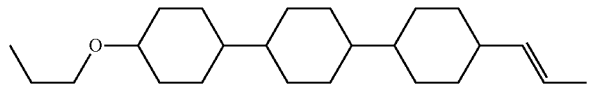 [SMILES: C/C=C/C1CCC(C2CCC(C3CCC(OCCC)CC3)CC2)CC1] |
| 1-1-17 | 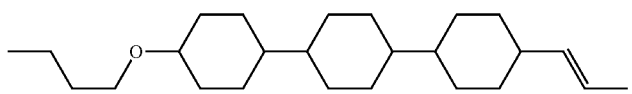 |
| 1-1-18 | 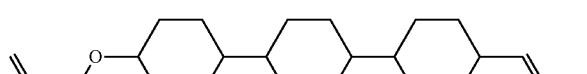 |
| 1-1-19 | 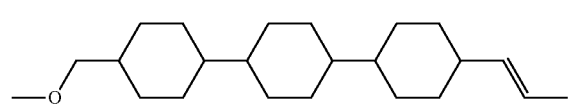 |

| No. | |
|---|---|
| 1-1-20 | 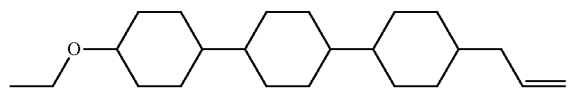 [SMILES: C=CCC1CCC(C2CCC(C3CCC(OCC)CC3)CC2)CC1] |
| 1-1-21 | 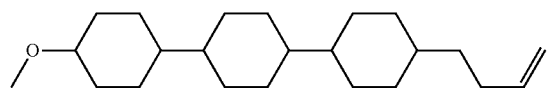 |
| 1-1-22 | 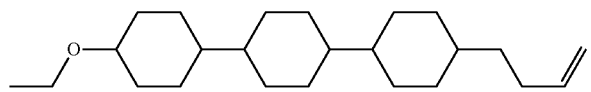 |
| 1-1-23 | 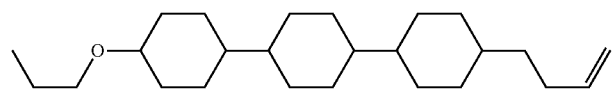 [SMILES: C=CCCC1CCC(C2CCC(C3CCC(OCCC)CC3)CC2)CC1] |
| 1-1-24 | 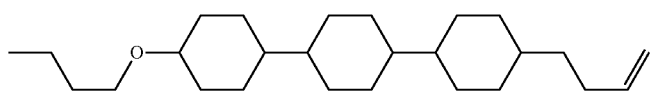 [SMILES: C=CCCC1CCC(C2CCC(C3CCC(OCCCC)CC3)CC2)CC1] |
| 1-1-25 | 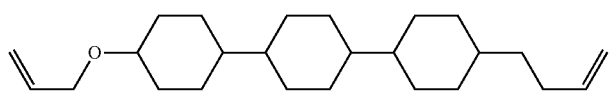 |
| 1-1-26 | 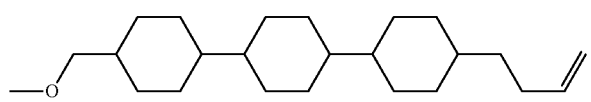 [SMILES: C=CCCC1CCC(C2CCC(C3CCC(COC)CC3)CC2)CC1] |
| 1-1-27 | 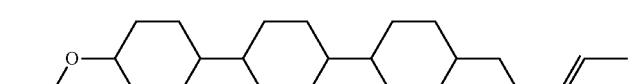 |
| 1-1-28 | 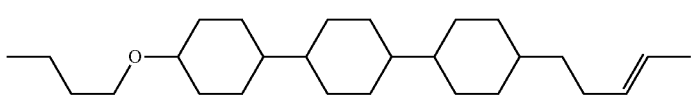 [SMILES: C/C=C/CCC1CCC(C2CCC(C3CCC(OCCCC)CC3)CC2)CC1] |
| 1-1-29 | 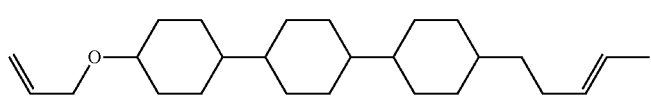 [SMILES: C=CCOC1CCC(C2CCC(C3CCC(CC/C=C/C)CC3)CC2)CC1] |
| 1-1-30 | 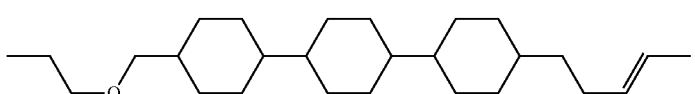 |
| 1-1-31 | 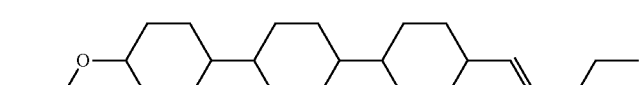 |
| 1-1-32 | 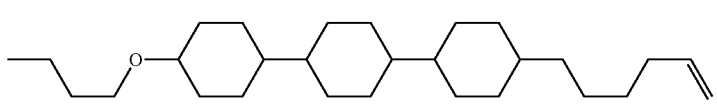 [SMILES: C=CCCCCC1CCC(C2CCC(C3CCC(OCCCC)CC3)CC2)CC1] |
| 1-1-33 | 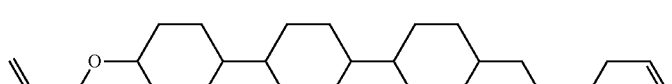 |
| 1-1-34 | 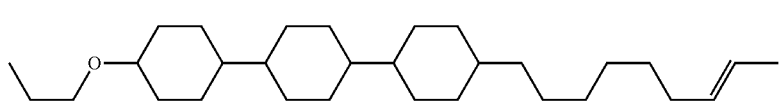 [SMILES: C/C=C/CCCCCCC1CCC(C2CCC(C3CCC(OCCC)CC3)CC2)CC1] |

| No. | |
|---|---|
| 1-1-35 | 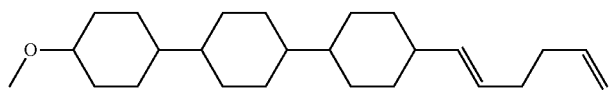 |
| 1-1-36 | 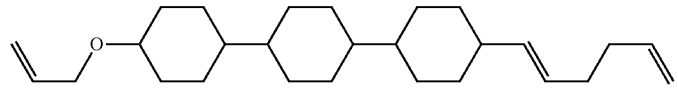 [SMILES: C=CCC/C=C/C1CCC(C2CCC(C3CCC(OCC=C)CC3)CC2)CC1] |
| 1-1-37 | 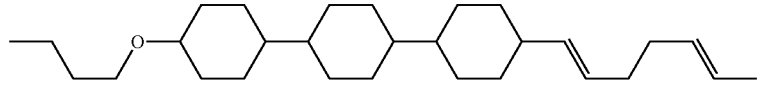 |
| 1-1-38 | 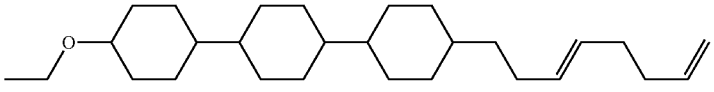 [SMILES: C=CCC/C=C/CCC1CCC(C2CCC(C3CCC(OCC)CC3)CC2)CC1] |
| 1-1-39 | 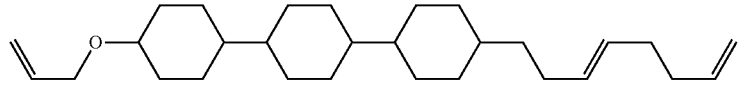 |
| 1-1-40 | 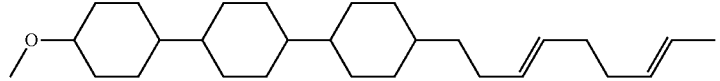 [SMILES: C/C=C/CC/C=C/CCC1CCC(C2CCC(C3CCC(OC)CC3)CC2)CC1] |
| 1-1-41 | 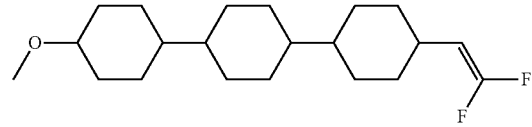 |
| 1-1-42 | 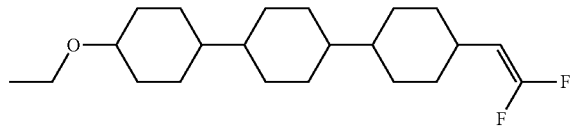 [SMILES: CCOC1CCC(C2CCC(C3CCC(C=C(F)F)CC3)CC2)CC1] |
| 1-1-43 | 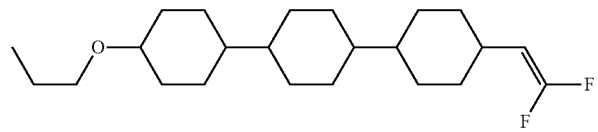 [SMILES: CCCOC1CCC(C2CCC(C3CCC(C=C(F)F)CC3)CC2)CC1] |
| 1-1-44 | 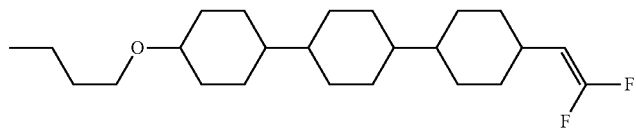
C 33.4 $S_B$ 204 N 212 I
$T_{NI}$: 164, Δε: 2.57, Δn: 0.077, η: 23.8 |
| 1-1-45 | 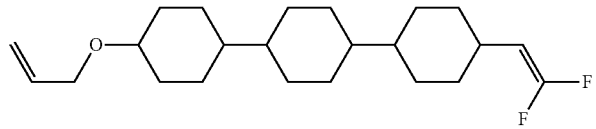 [SMILES: C=CCOC1CCC(C2CCC(C3CCC(C=C(F)F)CC3)CC2)CC1] |
| 1-1-46 | 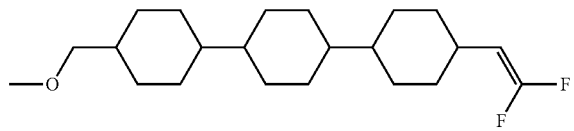 |
| 1-1-47 |  |

| No. | |
|---|---|
| 1-1-48 | 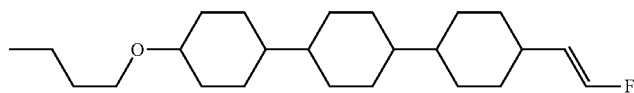 |
| 1-1-49 | 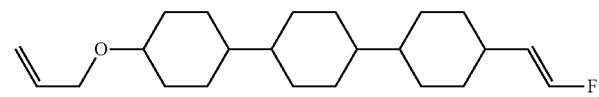 |
| 1-1-50 | 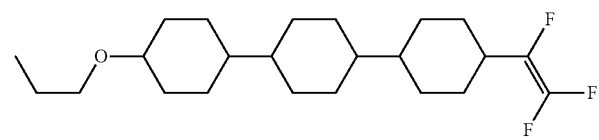 [SMILES: CCCOC1CCC(C2CCC(C3CCC(C(F)=C(F)F)CC3)CC2)CC1] |
| 1-1-51 | 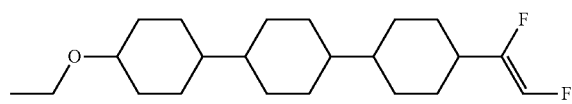 [SMILES: CCOC1CCC(C2CCC(C3CCC(/C(F)=C/F)CC3)CC2)CC1] |
| 1-1-52 | 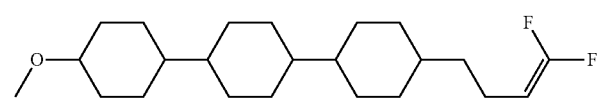 [SMILES: COC1CCC(C2CCC(C3CCC(CCC=C(F)F)CC3)CC2)CC1] |
| 1-1-53 | 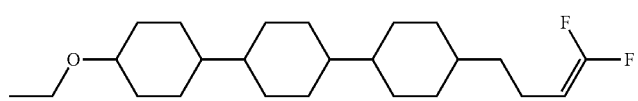 [SMILES: CCOC1CCC(C2CCC(C3CCC(CCC=C(F)F)CC3)CC2)CC1] |
| 1-1-54 | 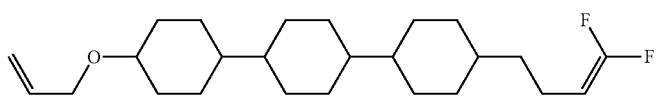 [SMILES: C=CCOC1CCC(C2CCC(C3CCC(CCC=C(F)F)CC3)CC2)CC1] |
| 1-1-55 | 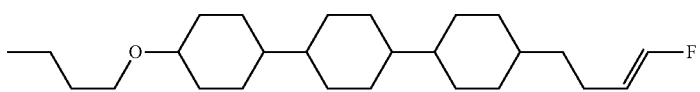 [SMILES: CCCCOC1CCC(C2CCC(C3CCC(CC/C=C/F)CC3)CC2)CC1] |
| 1-1-56 | 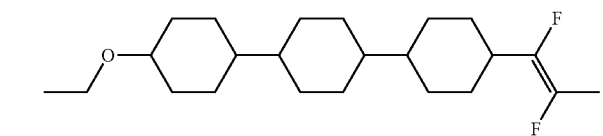 [SMILES: CCOC1CCC(C2CCC(C3CCC(/C(F)=C(/C)F)CC3)CC2)CC1] |
| 1-1-57 | 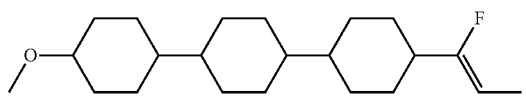 |
| 1-1-58 | 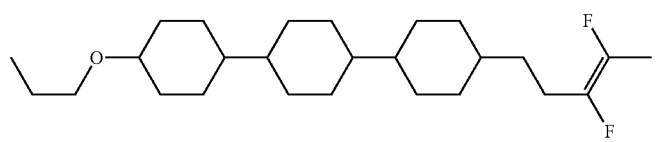 [SMILES: CCCOC1CCC(C2CCC(C3CCC(CC/C(F)=C(/C)F)CC3)CC2)CC1] |
| 1-1-59 | 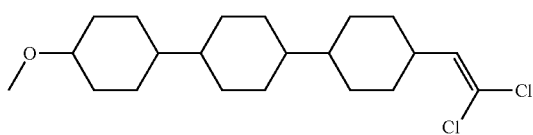 [SMILES: COC1CCC(C2CCC(C3CCC(C=C(Cl)Cl)CC3)CC2)CC1] |
| 1-1-60 | 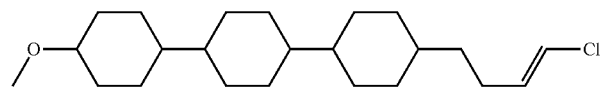 [SMILES: COC1CCC(C2CCC(C3CCC(CC/C=C/Cl)CC3)CC2)CC1] |

-continued
| No. | |
|---|---|
| 1-2-1 | 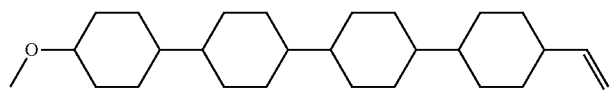 [SMILES: C=CC1CCC(C2CCC(C3CCC(C4CCC(OC)CC4)CC3)CC2)CC1] |
| 1-2-2 | 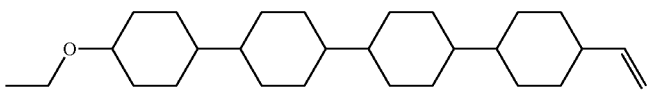 |
| 1-2-3 | 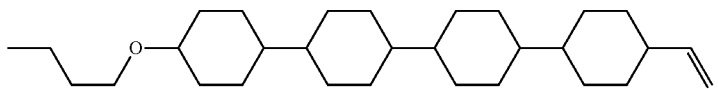 |
| 1-2-4 | 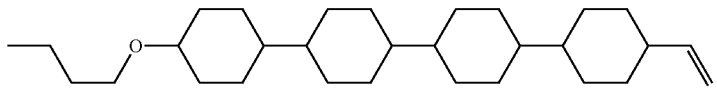 [SMILES: C=CC1CCC(C2CCC(C3CCC(C4CCC(OCCCC)CC4)CC3)CC2)CC1] |
| 1-2-5 | 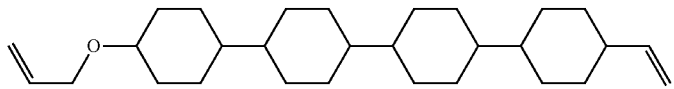 [SMILES: C=CCOC1CCC(C2CCC(C3CCC(C4CCC(C=C)CC4)CC3)CC2)CC1] |
| 1-2-6 | 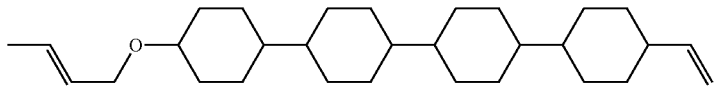 [SMILES: C=CC1CCC(C2CCC(C3CCC(C4CCC(OC/C=C/C)CC4)CC3)CC2)CC1] |
| 1-2-7 | 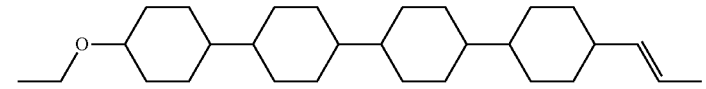 [SMILES: C/C=C/C1CCC(C2CCC(C3CCC(C4CCC(OCC)CC4)CC3)CC2)CC1] |
| 1-2-8 | 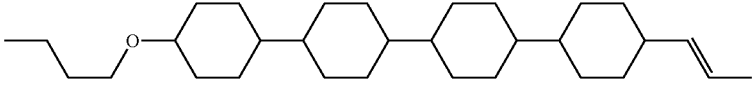 [SMILES: C/C=C/C1CCC(C2CCC(C3CCC(C4CCC(OCCCC)CC4)CC3)CC2)CC1] |
| 1-2-9 | 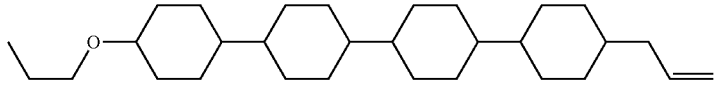 [SMILES: C=CCC1CCC(C2CCC(C3CCC(C4CCC(OCCC)CC4)CC3)CC2)CC1] |
| 1-2-10 | 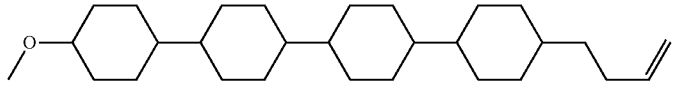 [SMILES: C=CCCC1CCC(C2CCC(C3CCC(C4CCC(OC)CC4)CC3)CC2)CC1] |
| 1-2-11 | 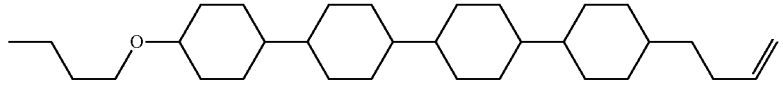 [SMILES: C=CCCC1CCC(C2CCC(C3CCC(C4CCC(OCCCC)CC4)CC3)CC2)CC1] |
| 1-2-12 | 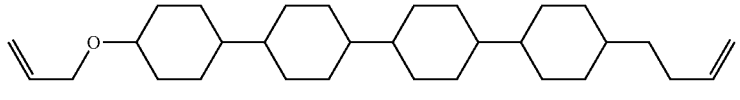 [SMILES: C=CCCC1CCC(C2CCC(C3CCC(C4CCC(OCC=C)CC4)CC3)CC2)CC1] |
| 1-2-13 | 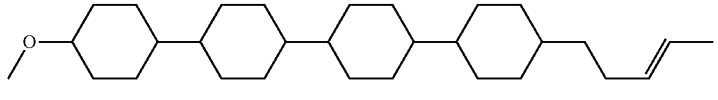 [SMILES: C/C=C/CCC1CCC(C2CCC(C3CCC(C4CCC(OC)CC4)CC3)CC2)CC1] |
| 1-2-14 | 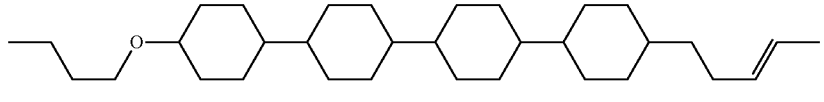 [SMILES: C/C=C/CCC1CCC(C2CCC(C3CCC(C4CCC(OCCCC)CC4)CC3)CC2)CC1] |
| 1-2-15 | 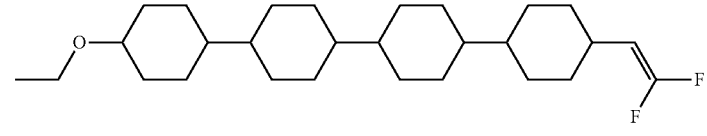 [SMILES: CCOC1CCC(C2CCC(C3CCC(C4CCC(C=C(F)F)CC4)CC3)CC2)CC1] |

| No. | |
|---|---|
| 1-2-16 | 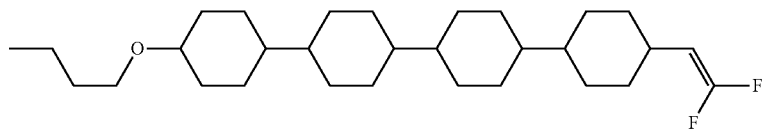 |
| 1-2-17 | 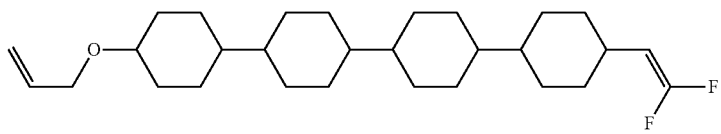 [SMILES: C=CCOC1CCC(C2CCC(C3CCC(C4CCC(C=C(F)F)CC4)CC3)CC2)CC1] |
| 1-2-18 | 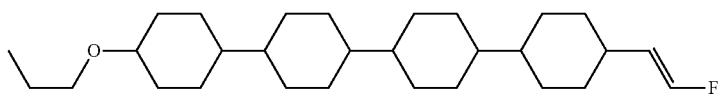 [SMILES: CCCOC1CCC(C2CCC(C3CCC(C4CCC(/C=C/F)CC4)CC3)CC2)CC1] |
| 1-2-19 | 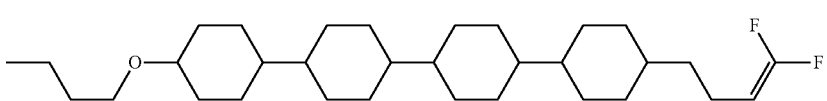 [SMILES: CCCCOC1CCC(C2CCC(C3CCC(C4CCC(CCC=C(F)F)CC4)CC3)CC2)CC1] |
| 1-2-20 | 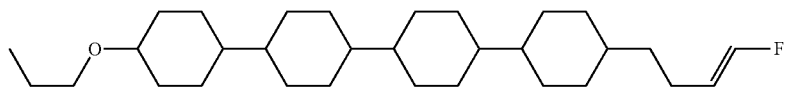 [SMILES: CCCOC1CCC(C2CCC(C3CCC(C4CCC(CC/C=C/F)CC4)CC3)CC2)CC1] |
| 1-2-21 | 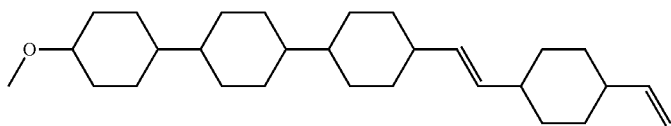 [SMILES: C=CC1CCC(/C=C/C2CCC(C3CCC(C4CCC(OC)CC4)CC3)CC2)CC1] |
| 1-2-22 | 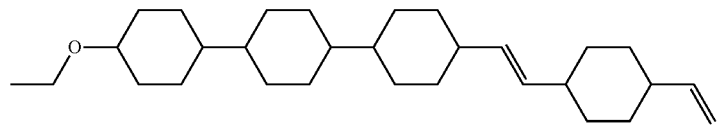 [SMILES: C=CC1CCC(/C=C/C2CCC(C3CCC(C4CCC(OCC)CC4)CC3)CC2)CC1] |
| 1-2-23 | 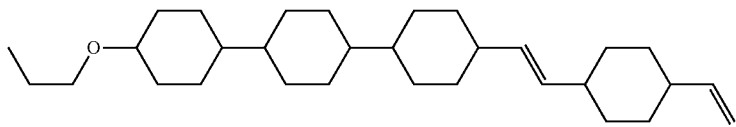 [SMILES: C=CC1CCC(/C=C/C2CCC(C3CCC(C4CCC(OCCC)CC4)CC3)CC2)CC1] |
| 1-2-24 | 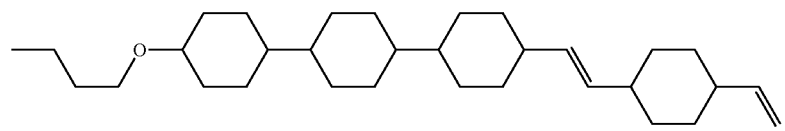 [SMILES: C=CC1CCC(/C=C/C2CCC(C3CCC(C4CCC(OCCCC)CC4)CC3)CC2)CC1] |
| 1-2-25 | 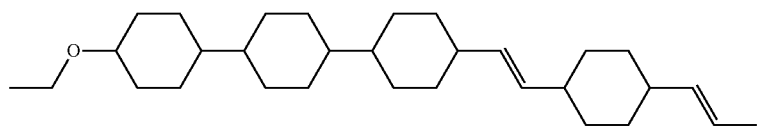 [SMILES: C/C=C/C1CCC(/C=C/C2CCC(C3CCC(C4CCC(OCC)CC4)CC3)CC2)CC1] |
| 1-2-26 | 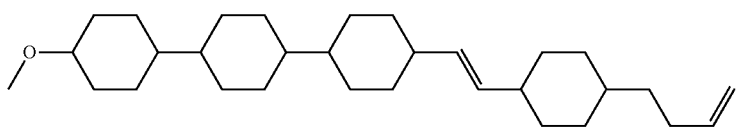 [SMILES: C=CCCC1CCC(/C=C/C2CCC(C3CCC(C4CCC(OC)CC4)CC3)CC2)CC1] |
| 1-2-27 | 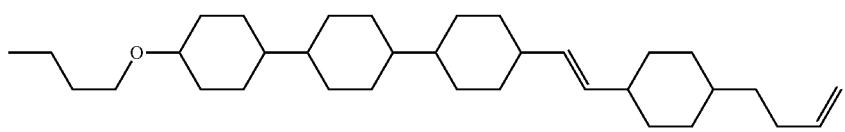 |

| No. |
|---|
| 1-2-28 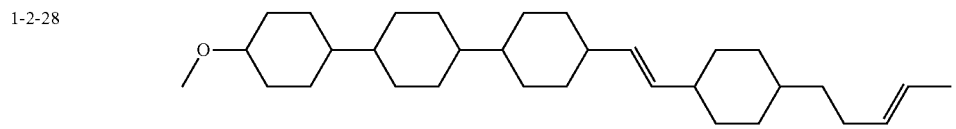 |
| 1-2-29 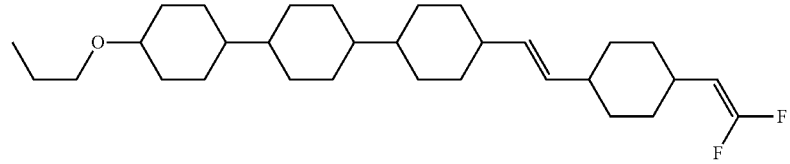 [SMILES: CCCOC1CCC(C2CCC(C3CCC(/C=C/C4CCC(C=C(F)F)CC4)CC3)CC2)CC1] |
| 1-2-30 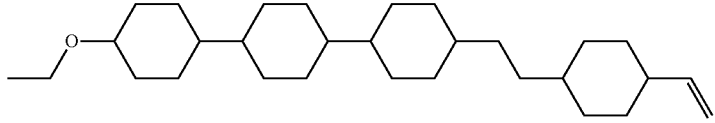 [SMILES: C=CC1CCC(CCC2CCC(C3CCC(C4CCC(OCC)CC4)CC3)CC2)CC1] |
| 1-2-31 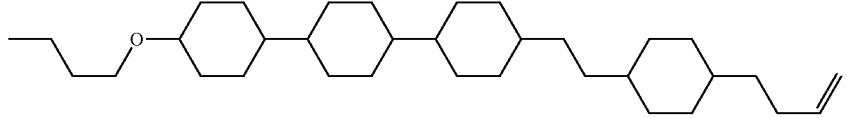 [SMILES: C=CCCC1CCC(CCC2CCC(C3CCC(C4CCC(OCCCC)CC4)CC3)CC2)CC1] |
| 1-2-32 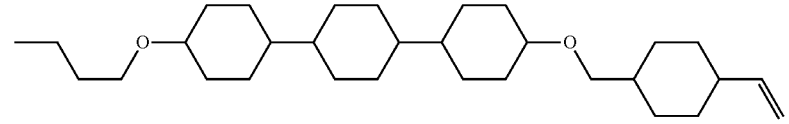 [SMILES: C=CC1CCC(COC2CCC(C3CCC(C4CCC(OCCCC)CC4)CC3)CC2)CC1] |
| 1-2-33 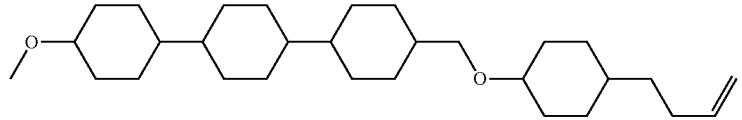 [SMILES: C=CCCC1CCC(OCC2CCC(C3CCC(C4CCC(OC)CC4)CC3)CC2)CC1] |
| 1-2-34 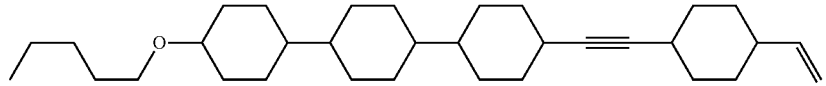 |
| 1-2-35 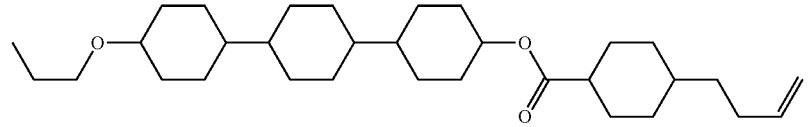 [SMILES: C=CCCC1CCC(C(=O)OC2CCC(C3CCC(C4CCC(OCCC)CC4)CC3)CC2)CC1] |
| 1-2-36 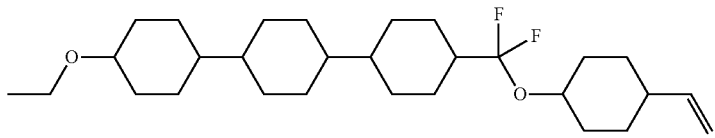 |
| 1-2-37 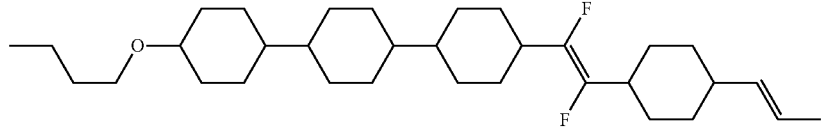 |
| 1-2-38 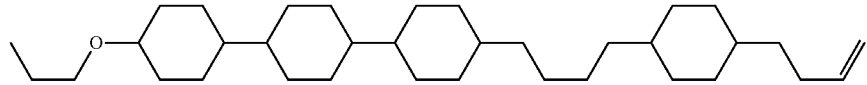 |
| 1-2-39 |

-continued
| No. | |
|---|---|
| 1-2-40 | 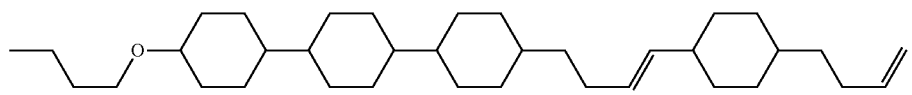 [SMILES: C=CCCC1CCC(/C=C/CCC2CCC(C3CCC(C4CCC(OCCCC)CC4)CC3)CC2)CC1] |
| 1-3-1 | 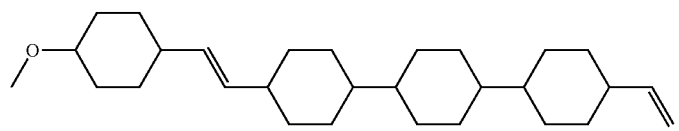 [SMILES: C=CC1CCC(C2CCC(C3CCC(/C=C/C4CCC(OC)CC4)CC3)CC2)CC1] |
| 1-3-2 | 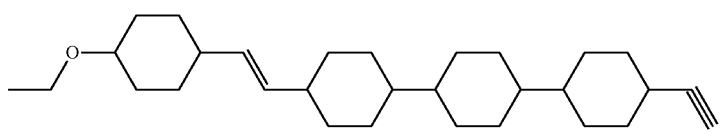 |
| 1-3-3 | 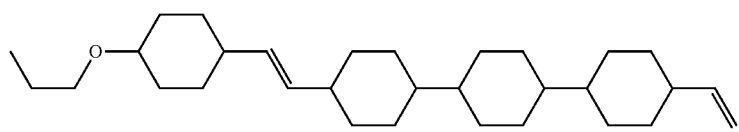 |
| 1-3-4 | 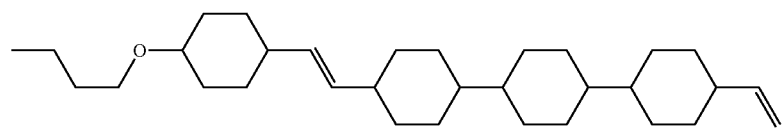 |
| 1-3-5 | 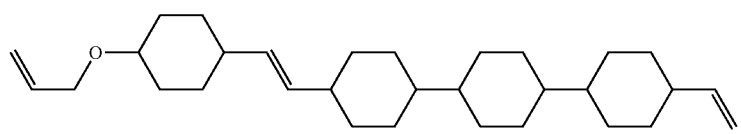 |
| 1-3-6 | 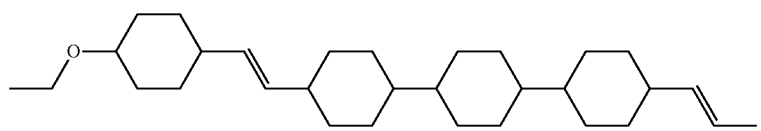 [SMILES: C/C=C/C1CCC(C2CCC(C3CCC(/C=C/C4CCC(OCC)CC4)CC3)CC2)CC1] |
| 1-3-7 | 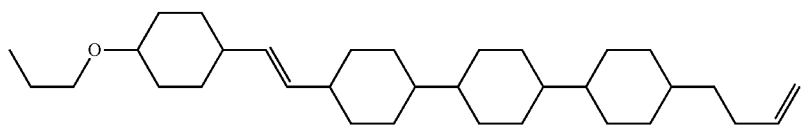 |
| 1-3-8 | 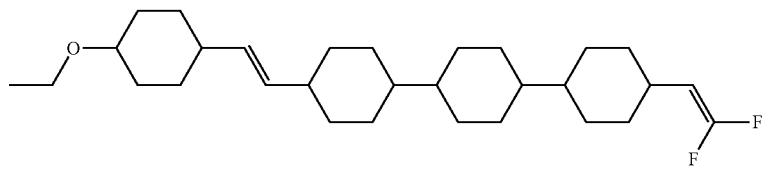 [SMILES: CCOC1CCC(/C=C/C2CCC(C3CCC(C4CCC(C=C(F)F)CC4)CC3)CC2)CC1] |
| 1-3-9 | 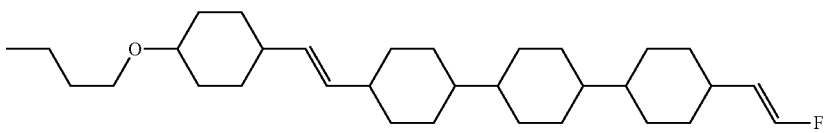 [SMILES: CCCCOC1CCC(/C=C/C2CCC(C3CCC(C4CCC(/C=C/F)CC4)CC3)CC2)CC1] |
| 1-3-10 | 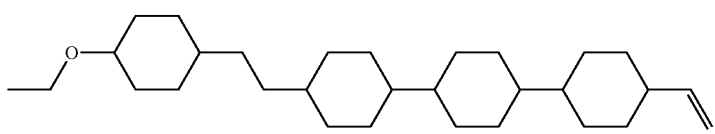 [SMILES: C=CC1CCC(C2CCC(C3CCC(CCC4CCC(OCC)CC4)CC3)CC2)CC1] |

-continued

| No. | |
|---|---|
| 1-3-11 | 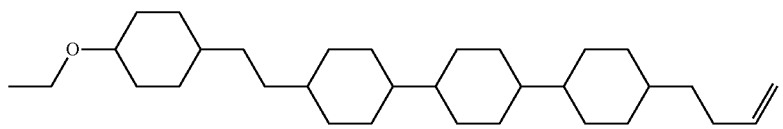 [SMILES: C=CCCC1CCC(C2CCC(C3CCC(CCC4CCC(OCC)CC4)CC3)CC2)CC1] |
| 1-3-12 | 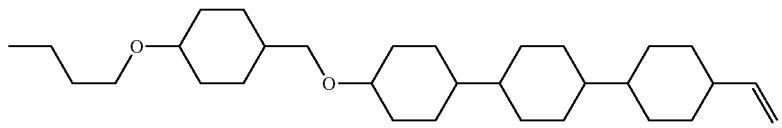 |
| 1-3-13 | 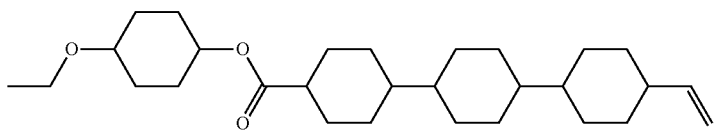 [SMILES: C=CC1CCC(C2CCC(C3CCC(C(=O)OC4CCC(OCC)CC4)CC3)CC2)CC1] |
| 1-3-14 | 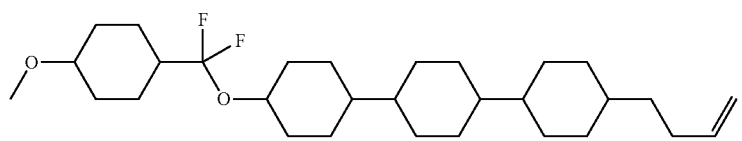 |
| 1-3-15 | 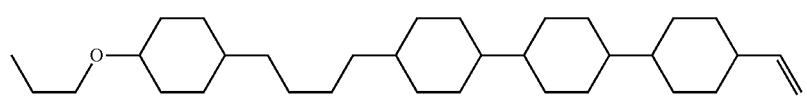 [SMILES: C=CC1CCC(C2CCC(C3CCC(CCCCC4CCC(OCCC)CC4)CC3)CC2)CC1] |
| 1-3-16 | 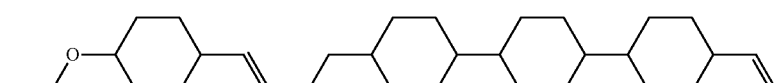 |
| 1-3-17 | 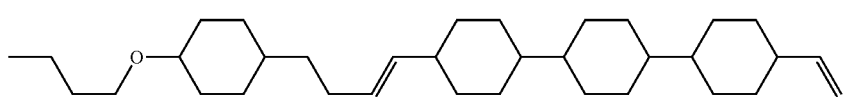 [SMILES: C=CC1CCC(C2CCC(C3CCC(/C=C/CCC4CCC(OCCCC)CC4)CC3)CC2)CC1] |
| 1-4-1 | 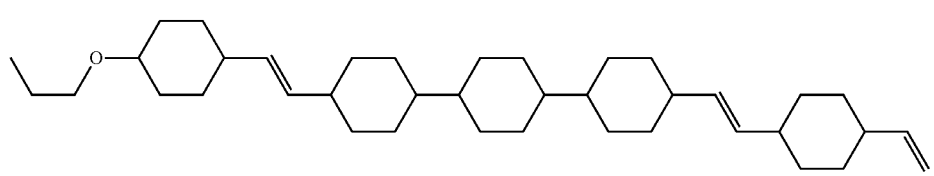 [SMILES: C=CC1CCC(/C=C/C2CCC(C3CCC(C4CCC(/C=C/C5CCC(OCCC)CC5)CC4)CC3)CC2)CC1] |
| 1-4-2 | 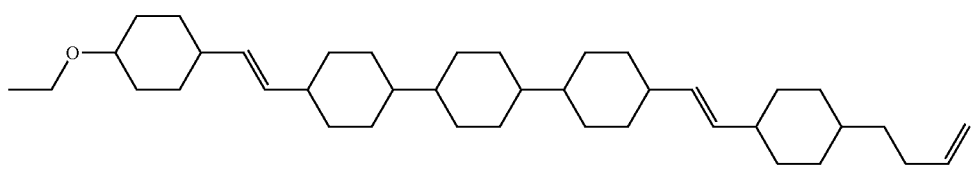 |
| 1-4-3 | 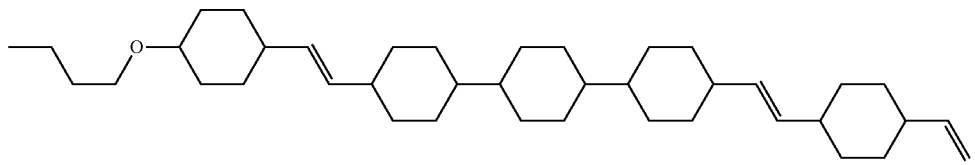 [SMILES: C=CC1CCC(/C=C/C2CCC(C3CCC(C4CCC(/C=C/C5CCC(OCCCC)CC5)CC4)CC3)CC2)CC1] |

2. Examples of Composition

The composition of the invention will be described in detail by way of Examples. The invention includes a mixture of a composition in Use Example 1 and a composition in Use Example 2. The invention also includes a mixture of at least two of compositions in Use Examples. The compounds in the Use Examples were represented using symbols according to definitions in Table 3 described below. In Table 3, the configuration of 1,4-cyclohexylene is trans. A parenthesized number next to a symbolized compound in the Use Examples represents a chemical formula to which the compound belongs. A symbol (-) means any other liquid crystal compound different from compounds (2) to (15). A proportion (percentage) of the liquid crystal compound is expressed in terms of weight percent (% by weight) based on the weight of the liquid crystal composition. Values of the physical properties of the composition are summarized in a last part. The physical properties were measured according to the methods described above, and measured values are directly described (without extrapolation).

TABLE 3

Method for Description of Compounds using Symbols $$R\text{—}(A_1)\text{—}Z_1\text{—}\cdots\text{—}Z_n\text{—}(A_n)\text{—}R'$$

| 1) Left-terminal Group R— | Symbol |
|---|---|
| $FC_nH_{2n}$— | Fn- |
| $C_nH_{2n+1}$— | n- |
| $C_nH_{2n+1}O$— | nO- |
| $C_mH_{2m+1}OC_nH_{2n}$— | mOn- |
| $CH_2=CH$— | V- |
| $C_nH_{2n+1}$—CH=CH— | nV- |
| $CH_2=CH$—$C_nH_{2n}$— | Vn- |
| $C_mH_{2m+1}$—CH=CH—$C_nH_{2n}$— | mVn- |
| $CF_2=CH$— | VFF- |
| $CF_2=CH$—$C_nH_{2n}$— | VFFn- |

| 2) Right-terminal Group —R' | Symbol |
|---|---|
| —$C_nH_{2n+1}$ | -n |
| —$OC_nH_{2n+1}$ | -On |
| —$COOCH_3$ | -EMe |
| —CH=$CH_2$ | -V |
| —CH=CH—$C_nH_{2n+1}$ | -Vn |
| —$C_nH_{2n}$—CH=$CH_2$ | -nV |
| —$C_mH_{2m}$—CH=CH—$C_nH_{2n+1}$ | -mVn |
| —CH=$CF_2$ | -VFF |
| —F | -F |
| —Cl | -CL |
| —$OCF_3$ | -OCF3 |
| —$OCF_2H$ | -OCF2H |
| —$CF_3$ | -CF3 |
| —C≡N | -C |

| 3) Bonding Group —$Z_n$— | Symbol |
|---|---|
| —$C_nH_{2n}$— | n |
| —COO— | E |
| —CH=CH— | V |
| —$CH_2O$— | 1O |
| —$OCH_2$— | O1 |
| —$CF_2O$— | X |
| —C≡C— | T |

| 4) Ring Structure —$A_n$— | Symbol |
|---|---|
|  | H |
|  | B |
| 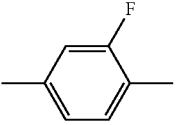 | B(F) |
| 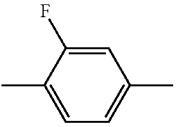 | B(2F) |

TABLE 3-continued

Method for Description of Compounds using Symbols $$R\text{—}(A_1)\text{—}Z_1\text{—}\cdots\text{—}Z_n\text{—}(A_n)\text{—}R'$$

| | Symbol |
|---|---|
| 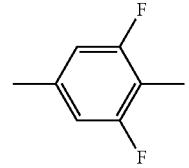 | B(F,F) |
| 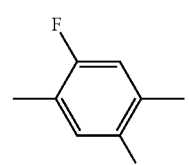 | B(2F,5F) |
| 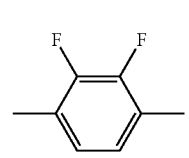 | B(2F,3F) |
| 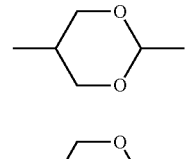 | G |
| 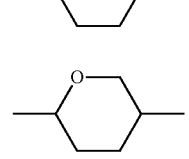 | dh |
| 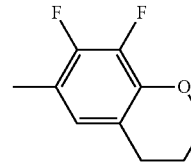 | Dh |
| 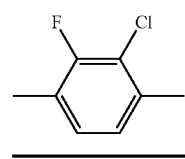 | Cro(7F,8F) |
| 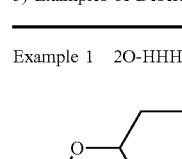 | B(2F,3CL) |

5) Examples of Description

Example 1  2O-HHH-V

TABLE 3-continued

Method for Description of Compounds using Symbols $$R—(A_1)—Z_1—\cdots—Z_n—(A_n)—R'$$

Example 2  3-HBB(F,F)-F

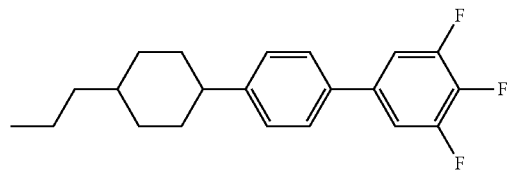 [SMILES: CCCC1CCC(c2ccc(-c3cc(F)c(F)c(F)c3)cc2)CC1]

Use Example 1

| | | |
|---|---|---|
| 1O-HHH-V | (1-1-1) | 5% |
| 2-HB-C | (8-1) | 5% |
| 3-HB-C | (8-1) | 12% |
| 3-HB-O2 | (2-5) | 15% |
| 2-BTB-1 | (2-10) | 3% |
| 3-HHB-F | (6-1) | 4% |
| 3-HHB-1 | (3-1) | 5% |
| 3-HHB-O1 | (3-1) | 5% |
| 3-HHB-3 | (3-1) | 9% |
| 3-HHEH-5 | (3-13) | 3% |
| 3-HHEB-F | (6-10) | 4% |
| 5-HHEB-F | (6-10) | 4% |
| 2-HHB(F)-F | (6-2) | 7% |
| 3-HHB(F)-F | (6-2) | 7% |
| 5-HHB(F)-F | (6-2) | 7% |
| 3-HHB(F,F)-F | (6-3) | 5% |

NI = 101.3° C.;
η = 19.9 mPa · s;
Δn = 0.098;
Δε = 4.6.

Use Example 2

| | | |
|---|---|---|
| 2O-HHH-V | (1-1-2) | 4% |
| 3-HB-CL | (5-2) | 13% |
| 3-HH-4 | (2-1) | 10% |
| 3-HB-O2 | (2-5) | 8% |
| 3-HHB(F,F)-F | (6-3) | 3% |
| 3-HBB(F,F)-F | (6-24) | 30% |
| 5-HBB(F,F)-F | (6-24) | 24% |
| 5-HBB(F) B-2 | (4-5) | 3% |
| 5-HBB(F) B-3 | (4-5) | 5% |

NI = 71.5° C.;
η = 19.1 mPa · s;
Δn = 0.114;
Δε = 5.4.

Use Example 3

| | | |
|---|---|---|
| 3O-HHH-V | (1-1-3) | 3% |
| 7-HB(F,F)-F | (5-4) | 3% |
| 3-HB-O2 | (2-5) | 7% |
| 2-HHB(F)-F | (6-2) | 10% |
| 3-HHB(F)-F | (6-2) | 10% |
| 5-HHB(F)-F | (6-2) | 10% |
| 2-HBB(F)-F | (6-23) | 9% |
| 3-HBB(F)-F | (6-23) | 9% |
| 5-HBB(F)-F | (6-23) | 16% |
| 2-HBB-F | (6-22) | 4% |
| 3-HBB-F | (6-22) | 4% |
| 3-HBB(F,F)-F | (6-24) | 5% |
| 5-HBB(F,F)-F | (6-24) | 10% |

NI = 86.9° C.;
η = 24.8 mPa · s;
Δn = 0.113;
Δε = 5.7.

Use Example 4

| | | |
|---|---|---|
| 4O-HHH-V | (1-1-4) | 5% |
| 5-HB-CL | (5-2) | 16% |
| 3-HH-4 | (2-1) | 10% |
| 3-HH-5 | (2-1) | 4% |
| 3-HHB-F | (6-1) | 4% |
| 3-HHB-CL | (6-1) | 3% |
| 4-HHB-CL | (6-1) | 4% |
| 3-HHB(F)-F | (6-2) | 10% |
| 4-HHB(F)-F | (6-2) | 9% |
| 5-HHB(F)-F | (6-2) | 9% |
| 7-HHB(F)-F | (6-2) | 8% |
| 5-HBB(F)-F | (6-23) | 4% |
| 3-HHBB(F,F)-F | (7-6) | 2% |
| 4-HHBB(F,F)-F | (7-6) | 3% |
| 5-HHBB(F,F)-F | (7-6) | 3% |
| 3-HH2BB(F,F)-F | (7-15) | 3% |
| 4-HH2BB(F,F)-F | (7-15) | 3% |

NI = 114.6° C.;
n = 19.2 mPa · s;
Δn = 0.089;
Δε = 3.7.

Use Example 5

| | | |
|---|---|---|
| 4O-HHH-V | (1-1-4) | 5% |
| 3-HHB(F,F)-F | (6-3) | 9% |
| 3-H2HB(F,F)-F | (6-15) | 6% |
| 4-H2HB(F,F)-F | (6-15) | 8% |
| 5-H2HB(F,F)-F | (6-15) | 8% |
| 3-HBB(F,F)-F | (6-24) | 21% |
| 5-HBB(F,F)-F | (6-24) | 20% |
| 3-H2BB(F,F)-F | (6-27) | 10% |
| 5-HHBB(F,F)-F | (7-6) | 5% |
| 5-HHEBB-F | (7-17) | 2% |
| 3-HH2BB(F,F)-F | (7-15) | 2% |
| 1O1-HBBH-4 | (4-1) | 2% |
| 1O1-HBBH-5 | (4-1) | 2% |

NI = 97.2° C.;
η = 34.2 mPa · s;
Δn = 0.113;
Δε = 8.8.

A pitch was 66.5 micrometers when compound (Op-05) was added to the composition described above in a proportion of 0.25% by weight.

Use Example 6

| | | |
|---|---|---|
| 4O-HHH-V1 | (1-1-17) | 5% |
| 5-HB-CL | (5-2) | 3% |
| 7-HB(F)-F | (5-3) | 7% |
| 3-HH-4 | (2-1) | 9% |
| 3-HH-5 | (2-1) | 10% |
| 3-HB-O2 | (2-5) | 13% |

-continued

| | | |
|---|---|---|
| 3-HHEB-F | (6-10) | 8% |
| 5-HHEB-F | (6-10) | 3% |
| 3-HHEB(F,F)-F | (6-12) | 10% |
| 4-HHEB(F,F)-F | (6-12) | 5% |
| 3-GHB(F,F)-F | (6-109) | 5% |
| 4-GHB(F,F)-F | (6-109) | 6% |
| 5-GHB(F,F)-F | (6-109) | 7% |
| 2-HHB(F,F)-F | (6-3) | 4% |
| 3-HHB(F,F)-F | (6-3) | 5% |

Use Example 7

| | | |
|---|---|---|
| 4O-HHH-V1 | (1-1-17) | 5% |
| 1V2-BEB(F,F)-C | (8-15) | 6% |
| 3-HB-C | (8-1) | 16% |
| 2-BTB-1 | (2-10) | 10% |
| 5-HH-VFF | (2-1) | 30% |
| 3-HHB-1 | (3-1) | 4% |
| VFF-HHB-1 | (3-1) | 8% |
| VFF2-HHB-1 | (3-1) | 8% |
| 3-H2BTB-2 | (3-17) | 5% |
| 3-H2BTB-3 | (3-17) | 4% |
| 3-H2BTB-4 | (3-17) | 4% |

Use Example 8

| | | |
|---|---|---|
| 4O-HHH-2V | (1-1-24) | 4% |
| 3-HB-CL | (5-2) | 6% |
| 3-HHB-OCF3 | (6-1) | 5% |
| 3-H2HB-OCF3 | (6-13) | 5% |
| 5-H4HB-OCF3 | (6-19) | 15% |
| V-HHB(F)-F | (6-2) | 5% |
| 3-HHB(F)-F | (6-2) | 5% |
| 5-HHB(F)-F | (6-2) | 5% |
| 3-H4HB(F,F)-CF3 | (6-21) | 8% |
| 5-H4HB(F,F)-CF3 | (6-21) | 10% |
| 5-H2HB(F,F)-F | (6-15) | 5% |
| 5-H4HB(F,F)-F | (6-21) | 7% |
| 2-H2BB(F)-F | (6-26) | 5% |
| 3-H2BB(F)-F | (6-26) | 10% |
| 3-HBEB(F,F)-F | (6-39) | 5% |

Use Example 9

| | | |
|---|---|---|
| 4O-HHH-2V | (1-1-24) | 4% |
| 7-HB(F,F)-F | (5-4) | 3% |
| 3-HB-O2 | (2-5) | 7% |
| 2-HHB(F)-F | (6-2) | 10% |
| 3-HHB(F)-F | (6-2) | 10% |
| 5-HHB(F)-F | (6-2) | 10% |
| 2-HBB(F)-F | (6-23) | 9% |
| 3-HBB(F)-F | (6-23) | 9% |
| 5-HBB(F)-F | (6-23) | 15% |
| 2-HBB-F | (6-22) | 4% |
| 3-HBB-F | (6-22) | 2% |
| 5-HBB-F | (6-22) | 2% |
| 3-HBB(F,F)-F | (6-24) | 5% |
| 5-HBB(F,F)-F | (6-24) | 10% |

Use Example 10

| | | |
|---|---|---|
| 4O-HHH-2V1 | (1-1-28) | 5% |
| 3-HH-V | (2-1) | 7% |
| 3-HH-V1 | (2-1) | 3% |
| 5-HB-CL | (5-2) | 9% |
| 3-HHB(F,F)-F | (6-3) | 8% |
| 3-HBB(F,F)-F | (6-24) | 20% |
| 5-HBB(F,F)-F | (6-24) | 15% |
| 3-HHEB(F,F)-F | (6-12) | 10% |
| 4-HHEB(F,F)-F | (6-12) | 3% |
| 5-HHEB(F,F)-F | (6-12) | 3% |
| 2-HBEB(F,F)-F | (6-39) | 3% |
| 3-HBEB(F,F)-F | (6-39) | 5% |
| 5-HBEB(F,F)-F | (6-39) | 3% |
| 3-HHBB(F,F)-F | (7-6) | 6% |

Use Example 11

| | | |
|---|---|---|
| 4O-HHH-2V1 | (1-1-28) | 5% |
| 3-HHB(F,F)-F | (6-3) | 9% |
| 3-H2HB(F,F)-F | (6-15) | 8% |
| 4-H2HB(F,F)-F | (6-15) | 8% |
| 5-H2HB(F,F)-F | (6-15) | 8% |
| 3-HBB(F,F)-F | (6-24) | 18% |
| 5-HBB(F,F)-F | (6-24) | 20% |
| 3-H2BB(F,F)-F | (6-27) | 10% |
| 5-HHBB(F,F)-F | (7-6) | 3% |
| 5-HHEBB-F | (7-17) | 2% |
| 3-HH2BB(F,F)-F | (7-15) | 3% |
| 1O1-HBBH-4 | (4-1) | 4% |
| 1O1-HBBH-5 | (4-1) | 2% |

Use Example 12

| | | |
|---|---|---|
| 4O-HHHH-2V | (1-2-11) | 3% |
| 5-HB-F | (5-2) | 12% |
| 6-HB-F | (5-2) | 9% |
| 7-HB-F | (5-2) | 7% |
| 2-HHB-OCF3 | (6-1) | 7% |
| 3-HHB-OCF3 | (6-1) | 7% |
| 4-HHB-OCF3 | (6-1) | 7% |
| 5-HHB-OCF3 | (6-1) | 5% |
| 3-HH2B-OCF3 | (6-4) | 4% |
| 5-HH2B-OCF3 | (6-4) | 4% |
| 3-HHB(F,F)-OCF2H | (6-3) | 4% |
| 3-HHB(F,F)-OCF3 | (6-3) | 5% |
| 3-HH2B(F)-F | (6-5) | 3% |
| 3-HBB(F)-F | (6-23) | 10% |
| 5-HBB(F)-F | (6-23) | 10% |
| 5-HBBH-3 | (4-1) | 3% |

Use Example 13

| | | |
|---|---|---|
| 4O-HHHVH-V | (1-2-24) | 3% |
| 5-HB-CL | (5-2) | 17% |
| 7-HB(F,F)-F | (5-4) | 3% |
| 3-HH-4 | (2-1) | 10% |
| 3-HH-5 | (2-1) | 5% |
| 3-HB-O2 | (2-5) | 15% |
| 3-HHB-1 | (3-1) | 5% |
| 3-HHB-O1 | (3-1) | 3% |
| V-HHB-1 | (3-1) | 2% |
| 2-HHB(F)-F | (6-2) | 7% |
| 3-HHB(F)-F | (6-2) | 7% |

-continued

| | | |
|---|---|---|
| 5-HHB(F)-F | (6-2) | 7% |
| 3-HHB(F,F)-F | (6-3) | 6% |
| 3-H2HB(F,F)-F | (6-15) | 5% |
| 4-H2HB(F,F)-F | (6-15) | 5% |

Use Example 14

| | | |
|---|---|---|
| 4O-HHH-VFF | (1-1-44) | 3% |
| 3-HB-CL | (5-2) | 10% |
| 3-HH-4 | (2-1) | 12% |
| 3-HB-O2 | (2-5) | 10% |
| 3-HHB(F,F)-F | (6-3) | 5% |
| 3-HBB(F,F)-F | (6-24) | 27% |
| 5-HBB(F,F)-F | (6-24) | 25% |
| 5-HBB(F) B-2 | (4-5) | 4% |
| 5-HBB(F) B-3 | (4-5) | 4% |

NI = 72.1° C.;
η = 18.6 mPa · s;
Δn = 0.112;
Δε = 5.3.

INDUSTRIAL APPLICABILITY

A liquid crystal compound of the invention has excellent physical properties. A liquid crystal composition containing the compound can be widely applied to a liquid crystal display device used in a personal computer, a television and so forth.

What is claimed is:

1. A compound, represented by formula (1):

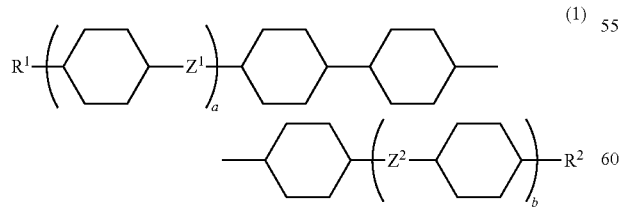

(1)

wherein, in formula (1),
R$^1$ is a group in which at least one —CH$_2$— of alkyl having 1 to 10 carbons is replaced by —O—, and in the group, at least one —CH$_2$CH$_2$— may be replaced by —CH=CH—, and at least one hydrogen may be replaced by fluorine;

R$^2$ is alkenyl having 2 to 10 carbons, and in the group, at least one hydrogen bonding with carbon forming a double bond may be replaced by fluorine or chlorine;

Z$^1$ and Z$^2$ are independently a single bond, —CH$_2$CH$_2$—, —CH=CH—, —OCH$_2$—, —CH$_2$O—, —C≡C—, —COO—, —OCO—, —CF$_2$O—, —OCF$_2$—, —CF$_2$CF$_2$—, —CF=CF—, —(CH$_2$)$_4$—, —CH=CH—(CH$_2$)$_2$— or —(CH$_2$)$_2$—CH=CH—; and a and b are independently 0 or 1.

2. The compound according to claim 1, wherein, in formula (1),

R$^1$ is alkoxy having 1 to 9 carbons, alkoxyalkyl having 1 to 9 carbons, alkenyloxy having 2 to 9 carbons or alkenyloxyalkyl having 2 to 9 carbons, and in the groups, at least one hydrogen may be replaced by fluorine;

R$^2$ is alkenyl having 2 to 10 carbons, and in the group, at least one hydrogen bonding with carbon forming a double bond may be replaced by fluorine;

Z$^1$ and Z$^2$ are independently a single bond, —CH$_2$CH$_2$—, —CH=CH—, —OCH$_2$— or —CH$_2$O—; and a and b are independently 0 or 1.

3. The compound according to claim 1, represented by any one of formulas (1-1) to (1-4):

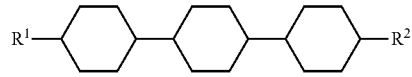 (1-1)

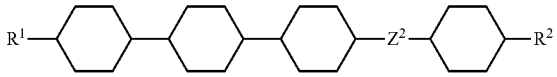 (1-2)

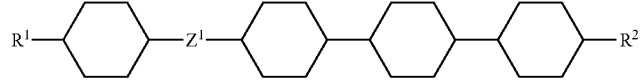 (1-3)

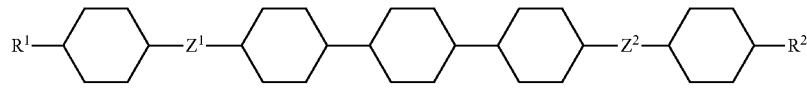 (1-4)

wherein, in formulas (1-1) to (1-4),
R$^1$ is alkoxy having 1 to 9 carbons or alkenyloxy having 2 to 9 carbons, and in the groups, at least one hydrogen may be replaced by fluorine;

R$^2$ is alkenyl having 2 to 10 carbons, and in the group, at least one hydrogen bonding with carbon forming a double bond may be replaced by fluorine; and Z$^1$ and Z$^2$ are independently a single bond, —CH$_2$CH$_2$—, —CH=CH—, —OCH$_2$— or —CH$_2$O—.

4. The compound according to claim 1, represented by any one of formulas (1-5) to (1-10):

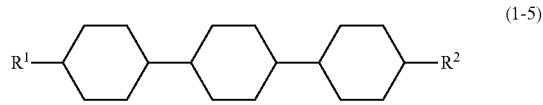 (1-5)

-continued

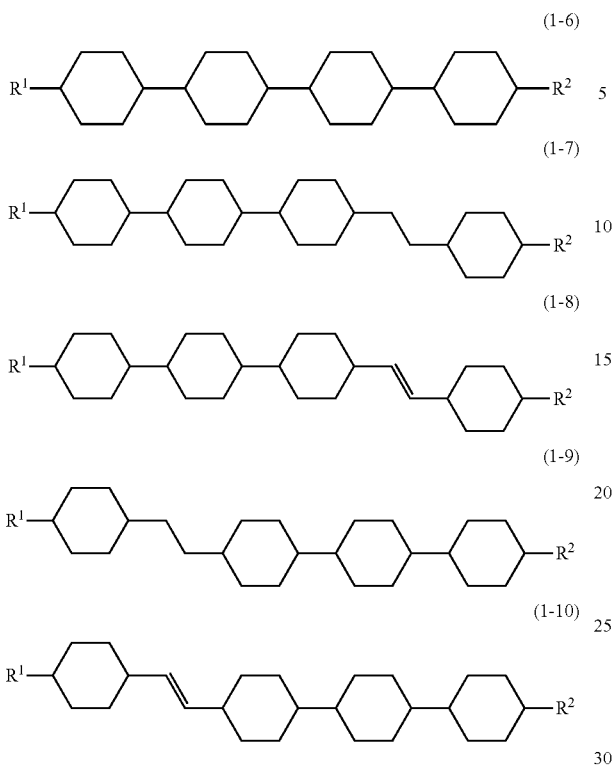

wherein, in formulas (1-15) to (1-22), R³ is alkyl having 1 to 9 carbons.

5. The compound according to claim 1, represented by any one of formulas (1-11) to (1-14):

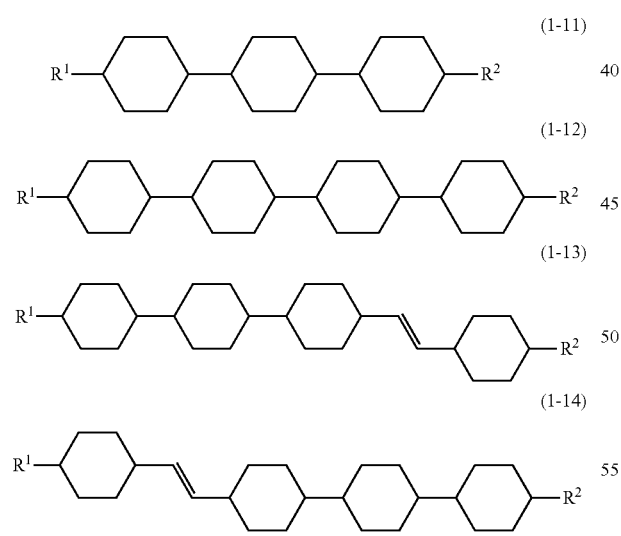

wherein, in formulas (1-11) to (1-14),

R¹ is alkoxy having 1 to 9 carbons; and

R² is alkenyl having 2 to 10 carbons, and in the group, at least one hydrogen bonding with carbon forming a double bond may be replaced by fluorine.

6. The compound according to claim 1, represented by any one of formulas (1-15) to (1-22):

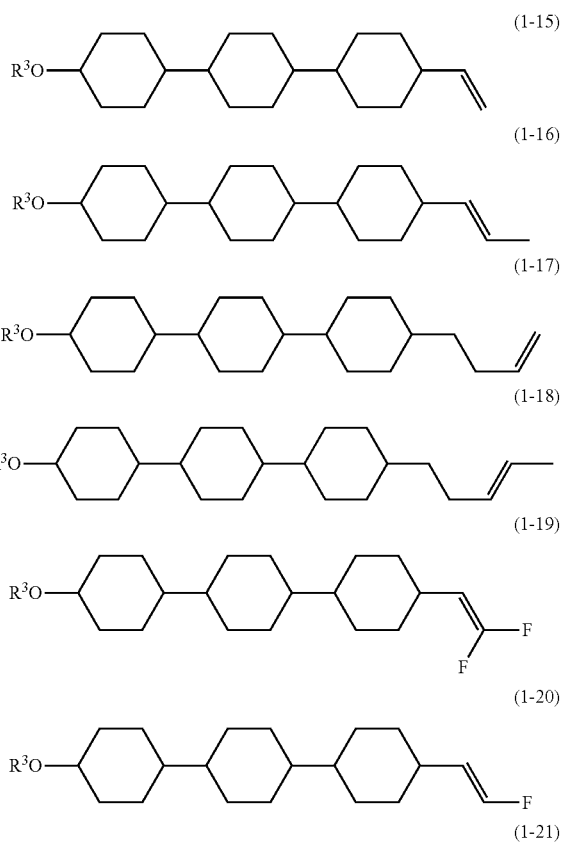

$Z^{11}$, $Z^{12}$ and $Z^{13}$ are independently a single bond, —COO—, —CH$_2$CH$_2$—, —CH=CH— or —C≡C—; and in formula (3), when all of ring $B^1$, ring $B^2$ and ring $B^3$ are 1,4-cyclohexylene, $R^{11}$ and $R^{12}$ are independently alkyl having 1 to 10 carbons or alkenyl having 2 to 10 carbons, and in the monovalent groups, at least one hydrogen may be replaced by fluorine; and in formula (4), when all of ring $B^1$, ring $B^2$, ring $B^3$ and ring $B^4$ are 1,4-cyclohexylene, $R^{11}$ and $R^{12}$ are independently alkyl having 1 to 10 carbons or alkenyl having 2 to 10 carbons, and in the monovalent groups, at least one hydrogen may be replaced by fluorine.

7. The compound according to claim 1, represented by any one of formulas (1-23) to (1-26):

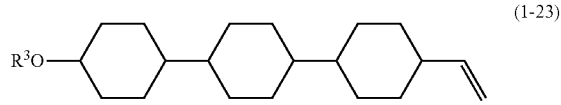

-continued (1-24)
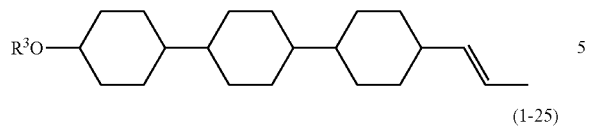

(1-25)
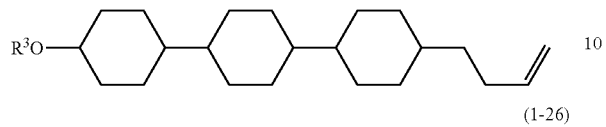

(1-26)
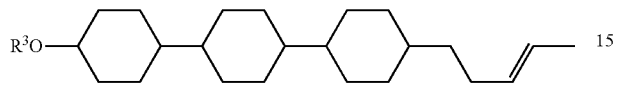

wherein, in formulas (1-23) to (1-26), $R^3$ is alkyl having 1 to 6 carbons.

8. A liquid crystal composition, containing at least one compound according to claim 1.

9. The liquid crystal composition according to claim 8, further containing at least one compound selected from the group of compounds represented by formulas (2) to (4):

(2)
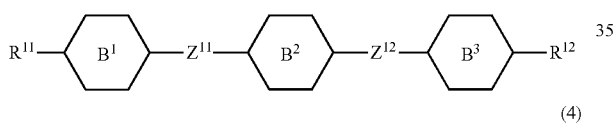

(3)
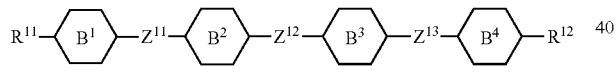

(4)
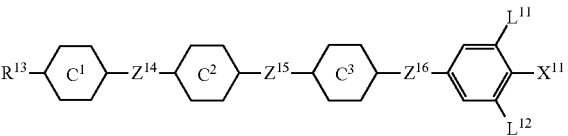

wherein, in formulas (2) to (4),
$R^{11}$ and $R^{12}$ are independently alkyl having 1 to 10 carbons or alkenyl having 2 to 10 carbons, and in the groups, at least one —CH$_2$— may be replaced by —O—, and in the monovalent groups, at least one hydrogen may be replaced by fluorine;
ring $B^1$, ring $B^2$, ring $B^3$ and ring $B^4$ are independently 1,4-cyclohexylene, 1,4-phenylene, 2-fluoro-1,4-phenylene, 2,5-difluoro-1,4-phenylene or pyrimidine-2,5-diyl; and
wherein, in formulas (1-5) to (1-10),
$R^1$ is alkoxy having 1 to 9 carbons or alkenyloxy having 2 to 9 carbons; and
$R^2$ is alkenyl having 2 to 10 carbons, and in the group, at least one hydrogen bonding with carbon forming a double bond may be replaced by fluorine.

10. The liquid crystal composition according to claim 8, further containing at least one compound selected from the group of compounds represented by formulas (5) to (7):

(5)
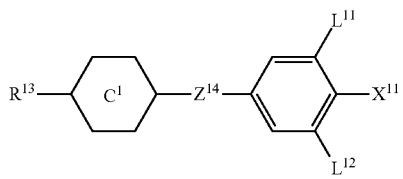

(6)
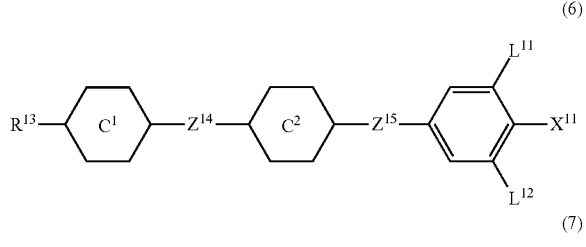

(7)
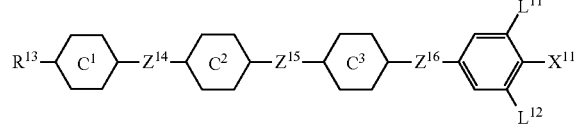

wherein, in formulas (5) to (7),
$R^{13}$ is alkyl having 1 to 10 carbons or alkenyl having 2 to 10 carbons, and in the groups, at least one —CH$_2$— may be replaced by —O—, and in the monovalent groups, at least one hydrogen may be replaced by fluorine;
$X^{11}$ is fluorine, chlorine, —OCF$_3$, —OCHF$_2$, —CF$_3$, —CHF$_2$, —CH$_2$F, —OCF$_2$CHF$_2$ or —OCF$_2$CHFCF$_3$;
ring $C^1$, ring $C^2$ and ring $C^3$ are independently 1,4-cyclohexylene, 1,4-phenylene, 1,4-phenylene in which at least one hydrogen is replaced by fluorine, tetrahydropyran-2,5-diyl, 1,3-dioxane-2,5-diyl or pyrimidine-2,5-diyl;
$Z^{14}$, $Z^{15}$ and $Z^{16}$ are independently a single bond, —COO—, —OCO—, —CH$_2$O—, —OCH$_2$—, —CF$_2$O—, —OCF$_2$—, —CH$_2$CH$_2$—, —CH=CH—, —C≡C— or —(CH$_2$)$_4$—; and
$L^{11}$ and $L^{12}$ are independently hydrogen or fluorine.

11. The liquid crystal composition according to claim 8, further containing at least one compound selected from the group of compounds represented by formula (8):

(8)
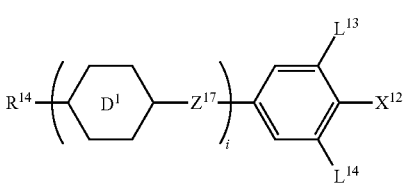

wherein, in formula (8),
$R^{14}$ is alkyl having 1 to 10 carbons or alkenyl having 2 to 10 carbons, and in the groups, at least one —CH$_2$— may be replaced by —O—, and in the monovalent groups, at least one hydrogen may be replaced by fluorine;
$X^{12}$ is —C≡N or —C≡C—C≡N;
ring $D^1$ is 1,4-cyclohexylene, 1,4-phenylene, 1,4-phenylene in which at least one hydrogen is replaced by fluorine, tetrahydropyran-2,5-diyl, 1,3-dioxane-2,5-diyl or pyrimidine-2,5-diyl;

$Z^{17}$ is a single bond, —COO—, —OCO—, —CH$_2$O—, —OCH$_2$—, —CF$_2$O—, —OCF$_2$—, —CH$_2$CH$_2$— or —C≡C—;

$L^{13}$ and $L^{14}$ are independently hydrogen or fluorine; and i is 1, 2, 3 or 4.

12. The liquid crystal composition according to claim 8, further containing at least one compound selected from the group of compounds represented by formulas (9) to (15):

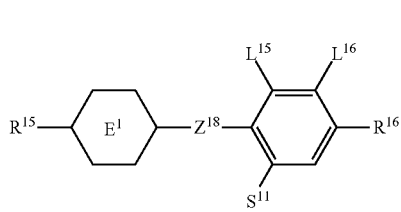
(9)

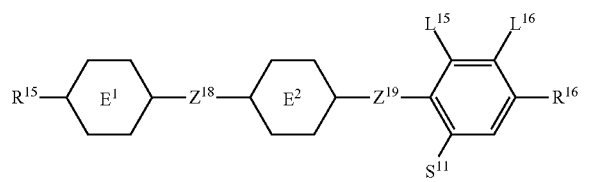
(10)

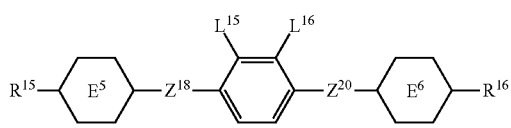
(11)

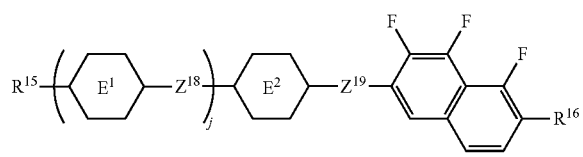
(12)

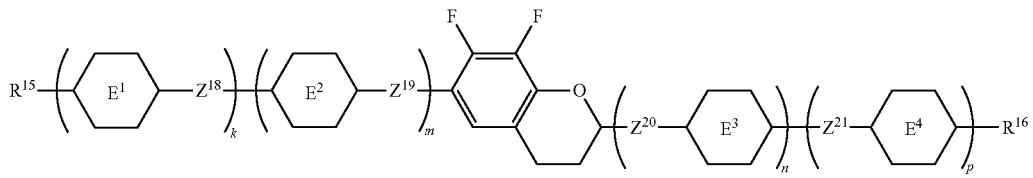
(13)

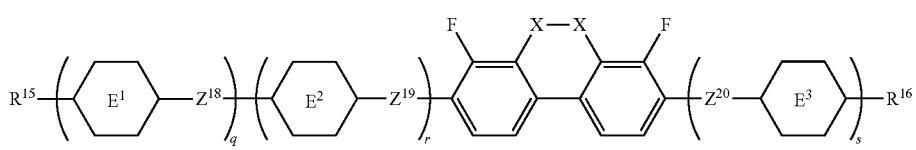
(14)

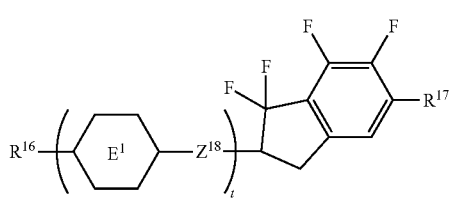
(15)

wherein, in formulas (9) to (15), $R^{15}$ and $R^{16}$ are independently alkyl having 1 to 10 carbons or alkenyl having 2 to 10 carbons, and in the groups, at least one —CH$_2$— may be replaced by —O—, and in the monovalent groups, at least one hydrogen may be replaced by fluorine;

$R^{17}$ is hydrogen, fluorine, alkyl having 1 to 10 carbons or alkenyl having 2 to 10 carbons, and in the alkyl and the alkenyl, at least one —CH$_2$— may be replaced by —O—, and in the monovalent groups, at least one hydrogen may be replaced by fluorine;

ring $E^1$, ring $E^2$, ring $E^3$ and ring $E^4$ are independently 1,4-cyclohexylene, 1,4-cyclohexenylene, 1,4-phenylene, 1,4-phenylene in which at least one hydrogen is replaced by fluorine, tetrahydropyran-2,5-diyl or decahydronaphthalene-2,6-diyl;

ring $E^5$ and ring $E^6$ are independently 1,4-cyclohexylene, 1,4-cyclohexenylene, 1,4-phenylene, tetrahydropyran-2,5-diyl or decahydronaphthalene-2,6-diyl;

$Z^{18}$, $Z^{19}$, $Z^{20}$ and $Z^{21}$ are independently a single bond, —COO—, —OCO—, —CH$_2$O—, —OCH$_2$—, —CF$_2$O—, —OCF$_2$—, —CH$_2$CH$_2$—, —CF$_2$OCH$_2$CH$_2$— or —OCF$_2$CH$_2$CH$_2$—;

$L^{15}$ and $L^{16}$ are independently fluorine or chlorine;

$S^{11}$ is hydrogen or methyl;

X is —CHF— or —CF$_2$—; and j, k, m, n, p, q, r and s are independently 0 or 1, a sum of k, m, n and p is 1 or 2, a sum of q, r and s is 0, 1, 2 or 3, and t is 1, 2 or 3.

13. The liquid crystal composition according to claim 8, further containing at least one additive selected from the group of a polymerizable compound, a polymerization initiator, a polymerization inhibitor, an optically active compound, an antioxidant, an ultraviolet light absorber, a light stabilizer, a heat stabilizer, a dye and an antifoaming agent.

14. A liquid crystal display device, wherein the device comprises the liquid crystal composition according to claim 8.

* * * * *